United States Patent
Okada et al.

(10) Patent No.: US 10,627,296 B2
(45) Date of Patent: *Apr. 21, 2020

(54) FORCE SENSOR

(71) Applicant: TRI-FORCE MANAGEMENT CORPORATION, Saitama-ken (JP)

(72) Inventors: Kazuhiro Okada, Saitama-ken (JP); Satoshi Era, Saitama-ken (JP); Miho Okada, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,815

(22) Filed: Jul. 3, 2019

(65) Prior Publication Data

US 2019/0323904 A1  Oct. 24, 2019

Related U.S. Application Data

(63) Continuation of application No. 15/926,819, filed on Mar. 20, 2018, now Pat. No. 10,488,280.

(30) Foreign Application Priority Data

Sep. 26, 2017 (JP) .................. 2017-185184

(51) Int. Cl.
*G01L 1/14* (2006.01)
*G01L 5/165* (2020.01)

(52) U.S. Cl.
CPC .............. *G01L 1/144* (2013.01); *G01L 1/142* (2013.01); *G01L 5/165* (2013.01)

(58) Field of Classification Search
CPC .......... G01L 1/144; G01L 1/142; G01L 5/165
USPC ..................................................... 73/862.626
See application file for complete search history.

(56) References Cited

U.S. PATENT DOCUMENTS

| 5,437,196 A | * | 8/1995 | Okada ..................... G01L 5/165 |
| | | | 73/514.18 |
| 6,282,956 B1 | | 9/2001 | Okada |
| 8,408,075 B2 | | 4/2013 | Okada |
| 9,995,644 B2 | | 6/2018 | Nishioki et al. |
| 2008/0178675 A1 | | 7/2008 | Okada |
| 2008/0184819 A1 | | 8/2008 | Morimoto |
| 2018/0156678 A1 | | 6/2018 | Eilersen |

FOREIGN PATENT DOCUMENTS

JP          2841240 B2     10/1998

* cited by examiner

*Primary Examiner* — Octavia Hollington
(74) *Attorney, Agent, or Firm* — Ladas & Parry LLP

(57) ABSTRACT

A capacitive force sensor that is inexpensive but highly sensitive, and is hardly affected by temperature changes and in-phase noise in the use environment. A force sensor includes: a deformable body having a force receiving portion and a fixed portion; a displacement body that is connected to the deformable body, and is displaced by elastic deformation caused in the deformable body; and a detection circuit that detects an applied force, in accordance with the displacement caused in the displacement body.

10 Claims, 46 Drawing Sheets

| FORCE/MOMENT | FIRST TILTING PORTION 213A | D11 | D12 | SECOND TILTING PORTION 213B | D21 | D22 |
|---|---|---|---|---|---|---|
| +Fx | COUNTERCLOCKWISE | − | + | COUNTERCLOCKWISE | − | + |
| +Fy | COUNTERCLOCKWISE | − | + | CLOCKWISE | + | − |
| +Fz | CLOCKWISE | + | − | COUNTERCLOCKWISE | − | + |
| +Mx | CLOCKWISE | + | − | COUNTERCLOCKWISE | − | + |
| +My | CLOCKWISE | + | − | CLOCKWISE | + | − |
| +Mz | CLOCKWISE | + | − | CLOCKWISE | + | − |

| FORCE/MOMENT | THIRD TILTING PORTION 213C | D31 | D32 | FOURTH TILTING PORTION 213D | D41 | D42 |
|---|---|---|---|---|---|---|
| +Fx | CLOCKWISE | + | − | CLOCKWISE | + | − |
| +Fy | CLOCKWISE | + | − | COUNTERCLOCKWISE | − | + |
| +Fz | CLOCKWISE | + | − | COUNTERCLOCKWISE | − | + |
| +Mx | COUNTERCLOCKWISE | − | + | CLOCKWISE | + | − |
| +My | COUNTERCLOCKWISE | − | + | COUNTERCLOCKWISE | − | + |
| +Mz | CLOCKWISE | + | − | CLOCKWISE | + | − |

FIG. 17

| FORCE/MOMENT | C11 | C12 | C21 | C22 | C31 | C32 | C41 | C42 |
|---|---|---|---|---|---|---|---|---|
| +Fx | + | − | + | − | − | + | − | + |
| +Fy | + | − | − | + | − | + | + | − |
| +Fz | − | + | + | − | − | + | + | − |
| +Mx | − | + | + | − | + | − | − | + |
| +My | − | + | − | + | + | − | + | − |
| +Mz | − | + | − | + | − | + | − | + |

FIG. 20

|    | VFx | VFy | VFz | VMx | VMy | VMz |
|---|---|---|---|---|---|---|
| Fx | 8 | 0 | 0 | 0 | −8 | 0 |
| Fy | 0 | 8 | 0 | −8 | 0 | 0 |
| Fz | 0 | 0 | 8 | 0 | 0 | 0 |
| Mx | 0 | −8 | 0 | 8 | 0 | 0 |
| My | −8 | 0 | 0 | 0 | 8 | 0 |
| Mz | 0 | 0 | 0 | 0 | 0 | 8 |

FIG. 21

| FORCE/MOMENT | C11 | C21 | C31 | C41 |
|---|---|---|---|---|
| +Fz | − | + | − | + |
| +Mx | − | + | + | − |
| +My | − | − | + | + |
| +Mz | − | − | − | − |

FIG. 23

| | VFx | VMx | VMy | VMz |
|---|---|---|---|---|
| Fz | 4 | 0 | 0 | 0 |
| Mx | 0 | 4 | 0 | 0 |
| My | 0 | 0 | 4 | 0 |
| Mz | 0 | 0 | 0 | 4 |

FIG. 24

| FORCE/MOMENT | C11 | C22 | C31 | C42 |
|---|---|---|---|---|
| +Fx | + | − | − | + |
| +Fy | + | + | − | − |
| +Fz | − | − | − | − |
| +Mz | − | + | − | + |

FIG. 27

| FORCE/MOMENT | FIRST TILTING PORTION 513A | D11 | D12 | SECOND TILTING PORTION 513B | D21 | D22 |
| --- | --- | --- | --- | --- | --- | --- |
| +Fx | NO TILTING | 0 | 0 | COUNTERCLOCKWISE | − | + |
| +Fy | COUNTERCLOCKWISE | − | + | NO TILTING | 0 | 0 |
| +Fz | CLOCKWISE | + | − | COUNTERCLOCKWISE | − | + |
| +Mx | NO TILTING | 0 | 0 | COUNTERCLOCKWISE | − | + |
| +My | CLOCKWISE | + | − | NO TILTING | 0 | 0 |
| +Mz | CLOCKWISE | + | − | CLOCKWISE | + | − |

| FORCE/MOMENT | THIRD TILTING PORTION 513C | D31 | D32 | FOURTH TILTING PORTION 513D | D41 | D42 |
| --- | --- | --- | --- | --- | --- | --- |
| +Fx | COUNTERCLOCKWISE | − | + | NO TILTING | 0 | 0 |
| +Fy | NO TILTING | 0 | 0 | CLOCKWISE | + | − |
| +Fz | CLOCKWISE | + | − | COUNTERCLOCKWISE | − | + |
| +Mx | CLOCKWISE | + | − | NO TILTING | 0 | 0 |
| +My | NO TILTING | 0 | 0 | CLOCKWISE | + | − |
| +Mz | CLOCKWISE | + | − | CLOCKWISE | + | − |

| FORCE/MOMENT | FIFTH TILTING PORTION 513E | D51 | D52 | SIXTH TILTING PORTION 513F | D61 | D62 |
| --- | --- | --- | --- | --- | --- | --- |
| +Fx | NO TILTING | 0 | 0 | CLOCKWISE | + | − |
| +Fy | CLOCKWISE | + | − | NO TILTING | 0 | 0 |
| +Fz | CLOCKWISE | + | − | COUNTERCLOCKWISE | − | + |
| +Mx | NO TILTING | 0 | 0 | CLOCKWISE | + | − |
| +My | COUNTERCLOCKWISE | − | + | NO TILTING | 0 | 0 |
| +Mz | CLOCKWISE | + | − | CLOCKWISE | + | − |

| FORCE/MOMENT | SEVENTH TILTING PORTION 513G | D71 | D72 | EIGHTH TILTING PORTION 513H | D81 | D82 |
| --- | --- | --- | --- | --- | --- | --- |
| +Fx | CLOCKWISE | + | − | NO TILTING | 0 | 0 |
| +Fy | NO TILTING | 0 | 0 | COUNTERCLOCKWISE | − | + |
| +Fz | CLOCKWISE | + | − | COUNTERCLOCKWISE | − | + |
| +Mx | COUNTERCLOCKWISE | − | + | NO TILTING | 0 | 0 |
| +My | NO TILTING | 0 | 0 | COUNTERCLOCKWISE | − | + |
| +Mz | CLOCKWISE | + | − | CLOCKWISE | + | − |

FIG. 35

| FORCE/MOMENT | C11 | C12 | C21 | C22 | C31 | C32 | C41 | C42 | C51 | C52 | C61 | C62 | C71 | C72 | C81 | C82 |
|---|---|---|---|---|---|---|---|---|---|---|---|---|---|---|---|---|
| +Fx | 0 | 0 | + | − | + | − | 0 | 0 | 0 | 0 | − | + | − | + | 0 | 0 |
| +Fy | + | − | 0 | 0 | 0 | 0 | − | + | − | + | 0 | 0 | 0 | 0 | + | − |
| +Fz | − | + | + | − | − | + | + | − | − | + | + | − | − | + | + | − |
| +Mx | 0 | 0 | + | − | − | + | 0 | 0 | 0 | 0 | − | + | + | − | 0 | 0 |
| +My | − | + | 0 | 0 | 0 | 0 | − | + | + | − | 0 | 0 | 0 | 0 | + | − |
| +Mz | − | + | − | + | − | + | − | + | − | + | − | + | − | + | − | + |

FIG. 38

|  | VFx | VFy | VFz | VMx | VMy | VMz |
|---|---|---|---|---|---|---|
| Fx | 8 | 0 | 0 | 0 | 0 | 0 |
| Fy | 0 | 8 | 0 | 0 | 0 | 0 |
| Fz | 0 | 0 | 16 | 0 | 0 | 0 |
| Mx | 0 | 0 | 0 | 8 | 0 | 0 |
| My | 0 | 0 | 0 | 0 | 8 | 0 |
| Mz | 0 | 0 | 0 | 0 | 0 | 16 |

FIG. 39

| FORCE/MOMENT | C11 | C22 | C32 | C41 | C51 | C62 | C72 | C81 |
|---|---|---|---|---|---|---|---|---|
| +Fx | 0 | − | − | 0 | 0 | + | + | 0 |
| +Fy | + | 0 | 0 | − | − | 0 | 0 | + |
| +Fz | − | − | + | + | − | − | + | + |
| +Mx | 0 | − | + | 0 | 0 | + | − | 0 |
| +My | − | 0 | 0 | − | + | 0 | 0 | + |
| +Mz | − | + | + | − | − | + | + | − |

FIG. 42

|  | VFx | VFy | VFz | VMx | VMy | VMz |
|---|---|---|---|---|---|---|
| Fx | 4 | 0 | 0 | 0 | 0 | 0 |
| Fy | 0 | 4 | 0 | 0 | 0 | 0 |
| Fz | 0 | 0 | 8 | 0 | 0 | 0 |
| Mx | 0 | 0 | 0 | 4 | 0 | 0 |
| My | 0 | 0 | 0 | 0 | 4 | 0 |
| Mz | 0 | 0 | 0 | 0 | 0 | 8 |

FIG. 43

| FORCE/MOMENT | FIRST TILTING PORTION 713A | D11 | D12 | SECOND TILTING PORTION 713B | D21 | D22 |
| --- | --- | --- | --- | --- | --- | --- |
| +Fx | (COUNTERCLOCKWISE) | (−) | (+) | COUNTERCLOCKWISE | − | + |
| +Fy | COUNTERCLOCKWISE | − | + | (COUNTERCLOCKWISE) | (−) | (+) |
| +Fz | CLOCKWISE | + | − | COUNTERCLOCKWISE | − | + |
| +Mx | NO TILTING | 0 | 0 | COUNTERCLOCKWISE | − | + |
| +My | CLOCKWISE | + | − | NO TILTING | 0 | 0 |
| +Mz | CLOCKWISE | + | − | CLOCKWISE | + | − |

| FORCE/MOMENT | THIRD TILTING PORTION 713C | D31 | D32 | FOURTH TILTING PORTION 713D | D41 | D42 |
| --- | --- | --- | --- | --- | --- | --- |
| +Fx | COUNTERCLOCKWISE | − | + | (COUNTERCLOCKWISE) | (−) | (+) |
| +Fy | (CLOCKWISE) | (+) | (−) | CLOCKWISE | + | − |
| +Fz | CLOCKWISE | + | − | COUNTERCLOCKWISE | − | + |
| +Mx | CLOCKWISE | + | − | NO TILTING | 0 | 0 |
| +My | NO TILTING | 0 | 0 | CLOCKWISE | + | − |
| +Mz | CLOCKWISE | + | − | CLOCKWISE | + | − |

| FORCE/MOMENT | FIFTH TILTING PORTION 713E | D51 | D52 | SIXTH TILTING PORTION 713F | D61 | D62 |
| --- | --- | --- | --- | --- | --- | --- |
| +Fx | (CLOCKWISE) | (+) | (−) | CLOCKWISE | + | − |
| +Fy | CLOCKWISE | + | − | (CLOCKWISE) | (+) | (−) |
| +Fz | CLOCKWISE | + | − | COUNTERCLOCKWISE | − | + |
| +Mx | NO TILTING | 0 | 0 | CLOCKWISE | + | − |
| +My | COUNTERCLOCKWISE | − | + | NO TILTING | 0 | 0 |
| +Mz | CLOCKWISE | + | − | CLOCKWISE | + | − |

| FORCE/MOMENT | SEVENTH TILTING PORTION 713G | D71 | D72 | EIGHTH TILTING PORTION 713H | D81 | D82 |
| --- | --- | --- | --- | --- | --- | --- |
| +Fx | CLOCKWISE | + | − | (CLOCKWISE) | (+) | (−) |
| +Fy | (COUNTERCLOCKWISE) | (−) | (+) | COUNTERCLOCKWISE | − | + |
| +Fz | CLOCKWISE | + | − | COUNTERCLOCKWISE | − | + |
| +Mx | COUNTERCLOCKWISE | − | + | NO TILTING | 0 | 0 |
| +My | NO TILTING | 0 | 0 | COUNTERCLOCKWISE | − | + |
| +Mz | CLOCKWISE | + | − | CLOCKWISE | + | − |

FIG. 45

| FORCE/MOMENT | C11 | C12 | C21 | C22 | C31 | C32 | C41 | C42 |
|---|---|---|---|---|---|---|---|---|
| +Fx | + | − | + | − | − | + | − | + |
| +Fy | + | − | − | + | − | + | + | − |
| +Fz | − | 0 | 0 | − | − | 0 | 0 | − |
| +Mx | − | 0 | 0 | − | + | 0 | 0 | + |
| +My | − | 0 | 0 | + | + | 0 | 0 | − |
| +Mz | − | + | − | + | − | + | − | + |

FIG. 50

|  | VFx | VFy | VFz | VMx | VMy | VMz |
|---|---|---|---|---|---|---|
| Fx | 8 | 0 | 0 | 0 | −4 | 0 |
| Fy | 0 | 8 | 0 | −4 | 0 | 0 |
| Fz | 0 | 0 | 8 | 0 | 0 | 0 |
| Mx | 0 | −4 | 0 | 8 | 0 | 0 |
| My | −4 | 0 | 0 | 0 | 8 | 0 |
| Mz | 0 | 0 | 0 | 0 | 0 | 8 |

FIG. 51

|    | VFx | VFy | VFz | VMx | VMy | VMz |
|----|-----|-----|-----|-----|-----|-----|
| Fx | 4   | 0   | 0   | 0   | 0   | 0   |
| Fy | 0   | 4   | 0   | 0   | 0   | 0   |
| Fz | 0   | 0   | 4   | 0   | 0   | 0   |
| Mx | 0   | 0   | 0   | 4   | 0   | 0   |
| My | 0   | 0   | 0   | 0   | 4   | 0   |
| Mz | 0   | 0   | 0   | 0   | 0   | 8   |

FIG. 52

| FORCE/MOMENT | C11 | C12 | C21 | C22 | C31 | C32 | C41 | C42 | C51 | C52 | C61 | C62 | C71 | C72 | C81 | C82 |
|---|---|---|---|---|---|---|---|---|---|---|---|---|---|---|---|---|
| +Fx | 0 | 0 | + | − | + | − | 0 | 0 | 0 | 0 | − | + | − | + | 0 | 0 |
| +Fy | + | − | 0 | 0 | 0 | 0 | − | + | − | + | 0 | 0 | 0 | 0 | + | − |
| +Fz | − | 0 | 0 | − | − | 0 | 0 | − | − | 0 | 0 | − | − | 0 | 0 | − |
| +Mx | 0 | 0 | 0 | − | − | 0 | 0 | 0 | 0 | 0 | 0 | + | + | 0 | 0 | 0 |
| +My | − | 0 | 0 | 0 | 0 | 0 | 0 | + | + | 0 | 0 | 0 | 0 | 0 | 0 | − |
| +Mz | − | + | − | + | − | + | − | + | − | + | − | + | − | + | − | + |

FIG. 53

|    | VFx | VFy | VFz | VMx | VMy | VMz |
|----|-----|-----|-----|-----|-----|-----|
| Fx | 8   | 0   | 0   | 0   | 0   | 0   |
| Fy | 0   | 8   | 0   | 0   | 0   | 0   |
| Fz | 0   | 0   | 16  | 0   | 0   | 0   |
| Mx | 0   | 0   | 0   | 4   | 0   | 0   |
| My | 0   | 0   | 0   | 0   | 4   | 0   |
| Mz | 0   | 0   | 0   | 0   | 0   | 16  |

FORCE SENSOR

CROSS REFERENCE TO THE RELATED APPLICATION

This application is a continuation of, and claims the benefit of, U.S. patent application Ser. No. 15/926,819 filed Mar. 20, 2018, which claims priority to Japanese Patent Application No. 2017-185184 filed Sep. 26, 2017, the contents of which are incorporated herein by reference.

TECHNICAL FIELD

The present invention relates to a force sensor, and more particularly, to a sensor having a function of outputting a force acting in a predetermined axis direction and a torque acting around a predetermined rotation axis as electric signals.

BACKGROUND ART

A conventional force sensor having a function of outputting a force acting in a predetermined axis direction and a torque acting around a predetermined rotation axis as electric signals is a capacitive force sensor that detects a force and a torque in accordance with changes in the capacitance values of capacitive elements, or a strain-gauge force sensor that detects a force and a torque in accordance with changes in the electric resistance value of a stain gauge. Such force sensors have been produced on a commercial basis.

A strain-gauge force sensor requires the step of attaching a strain gauge to a flexure element in the sensor manufacturing process. This complicates the assembling of the sensor. Furthermore, it is extremely difficult for a strain-gauge force sensor to contain a stopper mechanism for preventing sensor failures due to overload, and therefore, the use of such a stain-gauge force sensor is limited.

On the other hand, a capacitive force sensor has a simple sensor structure, and it is easy for a capacitive force sensor to contain a stopper mechanism for preventing sensor failures due to overload. Furthermore, a capacitive element is formed with two sets of parallel plates, and accordingly, an inexpensive force sensor can be obtained. Because of these features, capacitive force sensors are widely available on markets.

However, a capacitive force sensor detects a force in the Z-axis direction, in accordance with the sum of the capacitance values of capacitive elements. For example, such a detection method is illustrated in FIGS. 6 and 7 of Patent Document 1 filed by the applicant. In this case, the output of the sensor fluctuates due to temperature changes in the use environment, and is further affected by in-phase noise. It is of course possible to solve these problems by changing the detection circuit. However, this leads to higher force sensor production costs, which is undesirable.

CITATION LIST

Patent Literature

Patent Literature 1: JP 2841240 B1

SUMMARY OF INVENTION

Technical Problem

The present invention has been made in view of the above problems. That is, an object of the present invention is to provide a capacitive force sensor that is inexpensive but highly sensitive, and is hardly affected by temperature changes and in-phase noise in the use environment.

Solution to Problem

A first mode of a force sensor according to the present invention includes:

a deformable body that includes a force receiving portion and a fixed portion, and is elastically deformed by a force acting on the force receiving portion;

a displacement body that is connected to the deformable body, and is displaced by elastic deformation caused in the deformable body; and a detection circuit that detects an applied force, in accordance with a displacement caused in the displacement body, wherein the deformable body includes:

a tilting portion that has a longitudinal direction and is disposed between the force receiving portion and the fixed portion;

a first deformable portion that connects the force receiving portion and the tilting portion; and a second deformable portion that connects the fixed portion and the tilting portion, the first deformable portion extends in a direction intersecting with the longitudinal direction on one side of the tilting portion, the second deformable portion extends in a direction intersecting with the longitudinal direction on the other side of the tilting portion, the connecting portion between the first deformable portion and the tilting portion, and the connecting portion between the second deformable portion and the tilting portion differ in position in the longitudinal direction of the tilting portion, the displacement body includes a displacement portion that is connected to the tilting portion and is at a distance from the fixed portion, the displacement portion being displaced by a tilting movement of the tilting portion, and the detection circuit includes a capacitive element disposed at the displacement portion, and detects an applied force in accordance with a change in the capacitance value of the capacitive element.

With such a configuration, the displacement caused in the tilting portion can be easily amplified by the action of the displacement portion that is displaced by the tilting movement of the tilting portion. Further, if a plurality of capacitive elements are provided in the displacement portion, it is possible to detect an applied force from a difference between the changes in the capacitance values of the capacitive elements. That is, according to the present invention, it is possible to provide a force sensor that is inexpensive but highly sensitive, and is hardly affected by temperature changes and in-phase noise in the use environment.

The above force sensor may further include a support that is disposed to face the displacement body, and does not move relative to the fixed portion, wherein the capacitive element may include a displacement electrode disposed at the displacement portion of the displacement body, and a fixed electrode disposed on the support to face the displacement electrode.

In this case, the capacitive element can be stably positioned.

The displacement body may include a beam that extends in a direction intersecting with the longitudinal direction of the tilting portion. In this case, it is possible to effectively amplify the tilting movement caused in the tilting portion.

The displacement portion of the displacement body may include a first displacement portion and a second displacement portion defined at different positions from each other on the beam, and the detection circuit may include a first capacitive element disposed at the first displacement portion and a second capacitive element disposed at the second displacement portion, and detect an applied force in accordance with changes in capacitance values of the respective capacitive elements.

In this case, it is possible to detect an applied force from a difference between changes in the capacitance values of the capacitive elements. Thus, a force sensor that is hardly affected by temperature changes and in-phase noise in the use environment can be provided.

The displacement body may include a connecting body that connects the tilting portion of the deformable body and the beam, and the first displacement portion and the second displacement portion of the displacement body may be disposed on the beam symmetrically with respect to the connecting portion between the connecting body and the beam.

In this case, if the displacement of the tilting portion in the longitudinal direction can be ignored, the displacement caused in the first displacement portion and the displacement caused in the second displacement portion are of the same magnitude but have different signs from each other. Thus, the applied force can be detected through a simple calculation.

In the displacement body, the displacement caused in the tilting portion and the displacement caused in one of the first displacement portion and the second displacement portion when a force in a particular direction acts on the force receiving portion may be in the opposite directions from each other and be of the same size, to prevent the one of the displacement portions from being displaced. In this case, the applied force can be detected through a simple calculation.

The longitudinal direction of the tilting portion of the deformable body may extend in a direction intersecting with the X-axis and the Y-axis in an X-Y-Z three-dimensional coordinate system, the beam of the displacement body may extend parallel to the X-axis, and the detection circuit may detect at least one of an applied force in the X-axis direction and an applied force in the Z-axis direction, in accordance with a change in the capacitance value of the capacitive element.

In this case, the electrode forming the capacitive element can be disposed parallel to the X-Y plane, and thus, a force sensor can be formed with a simple structure.

The force sensor may further include a support that is disposed to face the beam of the displacement body, and does not move relative to the fixed portion, wherein the first capacitive element may include a first displacement electrode disposed at the first displacement portion of the displacement body, and a first fixed electrode disposed on the support to face the first displacement electrode, and the second capacitive element may include a second displacement electrode disposed at the second displacement portion of the displacement body, and a second fixed electrode disposed on the support to face the second displacement electrode.

In this case, it is possible to stabilize the changes in the capacitance values of the respective capacitive elements.

The force sensor may further include:

a force receiving body that is connected to the force receiving portion of the deformable body, and receives an applied force; and a fixed body connected to the fixed portion of the deformable body, wherein the fixed body may be connected to the support.

In this case, it is possible to transmit the applied force to the deformable body without fail.

The first displacement electrode and the second displacement electrode, or the first fixed electrode and the second fixed electrode may be formed with a common electrode. In this case, it is also possible to detect the applied force without fail.

A second mode of a force sensor according to the present invention includes:

a deformable body that is a closed-loop deformable body, the deformable body including: two force receiving portions; two fixed portions arranged together with the two force receiving portions alternately along a closed-loop path; and four deformable portions that connect the force receiving portions and the fixed portions adjacent to one another along the closed-loop path, and are elastically deformed by one of a force and a moment acting on the force receiving portions;

four displacement bodies that are connected to the respective deformable portions, and are displaced by elastic deformation caused in the deformable portions; and a detection circuit that detects at least one of an applied force and an applied moment, in accordance with displacements caused in the four displacement bodies, wherein the tour deformable portions each include:

a tilting portion that has a longitudinal direction and is disposed between the force receiving portion and the fixed portion;

a first deformable portion that connects the corresponding force receiving portion and the tilting portion; and a second deformable portion that connects the corresponding fixed portion and the tilting portion, the first deformable portion extends in a direction intersecting with the longitudinal direction on one side of the tilting portion, the second deformable portion extends in a direction intersecting with the longitudinal direction on the other side of the tilting portion, the connecting portion between the first deformable portion and the tilting portion, and the connecting portion between the second deformable portion and the tilting portion differ in position in the longitudinal direction of the tilting portion, the four displacement bodies are connected one by one to the respective tilting portions, and are at a distance from the respective fixed portions, the four displacement bodies each including a displacement portion that is displaced by a tilting movement of the tilting portion, and the detection circuit includes at least four capacitive elements disposed at least one each at the respective displacement portions, and detects at least one of an applied force and an applied moment in accordance with changes in capacitance values of the at least four capacitive elements.

With such a configuration, the displacement caused in the tilting portion can be easily amplified by the action of the displacement portion that is displaced by the tilting movement of the tilting portion. Further, with the capacitive elements, it is possible to detect at least an applied force or moment, in accordance with the differences between the changes in the capacitance value of these capacitive elements. That is, according to the present invention described above, it is possible to provide a force sensor that is inexpensive but highly sensitive, and is hardly affected by temperature changes and in-phase noise in the use environment.

Each of the four displacement body may include a beam that extends in a direction intersecting with the longitudinal direction of the corresponding tilting portion. In this case, it is possible to effectively amplify the tilting movement caused in the tilting portion.

Each of the displacement portions of the four displacement bodies may include a first displacement portion and a second displacement portion defined at different positions from each other on the corresponding beam, the capacitive elements may include a total of eight capacitive elements, the eight capacitive elements being four first capacitive elements disposed at the first displacement portions of the respective displacement bodies, and four second capacitive elements disposed at the second displacement portions of the respective displacement bodies, and the detection circuit may detect at least an applied force or moment, in accordance with changes in respective capacitance values of the eight capacitive elements.

Alternatively, two of the four displacement bodies each include a first displacement portion and a second displacement portion defined at different positions from each other on the corresponding beam, the remaining two of the four displacement bodies each include a single displacement portion on the corresponding beam, the capacitive elements include a total of six capacitive elements, the six capacitive elements being four capacitive elements disposed one by one at the respective first displacement portions and the respective second displacement portions, and two capacitive elements disposed one by one at the respective single displacement portions, and the detection circuit may detect at least an applied force or moment, in accordance with changes in respective capacitance values of the six capacitive elements.

In these cases, with the capacitive elements, it is possible to detect at least an applied force or moment with high precision, in accordance with the differences between the changes in the capacitance value of these capacitive elements.

Further, the two displacement bodies including the first displacement portions and the second displacement portions may be disposed adjacent to each other via one of the fixed portions, the two displacement bodies each including a first connecting body that connects the tilting portion of the deformable body and the beam, the first displacement portion and the second displacement portion being disposed on both sides of the first connecting body, and the two displacement bodies including the single displacement portions may be disposed adjacent to each other via the other one of the fixed portions, the two displacement bodies each including a second connecting body that connects the tilting portion of the deformable body and the beam, each displacement portion being disposed at a position ahead of the corresponding second connecting body or at a position behind the corresponding second connecting body in the closed-loop path.

In these cases, with the capacitive elements, it is also possible to detect at least an applied force or moment with high precision, in accordance with the differences between the changes in the capacitance value of these capacitive elements.

Of the four displacement bodies, each of the displacement bodies including the first displacement portions and the second displacement portions may include a first connecting body that connects the corresponding tilting portion and the beam, and the first displacement portion and the second displacement portion may be disposed symmetrically with respect to the connecting portion between the first connecting body and the beam.

In this case, if the displacement of the tilting portion in the longitudinal direction can be ignored, the displacement caused in the first displacement portion and the displacement caused in the second displacement portion are of the same magnitude but have different signs from each other. Thus, at least an applied force or moment can be detected through a simple calculation.

Alternatively, in each of the displacement bodies including the first displacement portions and the second displacement portions among the four displacement bodies, a displacement caused in the tilting portion and a displacement caused in one of the first displacement portion and the second displacement portion when a force in a particular direction acts on the force receiving portion may be in the opposite directions from each other and be of the same size, to prevent the one of the displacement portions from being displaced.

Alternatively, each of the four displacement bodies may include a single displacement portion on the corresponding beam, the capacitive elements may include four capacitive elements disposed one by one at the respective displacement portions, and each displacement body may include a connecting body that connects the tilting portion of the deformable body and the beam, and, in the circumferential direction of the deformable body, each displacement portion may be disposed at a position ahead of the corresponding connecting body or at a position behind the corresponding connecting body.

Alternatively, each of the four displacement bodies may include a single displacement portion on the corresponding beam, the capacitive elements may include four capacitive elements disposed one by one at the respective displacement portions, each displacement body may include a connecting body that connects the tilting portion of the deformable body and the beam, and each displacement portion may be disposed at a position closer to the adjacent force receiving portion than to the corresponding connecting body.

In these cases, when the tilting portion is displaced in the longitudinal direction, at least the applied force or moment can be detected through a simple calculation.

The longitudinal direction of each of the tilting portions of the four deformable bodies may extend in a direction intersecting with the X-axis and the Y-axis in an X-Y-Z three-dimensional coordinate system, each of the beams of the four displacement bodies may extend parallel to the X-Y plane, and the detection circuit may detect at least one of applied forces in the respective axis directions and applied moments around the respective axes, in accordance with changes in the respective capacitance values of the at least four capacitive elements.

In this case, the electrode forming the capacitive element can be disposed parallel to the X-Y plane, and thus, a force sensor can be formed with a simple structure.

Also, the force sensor may further include:

a force receiving body that is connected to the two force receiving portions of the deformable body, and receives an applied force and an applied moment; and a fixed body that is disposed to face each displacement body, and is connected to the two fixed portions of the deformable body, wherein each of the capacitive elements may include a displacement electrode disposed on the corresponding beam, and a fixed electrode disposed on the fixed body to face the displacement electrode.

In this case, it is possible to transmit applied forces and moments to the deformable body without fail.

The closed-loop deformable body may have a rectangular or ring-like shape. In this case, the deformable body has a symmetrical structure, and accordingly, the calculation for detecting applied forces and moments is easy.

The closed-loop deformable body may be positioned on the X-Y plane to surround the origin of an X-Y-Z three-dimensional coordinate system, the two force receiving portions may be positioned symmetrically with respect to the origin on the X-axis, and the two fixed portions may be positioned symmetrically with respect to the origin on the Y-axis.

In this case, the respective capacitive elements are symmetrically arranged, and accordingly, the calculation for detecting applied forces and moments is even easier.

A third mode of a force sensor according to the present invention includes:

a deformable body that is a closed-loop deformable body, the deformable body including: four force receiving portions; four fixed portions arranged together with the four force receiving portions alternately along a closed-loop path; and eight deformable portions that connect the force receiving portions and the fixed portions adjacent to one another along the closed-loop path, and are elastically deformed by a force and a moment acting on the force receiving portions;

eight displacement bodies that are connected to the respective deformable portions, and are displaced by elastic deformation caused in the deformable portions; and a detection circuit that detects at least one of an applied force and an applied moment, in accordance with displacements caused in the eight displacement bodies, wherein the eight deformable portions each include:

a tilting portion that has a longitudinal direction and is disposed between the force receiving portion and the fixed portion;

a first deformable portion that connects the corresponding force receiving portion and the tilting portion; and a second deformable portion that connects the corresponding fixed portion and the tilting portion, the first deformable portion extends in a direction intersecting with the longitudinal direction on one side of the tilting portion, the second deformable portion extends in a direction intersecting with the longitudinal direction on the other side of the tilting portion, the connecting portion between the first deformable portion and the tilting portion, and the connecting portion between the second deformable portion and the tilting portion differ in position in the longitudinal direction of the tilting portion, the eight displacement bodies are connected one by one to the respective tilting portions, and are at a distance from the respective fixed portions, the eight displacement bodies each including a displacement portion that is displaced by a tilting movement of the tilting portion, and the detection circuit includes at least eight capacitive elements disposed at least one each at the respective displacement portions, and detects at least one of an applied force and an applied moment in accordance with changes in capacitance values of the at least eight capacitive elements.

With such a configuration, the displacement caused in the tilting portion can be easily amplified by the action of the displacement portion that is displaced by the tilting movement of the tilting portion. Further, with the capacitive elements, it is possible to detect applied forces, in accordance with the differences between the changes in the capacitance value of these capacitive elements. That is, according to the present invention, it is possible to provide a force sensor that is inexpensive but highly sensitive, and is hardly affected by temperature changes and in-phase noise in the use environment.

Each of the eight displacement body may include a beam that extends in a direction intersecting with the longitudinal direction of the corresponding tilting portion. In this case, it is possible to effectively amplify the tilting movement caused in the tilting portion.

Each of the displacement portions of the eight displacement bodies may include a first displacement portion and a second displacement portion defined at different positions from each other on the corresponding beam, the capacitive elements may include a total of 16 capacitive elements, the 16 capacitive elements being eight first capacitive elements disposed at the first displacement portions of the respective displacement bodies, and eight second capacitive elements disposed at the second displacement portions of the respective displacement bodies, and the detection circuit may detect at least an applied force or moment, in accordance with changes in respective capacitance values of the 16 capacitive elements.

In this case, with the capacitive elements, it is possible to detect applied forces with high precision, in accordance with the differences between the changes in the capacitance value of these capacitive elements.

Each of the eight displacement bodies may include a connecting body that connects the corresponding tilting portion and the beam, and the first displacement portion and the second displacement portion of each displacement body may be disposed symmetrically with respect to the connecting portion between the connecting body and the beam.

In this case, if the tilting portion is not displaced in its longitudinal direction, the displacement caused in the first displacement portion and the displacement caused in the second displacement portion are of the same magnitude but have different signs from each other. Thus, the applied force can be detected through a simple calculation.

In each of the eight displacement bodies, the displacement caused in the tilting portion and the displacement caused in one of the first displacement portion and the second displacement portion when a force in a particular direction acts on the force receiving portion may be in opposite directions from each other and be of the same size, to prevent the one of the displacement portions from being displaced.

In this case, the first displacement portion or the second displacement portion is disposed in such a position that the first displacement portion or the second displacement portion is not displaced when the tilting portion is displaced in its longitudinal direction. Thus, the applied force can be detected through a simple calculation.

Each of the eight displacement bodies may include a single displacement portion on the corresponding beam, the capacitive elements may include eight capacitive elements disposed one by one at the respective displacement portions, each of the displacement bodies may include a second connecting body that connects the tilting portion of the deformable body and the beam, the four displacement portions disposed adjacent to two fixed portions not adjacent to each other among the four fixed portions may be located on the side of the fixed portions relative to the corresponding second connecting body, and the four displacement portions disposed adjacent to the remaining two of the four fixed portions may be located on the opposite side of the corresponding second connecting body from the fixed portions.

In this case, the first displacement portion or the second displacement portion is also disposed in such a position that the first displacement portion or the second displacement portion is not displaced when the tilting portion is displaced in its longitudinal direction. Thus, the applied force can be detected through a simple calculation.

The longitudinal direction of each of the tilting portions of the eight deformable portions may extend in a direction intersecting with the X-axis and the Y-axis in an X-Y-Z three-dimensional coordinate system, each of the first deformable portions and the second deformable portions of the eight deformable portions, and each of the beams of the eight displacement bodies may extend parallel to the X-axis, and the detection circuit may detect at least one of applied forces in respective axis directions or applied moments around respective axes, in accordance with changes in the respective capacitance values of the at least eight capacitive elements, In this case, the electrodes forming the capacitive elements can be disposed parallel to the X-Y plane, and thus, a force sensor can be formed with a simple structure.

The force sensor may further include:

a force receiving body that is connected to the four force receiving portions of the deformable body, and receives an applied force and an applied moment; and a fixed body that is disposed to face the beam of each displacement body, and is connected to the four fixed portions of the deformable body, wherein each of the capacitive elements may include a displacement electrode disposed on the corresponding beam, and a fixed electrode disposed on the fixed body to face the displacement electrode.

In this case, it is possible to transmit the applied force to the deformable body without fail.

The closed-loop deformable body may have a rectangular or ring-like shape. In this case, the deformable body has a symmetrical structure, and accordingly, the calculation for detecting the applied force is easy.

The closed-loop deformable body may be positioned on the X-Y plane to surround the origin of an X-Y-Z three-dimensional coordinate system, two of the four force receiving portions may be disposed symmetrically with respect to the origin on the X-axis, the remaining two of the four force receiving portions may be disposed symmetrically with respect to the origin on the Y-axis, when a V-axis and a W-axis that pass through the origin and are at 45 degrees to the X-axis and the −Y axis are defined on the X-Y plane, two of the four fixed portions may be disposed symmetrically with respect to the origin on the V-axis, and the remaining two of the four fixed portions may be disposed symmetrically with respect to the origin on the W-axis.

In this case, the deformable body has high symmetry, and accordingly, the calculation for detecting the applied force is easier.

The beam having only the single displacement portion may be designed as a cantilever beam supported by the second connecting body. In this case, the structure of the force sensor can be simplified.

The closed-loop deformable body may be positioned on the X-Y plane to surround the origin of the X-Y-Z three-dimensional coordinate system, and the force receiving body may be disposed so that at least part of the force receiving body overlaps with the deformable body when viewed from the Z-axis direction.

In this case, the external size of the deformable body and the external size of the sensor are substantially the same when viewed from the Z-axis direction, and thus, the force sensor can be made smaller in size.

Alternatively, the closed-loop deformable body may be positioned on the X-Y plane to surround the origin of the X-Y-Z three-dimensional coordinate system, and the force receiving body may be disposed on the X-Y plane to surround the outer circumference of the deformable body.

In this case, the deformable body and the force receiving body are disposed in the same plane, and thus, the size of the force sensor in the Z-axis direction can be made smaller (thinner).

In the above force sensor, the deformable body may be disposed on the X-Y plane in an X-Y-Z three-dimensional coordinate system, the longitudinal direction of the tilting portion may be a direction parallel to the Z-axis, the first deformable portion may connect the force receiving portion and the end portion of the tilting portion on the negative Z-axis side, and the second deformable portion may connect the fixed portion and the end portion of the tilting portion on the positive Z-axis side.

Alternatively, the deformable body may be disposed on the X-Y plane in an X-Y-Z three-dimensional coordinate system, the longitudinal direction of the tilting portion may be a direction parallel to the Z-axis, the first deformable portion may connect the force receiving portion and the end portion of the tilting portion on the positive Z-axis side, and the second deformable portion may connect the fixed portion and the end portion of the tilting portion on the negative Z-axis side.

In these cases, the tilting portion can be effectively tilted by the force acting on the force receiving portion.

The displacement body may be attached to the end portion of the tilting portion of the deformable body on the negative Z-axis side.

Alternatively, the displacement body may be attached to a middle portion between the two end portions of the tilting portion in the longitudinal direction, the middle portion being of the tilting portion of the deformable body.

In either case, the tilting movement of the tilting portion can be transmitted to the beam without fail.

Alternatively, the deformable body may be disposed on the X-Y plane in an X-Y-Z three-dimensional coordinate system, the longitudinal direction of the tilting portion may be a direction intersecting with the Z-axis, the first deformable portion may connect the force receiving portion and one end portion of the tilting portion, and the second deformable portion may connect the fixed portion and the other end portion of the tilting portion.

With such a configuration, the tilting portion can be effectively tilted by the force acting on the force receiving portion.

Advantageous Effects of Invention

According to the present invention, it is possible to provide a force sensor that is inexpensive but highly sensitive, and is hardly affected by temperature changes and in-phase noise in the use environment.

BRIEF DESCRIPTION OF DRAWINGS

FIG. 17 is a table as a list that shows the displacements caused in the respective displacement bodies of the basic structure in FIG. 8 in a case where forces in the respective axis directions and moments in the respective axis directions in the X-Y-Z three-dimensional coordinate system act on the force receiving portions.

FIG. 20 is a table as a list that shows increases/decreases in the capacitance values of the respective capacitive elements in a case where forces in the respective axis directions and moments around the respective axes in the X-Y-Z three-dimensional coordinate system act on the force receiving portions.

FIG. 21 is a table as a list showing the other-axis sensitivities of forces in the respective axis directions and moments around the respective axes in the force sensor shown in FIG. 18.

FIG. 23 is a table as a list showing changes in the capacitance values of respective capacitive elements in a case where four components of forces and moments act on the force sensor shown in FIG. 22.

FIG. 24 is a table as a list showing the other-axis sensitivities of four components of forces and moments in the force sensor shown in FIG. 22.

FIG. 27 is a table as a list showing changes in the capacitance values of respective capacitive elements in a case where four components of forces and moments act on the force sensor shown in FIG. 26.

FIG. 35 is a table as a list showing the directions of the tilting movements of the respective tilting portions and the displacements caused in the respective displacement portions of the basic structure in FIG. 29 in a case where forces in the respective axis directions and moments in the respective axis directions in the X-Y-Z three-dimensional coordinate system act on force receiving portions.

FIG. 38 is a table as a list showing changes in the capacitance values of respective capacitive elements in a case where six components of forces and moments act on the force sensor shown in FIG. 36.

FIG. 39 is a table as a list showing the other-axis sensitivities of four components of forces and moments in the force sensor shown in FIG. 36.

FIG. 42 is a table as a list showing changes in the capacitance values of respective capacitive elements in a case where six components of forces and moments act on the force sensor shown in FIG. 40.

FIG. 43 is a table as a list showing the other-axis sensitivities of the six components of forces and moments in the force sensor shown in FIG. 40.

FIG. 45 is a table as a list showing the directions of the tilting movements of the respective tilting portions and the displacements caused in the respective displacement portions of the force sensor shown in FIG. 44 in a case where forces in the respective axis directions and moments in the respective axis directions in the X-Y-Z three-dimensional coordinate system act on force receiving portions.

FIG. 50 is a table as a list showing the changes caused in the capacitance values of the capacitive elements when forces in the respective axis directions and moments around the respective axes act on a force sensor according to a modification of FIG. 47.

FIG. 51 is a table as a list showing the other-axis sensitivities of six components of forces and moments in the force sensor corresponding to FIG. 50.

FIG. 52 is a table as a list showing the other-axis sensitivities of components in the force sensor corresponding to FIG. 50 in a case where the other-axis sensitivities are calculated according to different expressions from those in the case of FIG. 51.

FIG. 53 is a table as a list showing the changes caused in the capacitance values of the capacitive elements when forces in the respective axis directions and moments around the respective axes act on a force sensor according to a further modification of FIG. 47.

FIG. 54 is a table as a list showing the other-axis sensitivities of six components of forces and moments in the force sensor corresponding to FIG. 53.

DESCRIPTION OF EMBODIMENTS

§ 1. Force Sensor According to a First Embodiment of the Present Invention

<1-1. Configuration of a Basic Structure>

Referring to the accompanying drawings, a force sensor according to a first embodiment of the present invention is described.

Figure 1:
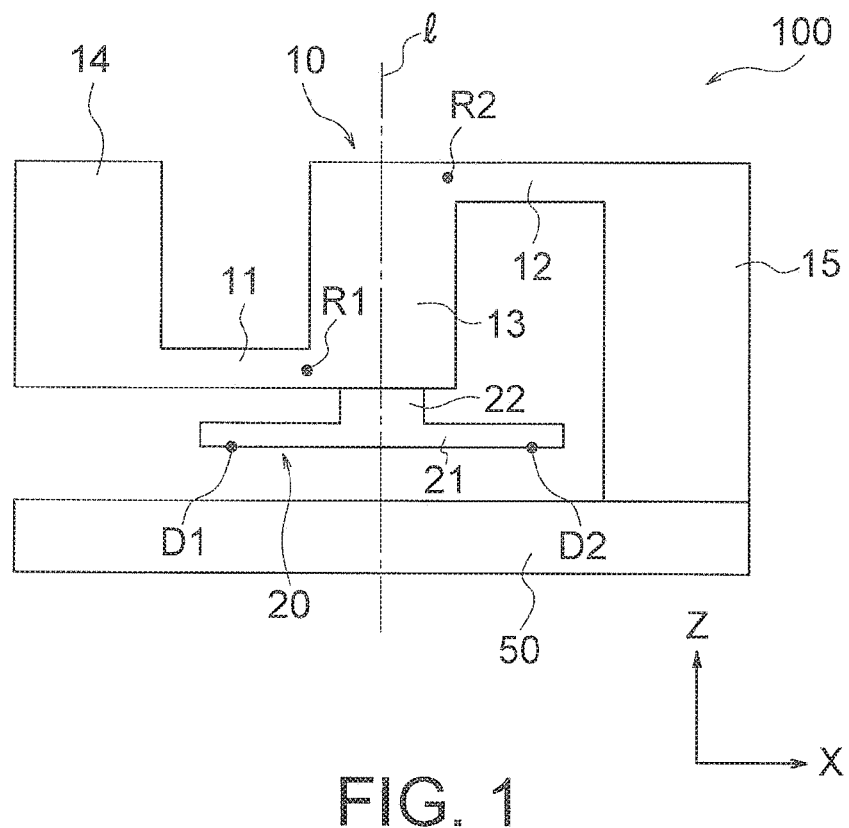
FIG. 1 is a schematic front view of the basic structure of a force sensor according to an embodiment of the present invention.
Figure 2:
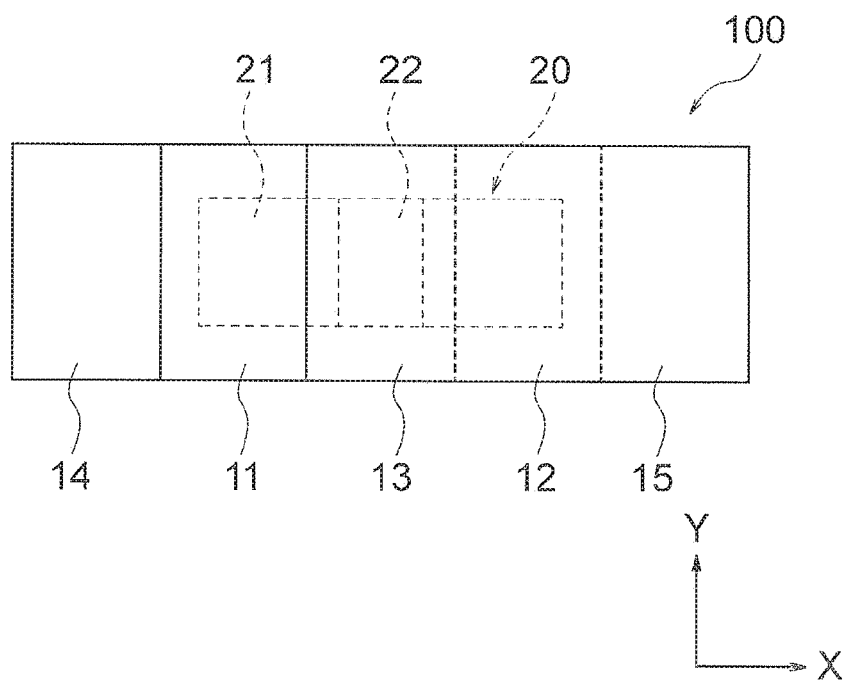
FIG. 2 is a schematic top view of the basic structure shown in FIG. 1.

FIG. 1 is a schematic front view of a basic structure 100 of a force sensor according to one embodiment of the present invention. FIG. 2 is a schematic top view of the basic structure 100. This embodiment is described below, with the X-Y-Z three-dimensional coordinate system being defined as shown in FIGS. 1 and 2.

As shown in FIGS. 1 and 2, the basic structure 100 includes: a deformable body 10 that has a force receiving portion 14 and a fixed portion 15, and causes elastic deformation with a force acting on the force receiving portion 14; and a displacement body 20 that is connected to the deformable body 10 and causes displacement through elastic deformation caused in the deformable body 10. The force receiving portion 14 is a portion for receiving a force to be detected, and the fixed portion 15 is a portion that does not displace even when a force acts on the force receiving portion 14.

As shown in FIGS. 1 and 2, the deformable body 10 includes: a tilting portion 13 has a longitudinal direction 1 parallel to the Z-axis, and is disposed between the force receiving portion 14 and the fixed portion 15; a first deformable portion 11 connecting the force receiving portion 14 and the tilting portion 13; and a second deformable portion 12 connecting the fixed portion 15 and the tilting portion 13. As shown in the drawing, the first deformable portion 11 extends in a direction intersecting with the longitudinal direction 1 on one side (the left side in FIGS. 1 and 2) of the tilting portion 13. On the other hand, the second deformable portion 12 extends in the direction intersecting with the longitudinal direction 1 on the other side (the right side in FIGS. 1 and 2) of the tilting portion 13. In the example illustrated in the drawing, the direction intersecting with the longitudinal direction 1 is the X-axis direction.

Further, the connecting portion R1 between the first deformable portion 11 and the tilting portion 13, and the connecting portion R2 between the second deformable portion 12 and the tilting portion 13 differ in position in the longitudinal direction 1 of the tilting portion 13. Specifically, the connecting portion R1 is located in the vicinity of the end portion on the negative Z-axis side (the lower end portion in FIG. 1) of the tilting portion 13, and the connecting portion R2 is located in the vicinity of the end portion on the positive Z-axis side (the upper end portion in FIG. 1) of the tilting portion 13.

As shown in FIGS. 1 and 2, both the force receiving portion 14 and the fixed portion 15 extend parallel to the Z-axis. The respective upper end portions of the force receiving portion 14, the tilting portion 13, and the fixed portion 15 have the same position in the Z-axis direction.

The respective lower end portions of the force receiving portion 14 and the tilting portion 13 also have the same position in the Z-axis direction. The lower end portion of the force receiving portion 14 and the lower end portion of the tilting portion 13 are connected by the first deformable portion 11 extending parallel to the X-axis, and the upper end portion of the tilting portion 13 and the upper end portion of the fixed portion 15 are connected by the second deformable portion 12 extending parallel to the X-axis. Further, the lower end portion of the fixed portion 15 is connected to a support 50 disposed to face the tilting portion 13 at a predetermined distance.

As shown in FIGS. 1 and 2, the displacement body 20 has a beam 21 connected to the tilting portion 13 via a connecting body 22 attached to the lower end of the tilting portion 13. The beam 21 extends in a direction orthogonal to the longitudinal direction 1 of the tilting portion 13, and has a symmetrical shape when viewed from the Y-axis direction. The beam 21 is at a distance from the fixed portion 15 and the force receiving portion 14 of the deformable body 10 so that tilting (turning) of the beam 21 is not hindered by the fixed portion 15 and the force receiving portion 14. In the beam 21, a first displacement portion D1 and a second displacement portion D2 are defined symmetrically with respect to the connecting portion between the beam 21 and the connecting body 22. As will be described later, capacitive elements are disposed in the first displacement portion D1 and the second displacement portion D2 so that a force acting on the force receiving portion 14 is detected.

<1-2. Operation of the Basic Structure>

Next, operation of the above basic structure 100 is described.

Figure 3:
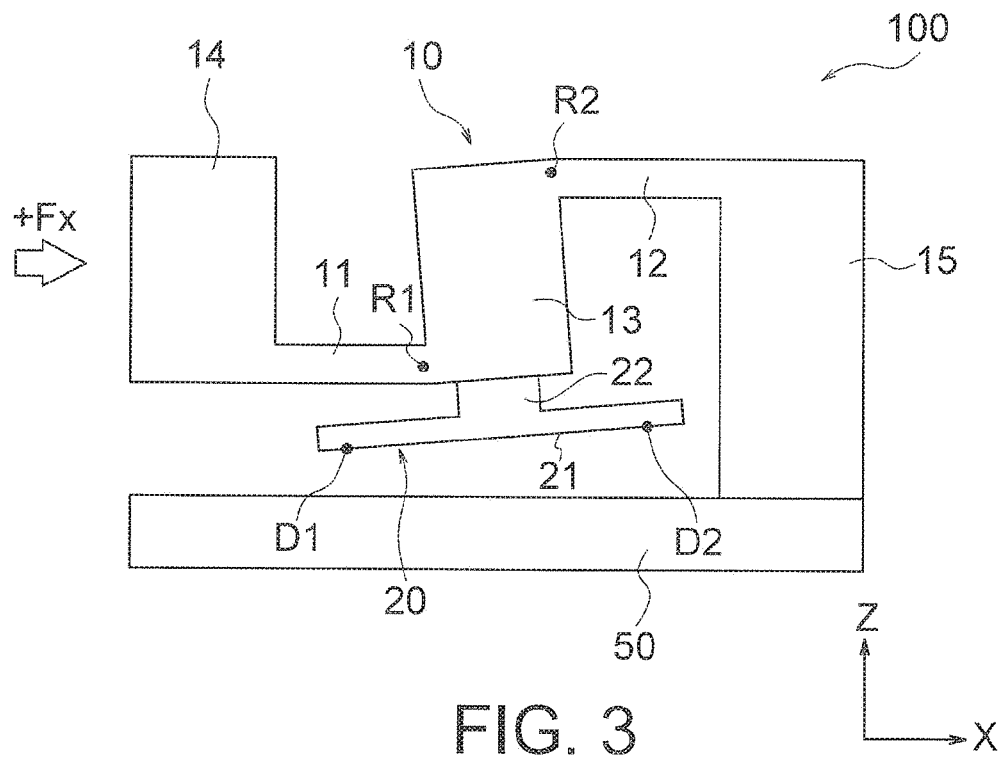
FIG. 3 is a schematic front view of the basic structure in a deformed state when a force +Fx in the positive X-axis direction acts on a force receiving portion.
Figure 4:
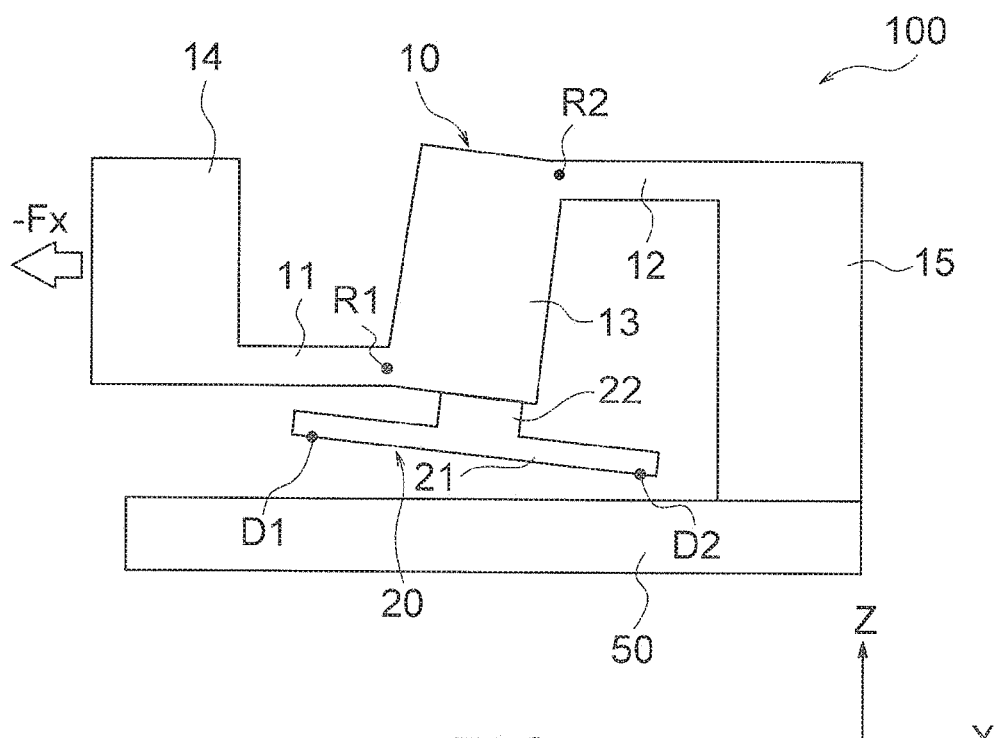
FIG. 4 is a schematic front view of the basic structure in a deformed state when a force −Fx in the negative X-axis direction acts on the force receiving portion.
Figure 5:
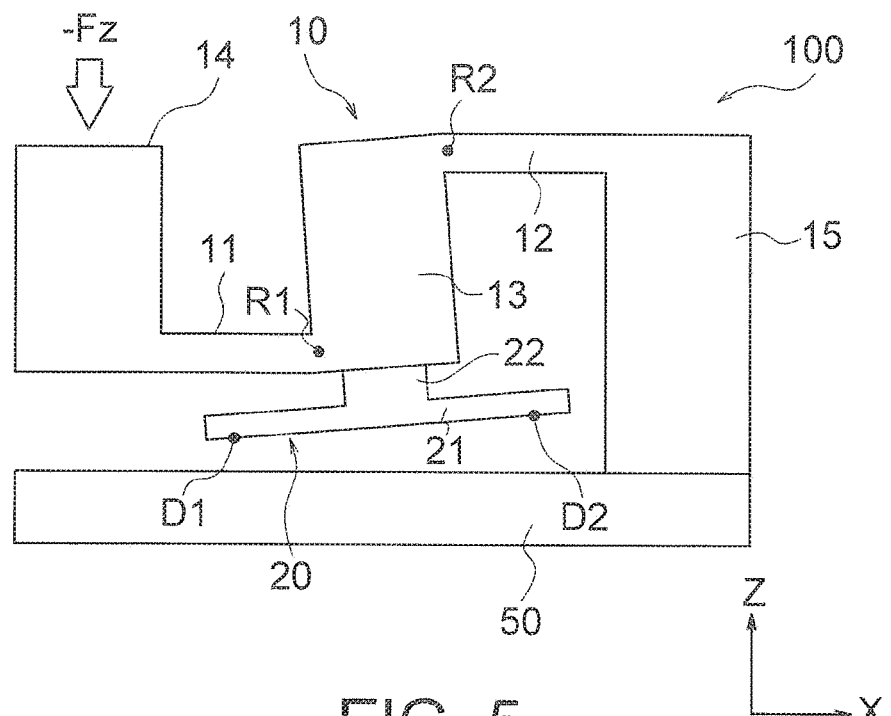
FIG. 5 is a schematic front view of the basic structure in a deformed state when a force −Fz in the negative Z-axis direction acts on the force receiving portion.
Figure 6:
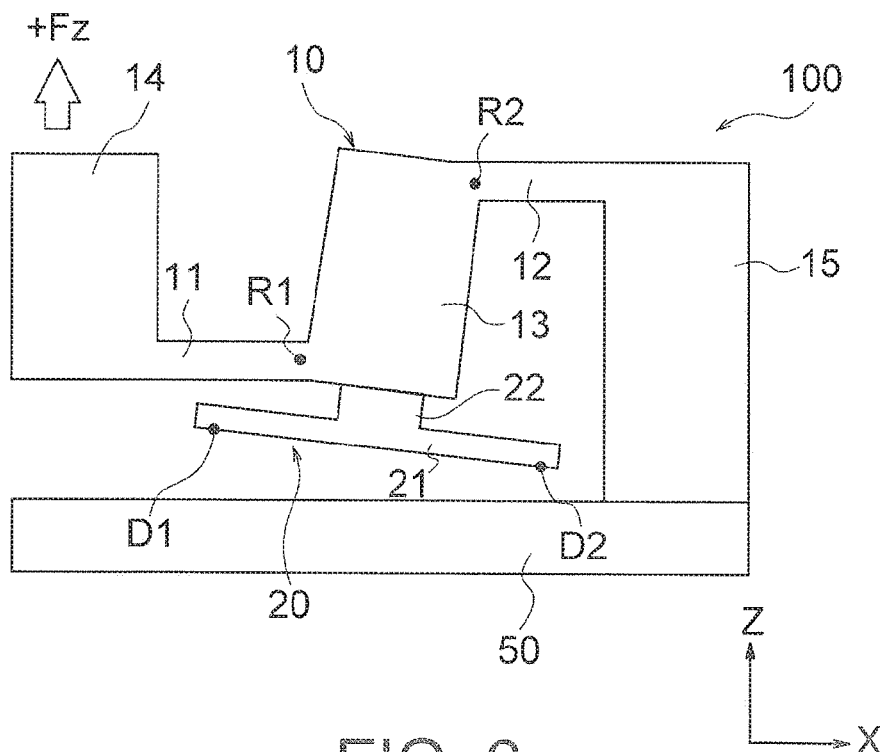
FIG. 6 is a schematic front view of the basic structure in a deformed state when a force +Fz in the positive Z-axis direction acts on the force receiving portion.

FIG. 3 is a schematic front view of the basic structure 100 in a deformed state when a force +Fx in the positive X-axis direction acts on the force receiving portion 14. FIG. 4 is a schematic front view of the basic structure 100 in a deformed state when a force −Fx in the negative X-axis direction acts on the force receiving portion 14. FIG. 5 is a schematic front view of the basic structure 100 in a deformed state when a force −Fz in the negative Z-axis direction acts on the force receiving portion 14. FIG. 6 is a schematic front view of the basic structure 100 in a deformed state when a force +Fz in the positive Z-axis direction acts on the force receiving portion 14.

(1-2-1, Where a Force +Fx is Applied)

When a force +Tx in the positive X-axis direction acts on the force receiving portion 14, a force in the positive X-axis direction (the rightward direction in FIG. 3) acts on the connecting portion R1 in the vicinity of the lower end of the tilting portion 13, and a force in the negative X-axis direction (the leftward direction in FIG. 3) acts as a reaction of the applied force +Fx on the connecting portion R2 in the vicinity of the upper end of the tilting portion 13. Because of the actions of these forces, the tilting portion 13 tilts counterclockwise as shown in FIG. 3. Both the first deformable portion 11 and the second deformable portion 12 are of course compressively deformed by the action of the applied force +Fx, and accordingly, the entire tilting portion 13 is slightly displaced in the positive X-axis direction.

Due to such tilting movement of the tilting portion 13, the beam 21 connected to the lower end of the tilting portion 13 also tilts counterclockwise as shown in FIG. 3. As a result, the first displacement portion D1 of the beam 21 is displaced in the direction (the downward direction in FIG. 3) in which the distance to the support 50 decreases, and the second displacement portion D2 is displaced in the direction (the upward direction in FIG. 3) in which the distance to the support 50 increases.

(1-2-2. Where a Force −Fx is Applied)

When a force −Fx in the negative X-axis direction acts on the force receiving portion 14, on the other hand, a force in the negative X-axis direction (the leftward direction in FIG. 4) acts on the connecting portion R1 in the vicinity of the lower end of the tilting portion 13, and a force in the positive X-axis direction (the rightward direction in FIG. 4) acts as a reaction of the applied force −Fx on the connecting portion R2 in the vicinity of the upper end of the tilting portion 13. Because of the actions of these forces, the tilting portion 13 tilts clockwise as shown in FIG. 4. Both the first deformable portion 11 and the second deformable portion 12 are of course tensile-deformed by the action of the applied force −Fx, and accordingly, the entire tilting portion 13 is slightly displaced in the negative X-axis direction.

Due to such tilting movement of the tilting portion 13, the beam 21 connected to the lower end of the tilting portion 13 also tilts clockwise as shown in FIG. 4. As a result, the first displacement portion D1 of the beam 21 is displaced in the direction (the upward direction in FIG. 4) in which the distance to the support 50 increases, and the second displacement portion D2 is displaced in the direction (the downward direction in FIG. 4) in which the distance to the support 50 decreases.

(1-2-3. Where a Force −Fz is Applied)

When a force −Fz in the negative Z-axis direction acts on the force receiving portion 14, a force in the negative Z-axis direction (the downward direction in FIG. 5) acts on the connecting portion R1 at the lower left end of the tilting portion 13, and a force in the positive Z-axis direction (the upward direction in FIG. 5) acts as a reaction of the applied force −Fz on the connecting portion R2 at the upper right end of the tilting portion 13. Because of the actions of these forces, the tilting portion 13 tilts counterclockwise as shown in FIG. 5. Furthermore, because of the action of the applied force −Fz, the tilting portion 13 is pulled downward in the negative Z-axis direction via the first deformable portion 11, and accordingly, the entire tilting portion 13 is slightly displaced in the negative Z-axis direction.

Due to the tilting movement of the tilting portion 13, the beam 21 connected to the lower end of the tilting portion 13 also tilts counterclockwise as shown in FIG. 5. As a result, the first displacement portion D1 of the beam 21 is displaced in the direction (the downward direction in FIG. 5) in which the distance to the support 50 decreases, and the second displacement portion D2 is displaced in the direction (the upward direction in FIG. 5) in which the distance to the support 50 increases.

Depending on the length of the beam 21, the displacement of the second displacement portion D2 in the positive Z-axis direction might be smaller than the displacement of the entire beam 21 in the negative Z-axis direction, and the distance between the second displacement portion D2 and the support 50 might decrease. However, the beam 21 has a sufficient length in this example, and such a situation does not occur.

(1-2-4. Where a Force +Fz is Applied)

When a force +Fz in the positive Z-axis direction acts on the force receiving portion 14, a force in the positive Z-axis direction (the upward direction in FIG. 6) acts on the connecting portion R1 at the lower left end of the tilting portion 13, and a force in the negative Z-axis direction (the downward direction in FIG. 6) acts as a reaction of the applied force +Fz on the connecting portion R2 at the upper right end of the tilting portion 13. Because of the actions of these forces, the tilting portion 13 tilts clockwise as shown in FIG. 6. Because of the action of the applied force +Fz, the tilting portion 13 is of course pulled upward in the positive Z-axis direction via the first deformable portion 11, and accordingly, the entire tilting portion 13 is slightly displaced in the positive Z-axis direction.

Due to such tilting movement of the tilting portion 13, the beam 21 connected to the lower end of the tilting portion 13 also tilts clockwise as shown in FIG. 6. As a result, the first displacement portion D1 of the beam 21 is displaced in the direction (the upward direction in FIG. 6) in which the distance to the support 50 increases, and the second displacement portion D2 is displaced in the direction (the downward direction in FIG. 6) in which the distance to the support 50 decreases.

Depending on the length of the beam 21, the displacement of the second displacement portion D2 in the negative Z-axis direction might be smaller than the displacement of the entire beam 21 in the positive Z-axis direction, and the distance between the second displacement portion D2 and the support 50 might increase. However, the beam 21 has a sufficient length in this example, and such a situation does not occur.

In any of the above cases, the displacement caused in the first displacement portion D1 and the second displacement portion D2 is larger than the displacement caused in the lower end of the tilting portion 13. That is, because of the existence of the beam 21, the displacement caused in the lower end portion of the tilting portion 13 is amplified and taken out as the displacement in the Z-axis direction at each of the displacement portions D1 and D2 of the beam 21.

<1-3. Structure of a Force Sensor>

Next, the structure of a force sensor 100c including the basic structure 100 described above in 1-1 and 1-2 is described.

Figure 7:
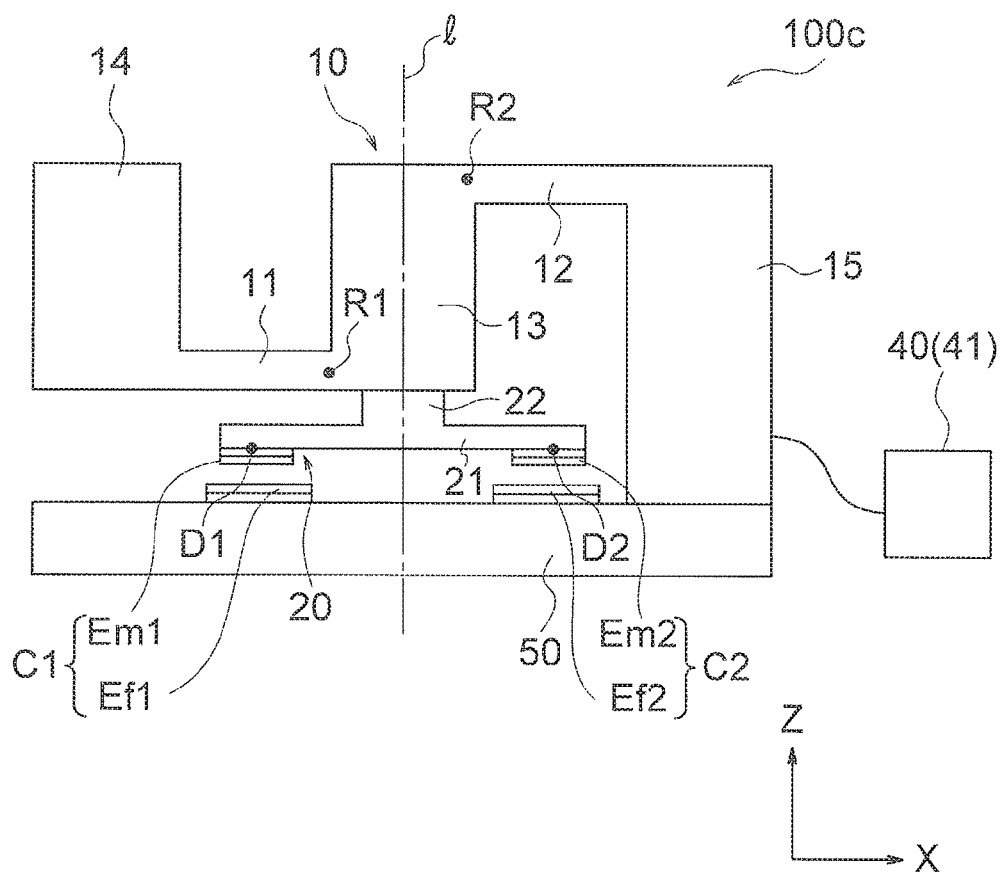
FIG. 7 is a schematic front view of an example of a force sensor that adopts the basic structure shown in FIG. 1.

FIG. 7 is a schematic front view of an example of the force sensor 100c that adopts the basic structure 100 shown in FIG. 1.

As shown in FIG. 7, the force sensor 100c includes the above described basic structure 100 and a detection circuit 40 that detects an applied force in accordance with displacements caused in the first displacement portion D1 and the second displacement portion D2 of the beam 21 of the basic structure 100. As shown in FIG. 7, the detection circuit 40 of this embodiment includes: a first capacitive element C1 disposed at the first displacement portion D1; a second capacitive element C2 disposed at the second displacement portion D2; and a measuring unit 41 that is connected to the capacitive elements C1 and C2, and measures the applied force in accordance with changes in the capacitance values of the capacitive elements C1 and C2.

As shown in FIG. 7, the first capacitive element C1 includes: a first displacement electrode Em1 disposed on the first displacement portion D1 of the beam 21 via an insulator; and a first fixed electrode Ef1 disposed on the support 50 via an insulator in such a manner as to face the first displacement electrode Em1. Likewise, the second capacitive element C2 includes: a second displacement electrode Em2 disposed on the second displacement portion D2 of the beam 21 via an insulator; and a second fixed electrode Ef2 disposed on the support 50 via an insulator in such a manner as to face the second displacement electrode Em2. Although not clearly shown in FIG. 7, these capacitive elements C1 and C2 are connected to the measuring unit 41 by a predetermined circuit, and the capacitance values of the capacitive elements C1 and C2 are supplied to the measuring unit 41.

In the drawing, the first displacement electrode Em1, the second displacement electrode Em2, the first fixed electrode Ef1, and the second fixed electrode Ef2 are formed with individual electrodes. In other embodiments, however, the first displacement electrode Em1 and the second displacement electrode Em2, or the first fixed electrode Ef1 and the second fixed electrode Ef2 may be formed with a common electrode. This also applies to the other embodiments described in § 2 and later.

<1-4. Operation of the Force Sensor>

Next, operation of the force sensor 100c described in 1-3 is described.

(1-4-1. Where a Force Fx is Applied)

When a force +Tx in the positive X-axis direction acts on the force receiving portion 14 of the force sensor 100c, the distance between the first displacement electrode Em1 and the first fixed electrode ET1 decreases in the first capacitive element C1, and the distance between the second displacement electrode Em2 and the second fixed electrode Ef2 increases in the second capacitive element C2, as can be seen from the behavior of the beam 21 described in 1-2 with reference to FIG. 3. That is, the capacitance value of the first capacitive element C1 increases, and the capacitance value of the second capacitive element C2 decreases.

In this embodiment, the first capacitive element C1 and the second capacitive element C2 are arranged at equal distances from the center of tilting movement of the beam 21, as can be seen from the layout of the first displacement portion D1 and the second displacement portion D2. Accordingly, the magnitude ($|\Delta C1|$) of the change in the capacitance value of the first capacitive element C1 is equal to the magnitude ($|\Delta C2|$) of the change in the capacitance value of the second capacitive element C2. Because of this, where $|\Delta C1|=|\Delta C2|=\Delta C$, the respective capacitance values $C1a$ and $C2a$ of the first capacitive element C1 and the second capacitive element C2 at a time when a force +Fx is applied are expressed by [Expression 1] shown below.

In [Expression 1], C1 and C2 represent the capacitance values of the first and second capacitive elements C1 and C2, respectively, at a time when no force is applied. This also applies to each of the expressions that will be shown later.

$$C1a = C1 + \Delta C$$

$$C2a = C2 - \Delta C \quad \text{[Expression 1]}$$

In accordance with such changes in the capacitance values, the measuring unit 41 measures the applied force +Fx by using the following [Expression 2]. In [Expression 2], the force and the capacitance values are connected with "=". However, these are different physical quantities, and therefore, the force +Fx is measured after predetermined conversion is performed. This notation is used not only in [Expression 2] but also in the expressions that will be shown later.

$$+Fx = C1 - C2 \quad \text{[Expression 2]}$$

When a force −Fx in the negative X-axis direction acts on the force receiving portion 14 of the force sensor 100c, on the other hand, the distance between the first displacement electrode Em1 and the first fixed electrode Ef1 increases in the first capacitive element C1, and the distance between the second displacement electrode Em2 and the second fixed electrode Ef2 decreases in the second capacitive element C2, as can be seen from the behavior of the beam 21 described in 1-2 with reference to FIG. 4. That is, the capacitance value of the first capacitive element C1 decreases, and the capacitance value of the second capacitive element C2 increases. In short, all the signs should be the opposite of those in the above described case where the force +Fx is applied.

Therefore, the measuring unit 41 measures the applied force −Fx according to the following [Expression 3], $$-Fx = C2 - C1 \quad \text{[Expression 3]}$$

In other words, [Expression 2] and [Expression 3] are the same arithmetic expressions, and, in either case, the applied force Fx is measured according to the expression, Fx=C1−C2.

(1-4-2. Where a Force Fz is Applied)

When a force −Fz in the negative Z-axis direction acts on the force receiving portion 14 of the force sensor 100c, on the other hand, the distance between the first displacement electrode Em1 and the first fixed electrode Ef1 decreases in the first capacitive element C1, and the distance between the second displacement electrode Em2 and the second fixed electrode Ef2 increases in the second capacitive element C2, as can be seen from the behavior of the beam 21 described in 1-2 with reference to FIG. 5. That is, the capacitance value of the first capacitive element C1 increases, and the capacitance value of the second capacitive element C2 decreases.

More specifically, the displacement caused in the first displacement portion D1 when the force −Fz is applied is the sum of the overall displacement of the above described tilting portion 13 in the negative Z-axis direction and the displacement in the negative Z-axis direction due to the tilting movement of the beam 21, and the displacement caused in the second displacement portion D2 is the sum of the overall displacement of the tilting portion 13 in the negative Z-axis direction and the displacement in the positive Z-axis direction due to the tilting movement of the beam 21. In other words, if the changes in the capacitance values of the respective capacitive elements C1 and C2 are more accurately described, in the first capacitive element C1, the overall displacement of the tilting portion 13 in the negative Z-axis direction is added to the displacement due to the tilting movement of the beam 21, and therefore, the distance between the first displacement electrode Em1 and the first fixed electrode Ef1 greatly degreases. In the second capacitive element C2, on the other hand, the displacement due to the tilting movement of the beam 21 is offset by the overall displacement of the tilting portion 13 in the negative Z-axis direction, and therefore, the distance between the second displacement electrode Em2 and the second fixed electrode Ef2 slightly increases.

However, for simplicity, the length of the beam 21 in the Z-axis direction is sufficiently greater than the length (height) of the tilting portion 13 in the Z-axis direction as described above, so that the magnitude ($|\Delta C1|$) of the change in the capacitance value of the first capacitive element C1 and the magnitude ($|\Delta C2|$) of the change in the capacitance value of the second capacitive element C2 can be considered to be substantially equal. Accordingly, where $|\Delta C1|=|\Delta C2|=\Delta C$, the respective capacitance values C1b and C2b of the first capacitive element C1 and the second capacitive element C2 at a time when the force −Fz is applied are expressed by the following [Expression 4].

$$C1b = C1 - \Delta C$$

$$C2b = C2 + \Delta C \quad \text{[Expression 4]}$$

In accordance with such changes in the capacitance values, the measuring unit 41 measures the applied force −Fz by using the following [Expression 5].

$$-Fz = C1 - C2 \quad \text{[Expression 5]}$$

When a force +Fz in the positive Z-axis direction acts on the force receiving portion 14 of the force sensor 100c, on the other hand, the distance between the first displacement electrode Em1 and the first fixed electrode Ef1 increases in the first capacitive element C1, and the distance between the second displacement electrode Em2 and the second fixed electrode Ef2 decreases in the second capacitive element C2, as can be seen from the behavior of the beam 21 described in 1-2 with reference to FIG. 6. That is, the capacitance value of the first capacitive element C1 decreases, and the capacitance value of the second capacitive element C2 increases. In this case, the magnitude ($|\Delta C1|$) of the change in the capacitance value of the first capacitive element C1 and the magnitude ($|\Delta C2|$) of the change in the capacitance value of the second capacitive element C2 can be considered to be substantially equal, as in the case where the force −Fz is applied.

Therefore, in accordance with the above changes in the capacitance values, the measuring unit 41 measures the applied force +Fz by using the following [Expression 6].

$$+Fz = C2 - C1 \quad \text{[Expression 6]}$$

In other words, [Expression 5] and [Expression 6] are the same arithmetic expressions, and, in either case, the applied force Fz is measured according to the expression, Fz=C2−C1.

Comparison among the above [Expression 2], [Expression 3], [Expression 5], and [Expression 6] shows that the right side of [Expression 2] is identical to the right side of [Expression 5], and the right side of [Expression 3] is identical to the right side of [Expression 6]. Therefore, as for [Expression 2] and [Expression 5], the measuring unit 41 cannot determine whether the applied force is +Fx or −Fz. Likewise, as for [Expression 3] and [Expression 6], the measuring unit 41 cannot determine whether the applied force is −Fx or +Fz. However, in an environment where forces in only one direction, the X-axis direction or the Z-axis direction, are applied, the measuring unit 41 can measure the direction (the sign) and the magnitude of the applied force through a difference calculation.

According to this embodiment described above, the displacement portions D1 and D2 are displaced by the tilting motion of the tilting portion 13, so that the tilting generated in the tilting portion 13 can be effectively amplified. Thus, the inexpensive but highly sensitive force sensor 1100c can be provided. Further, the measuring unit 41 calculates the capacitance value of the first capacitive element C1 disposed at the first displacement portion D1 and the capacitance value of the second capacitive element C2 disposed at the second displacement portion D2. Thus, the force sensor 100c that is hardly affected by temperature changes in the usage environment and in-phase noise can be provided.

Further, the first displacement portion D1 and the second displacement portion D2 of the displacement body 20 are formed on the beam 21 symmetrically with respect to the connecting portion between the connecting body 22 and the beam 21. Accordingly, the displacement caused in the first displacement portion D1 and the displacement caused in the second displacement portion D2 are of the same magnitude but have different signs from each other. Thus, the applied force can be detected through a simple calculation.

§ 2. Force Sensor According to a Second Embodiment of the Present Invention

<2-1. Configuration of a Basic Structure>

Next, a force sensor according to a second embodiment of the present invention is described.

Figure 8:
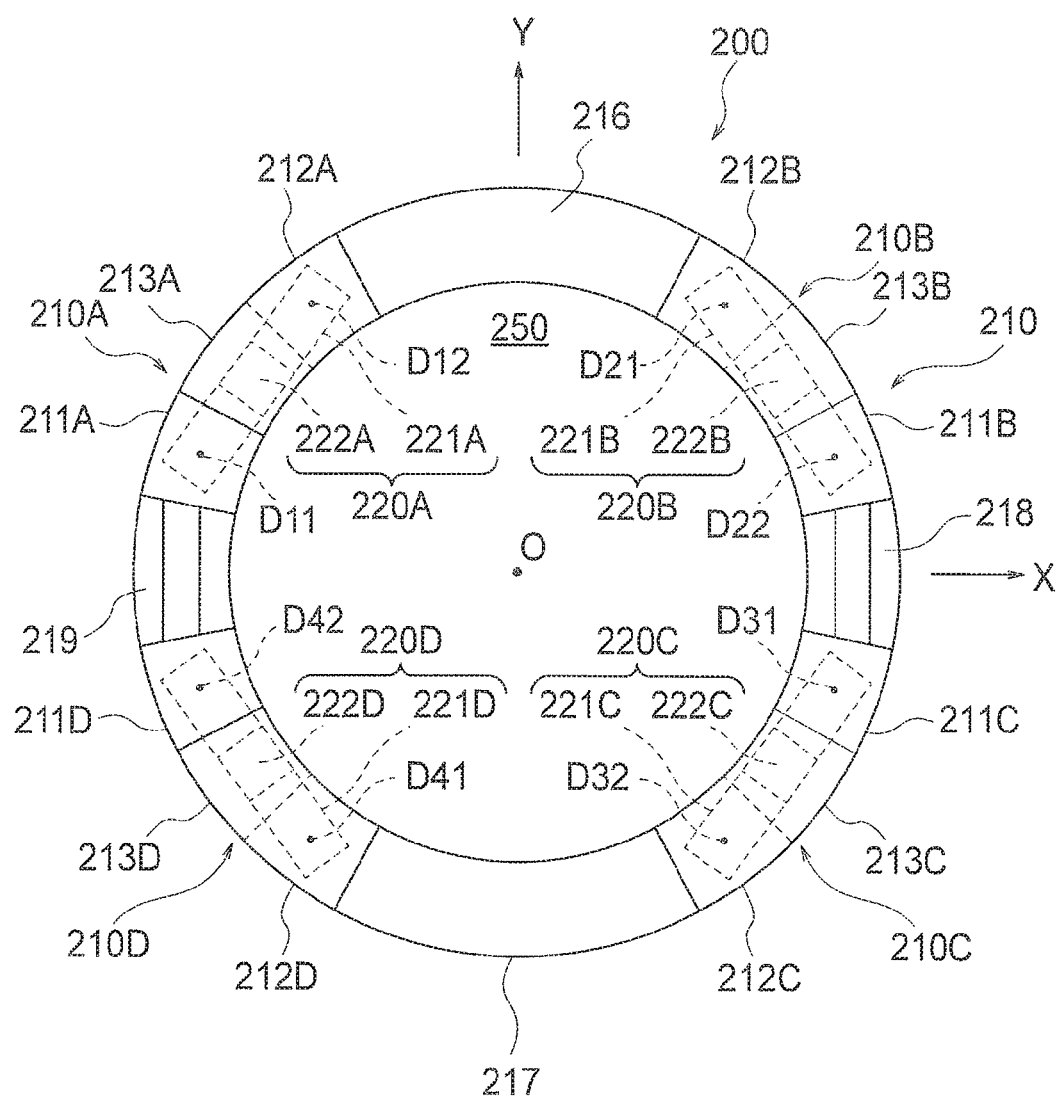
FIG. 8 is a schematic top view of the basic structure of a force sensor according to a second embodiment of the present invention.
Figure 9:
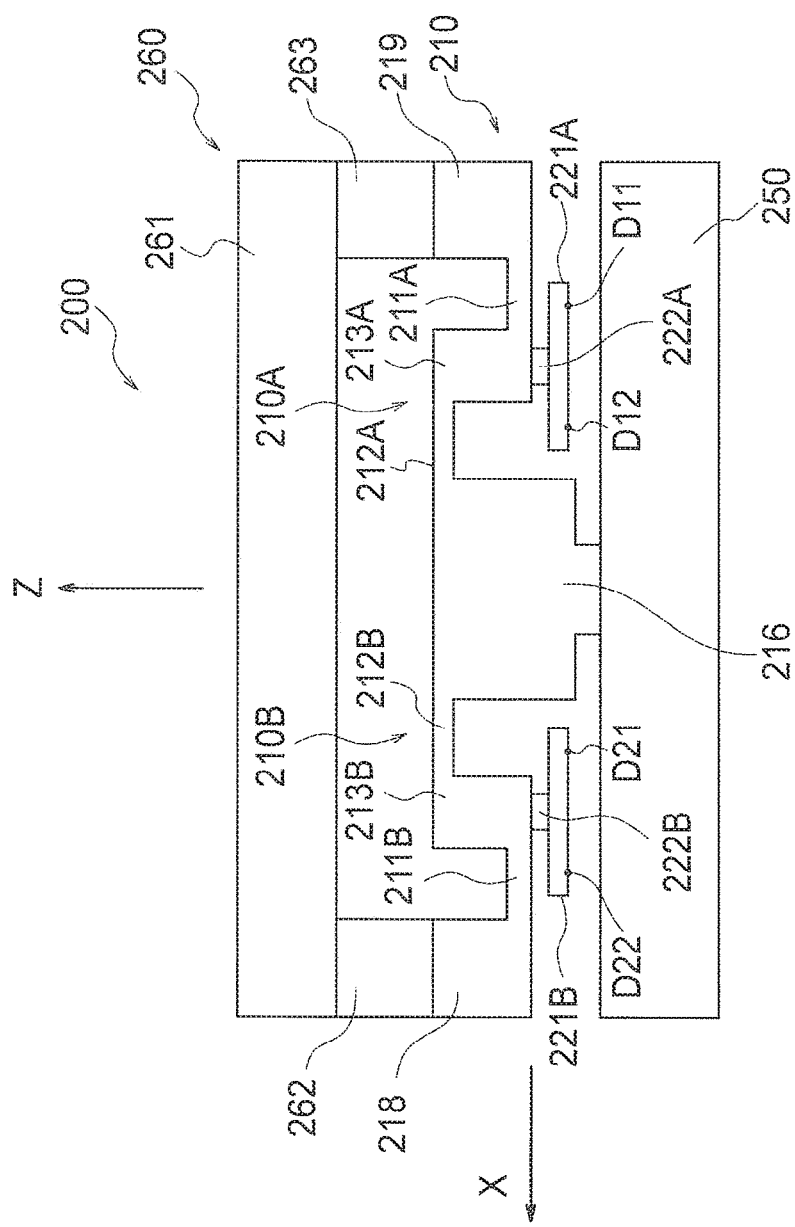
FIG. 9 is a schematic front view of the basic structure as viewed from the positive Y-axis side in FIG. 8.
Figure 10:
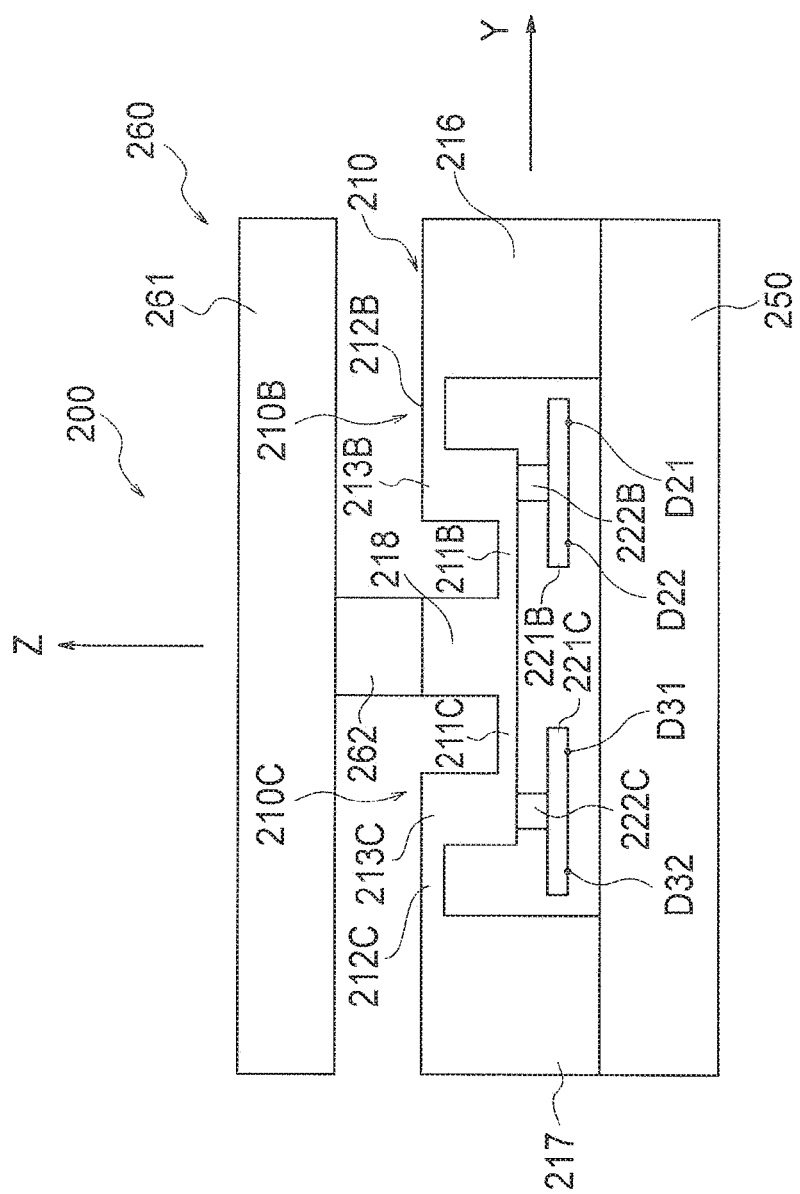
FIG. 10 is a schematic side view of the basic structure as viewed from the positive X-axis side in FIG. 8.

FIG. 8 is a schematic top view of a basic structure 200 of a force sensor 200c according to the second embodiment of the present invention. FIG. 9 is a schematic front view of the basic structure 200 viewed from the positive Y-axis side in FIG. 8. FIG. 10 is a schematic side view of the basic structure 200 viewed from the positive X-axis side in FIG. 8. This embodiment is described below, with the X-Y-Z three-dimensional coordinate system being defined as shown in FIGS. 8 through 10. For ease of explanation, a force receiving body 260 is not shown in FIG. 8.

As shown in FIGS. 8 through 10, the basic structure 200 includes a deformable body that is a closed-loop deformable body, and four displacement bodies 220A through 220D. The deformable body includes: two force receiving portions 218 and 219; two fixed portions 216 and 217 arranged together with the two force receiving portions 218 and 219 alternately along a closed-loop path; and four deformable elements 210A through 210D that are disposed one by one in the four spaces formed between the force receiving portions 218 and 219 and the fixed portions 216 and 217, which are adjacent to one another along the closed-loop path, and are elastically deformed by a force or a moment acting on the force receiving portions 218 and 219. The displacement bodies 220A through 220D are connected to the deformable elements 210A through 210D, respectively, and are displaced by elastic deformation caused in the deformable elements 210A through 210D.

In this embodiment, the force receiving portion 218 is disposed on the positive X-axis, and the other force receiving portion 219 is disposed on the negative X-axis, symmetrically with respect to the origin O, as shown in FIG. 8. Also, the fixed portion 216 is disposed on the positive Y-axis, and the other fixed portion 217 is disposed on the negative Y-axis, symmetrically with respect to the origin O. In this embodiment, the closed-loop deformable body including the force receiving portions 218 and 219 and the fixed portions 216 and 217 is formed as an annular deformable body 210 having a circular shape with the origin O as its center.

As shown in FIGS. 8 through 10, the first deformable element 210A disposed in the second quadrant of the plane when viewed from the Z-axis direction is located like an arc between the force receiving portion 219 disposed on the negative X-axis side and the fixed portion 216 disposed on the positive Y-axis side. The first deformable element 210A includes a first tilting portion 213A having the Z-axis direction (the depth direction in FIG. 8) as its longitudinal direction, a 1-1st deformable portion 211A connecting the force receiving portion 219 and the first tilting portion 213A, and a 1-2nd deformable portion 212A connecting the fixed portion 216 and the first tilting portion 213A. As shown in FIG. 9, the 1-1st deformable portion 211A extends parallel to the X-Y plane, and is connected to the first tilting portion 213A at the end portion (the lower end) of the first tilting portion 213A on the negative Z-axis side. The 1-2nd deformable portion 212A extends parallel to the X-Y plane, and is connected to the first tilting portion 213A at the end portion (the upper end) of the first tilting portion 213A on the positive Z-axis side.

The second deformable element 210B disposed in the first quadrant of the X-Y plane when viewed from the Z-axis direction is located like an arc between the force receiving portion 218 disposed on the positive X-axis side and the fixed portion 216 disposed on the positive Y-axis side. The second deformable element 210B includes a second tilting portion 213B having the Z-axis direction (the depth direction in FIG. 8) as its longitudinal direction, a 2-1st deformable portion 211B connecting the force receiving portion 218 and the second tilting portion 213B, and a 2-2nd deformable portion 212B connecting the fixed portion 216 and the second tilting portion 213B. As shown in FIG. 9, the 2-1st deformable portion 211B extends parallel to the X-Y plane, and is connected to the second tilting portion 213B at the end portion (the lower end) of the second tilting portion 213B on the negative Z-axis side. The 2-2nd deformable portion 212B extends parallel to the X-Y plane, and is connected to the second tilting portion 213B at the end portion (the upper end) of the second tilting portion 213B on the positive Z-axis side.

Although not specifically shown in the drawing, the fourth deformable element 210D and the third deformable element 210C disposed in the third quadrant and the fourth quadrant of the X-Y plane correspond to the above described configurations of the second deformable element 210B and the first deformable element 210A, respectively, when the portion of the annular deformable body 210 on the positive Y-axis side (the upper half of the annular deformable body 210 in FIG. 8) is rotated 180 degrees around the origin. Therefore, detailed explanation thereof is not made herein. In FIGS. 8 through 10, "C" is attached to the reference numeral of each component of the third deformable element 210C, and "D" is attached to the reference numeral of each component of the fourth deformable element 210D. Further, the lower end portions of the respective fixed portions 216 and 217 of the basic structure 200 are connected to a support 250, with a predetermined distance being kept from first through fourth beams 221A through 221D that will be described later.

As shown in FIGS. 8 through 10, the above described four displacement bodies 220A through 220D are connected one by one to the lower ends (the end on the negative Z-axis side) of the respective tilting portions 213A through 213D of the first through fourth deformable elements 210A through 210D. Each of the displacement bodies 220A through 220D has a displacement portion that is displaced by the tilting movement of the corresponding one of the tilting portions 213A through 213D. As shown in FIGS. 8 through 10, the displacement portions are the first through fourth beams 221A through 221D attached to the lower ends of the tilting portions 213A through 213D via connecting bodies 222A through 222D, respectively.

These beams 221A through 221D extend in a direction orthogonal to the longitudinal direction (the Z-axis direction) of the corresponding tilting portions 213A through 213D, and each of the beams 221A through 221D has a symmetrical shape when viewed from the radial direction of the annular deformable body 210. Each of the beams 221A through 221D is at a distance from the fixed portions 216 and 217 and the force receiving portions 218 and 219 so that the tilting (turning) of the beams 221A through 221D is not disturbed. In the first beam 221A, a 1-1st displacement portion D11 and a 1-2nd displacement portion D12 are defined symmetrically with respect to the connecting portion between the first beam 221A and the first connecting body 222A. Likewise, in the second beam 221B, a 2-1st displacement portion D21 and a 2-2nd displacement portion D22 are defined symmetrically with respect to the connecting portion between the second beam 221B and the second connecting body 222B. In the third beam 221C, a 3-1st displacement portion D31 and a 3-2nd displacement portion D32 are defined symmetrically with respect to the connecting portion between the third beam 221C and the third connecting body 222C. In the fourth beam 221D, a 4-1st displacement portion D41 and a 4-2nd displacement portion D42 are defined symmetrically with respect to the connecting portion between the fourth beam 221D and the fourth connecting body 222D. As will be described later, capacitive elements are disposed in the respective 1-1st through 4-2nd displacement portions D11 through D42, so that forces and moments acting on the force receiving portions 218 and 219 are detected. In short, the basic structure 200 is formed with four basic structures 100 as the first through fourth deformable elements 210A through 210D arranged in a ring-like form, and each of the four basic structures 100 is the basic structure 100 described in § 1.

Further, as shown in 9 and 10, the force receiving body 260 for receiving the force to be detected is disposed on the positive Z-axis side of the annular deformable body 210. The force receiving body 260 includes: a force receiving body main body 261 having a ring-like shape that is exactly the same shape as the annular deformable body 210 when viewed from the Z-axis direction; and force receiving portion connecting bodies 262 and 263 provided on the portions of the force receiving body main body 261 facing the force receiving portions 218 and 219 of the annular deformable body 210. The force receiving portion connecting bodies 262 and 263 are connected to the corresponding force receiving portions 218 and 219, so that a force and a moment acting on the force receiving body main body 261 are transmitted to the respective force receiving portions 218 and 219.

<2-2, Operation of the Basic Structure>

Next, operation of the above basic structure 200 is described.

(2-2-1. Where a Force +Fx is Applied)

Figure 11:
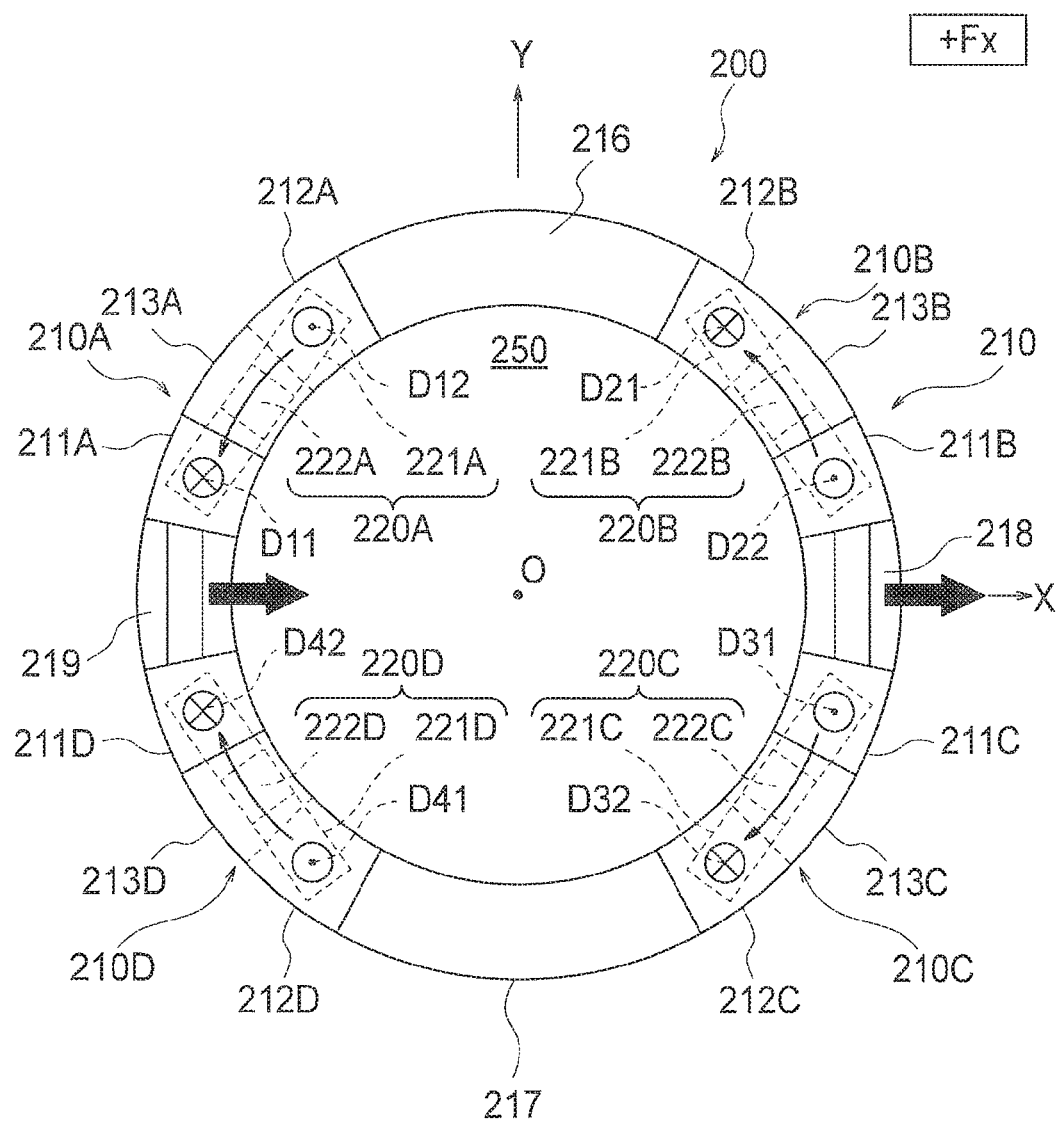
FIG. 11 is a diagram for explaining displacements caused in the respective displacement bodies of the basic structure in FIG. 8 when a force +Fx in the positive X-axis direction acts on the force receiving portions.

FIG. 11 is a diagram for explaining displacements caused in the respective displacement bodies 220A through 220D of the basic structure 200 in FIG. 8 when a force +Fx in the positive X-axis direction acts on the force receiving portions 218 and 219. In FIG. 8, forces acting on the force receiving portions 218 and 219 are indicated by thick solid arrows.

The tilting movements caused in the tilting portions 213A through 213D of the respective deformable elements 210A through 210D are indicated by thin arcuate arrows. The arrows indicate the directions of the tilting movements (clockwise or counterclockwise) of the respective tilting portions 213A through 213D when viewed from the origin O. Further, the Z-axis direction displacements caused in the respective displacement portions D11 through D42 of the beams 221A through 221D of the displacement bodies 220A through 220D due to the tilting movements of the respective tilting portions 213A through 213D are indicated by dots enclosed in circles and crosses enclosed by circles. The dots enclosed by circles indicate displacements from the back side to the front side (displacements in the positive Z-axis direction), and the crosses enclosed by circles indicate displacements from the front side to the back side (displacements in the negative Z-axis direction). It should be noted that this diagrammatic representation is also used in each of the embodiments described later. Forces acting on the force receiving portions 218 and 219 are indicated by a dot enclosed by a circle and a cross enclosed by a circle, depending on their orientations. The meanings of these symbols are as described above.

When a force +Fx in the positive X-axis direction acts on the force receiving portions 218 and 219 via the force receiving body 260, the force receiving portions 218 and 219 are displaced in the positive X-axis direction, as shown in FIG. 11. Because of this, the first deformable element 210A is subjected to compressive force like the compressive force shown in FIG. 3. In this case, the first tilting portion 213A tilts counterclockwise, and therefore, the first beam 221A also tilts counterclockwise. As a result, the 1-1st displacement portion D11 is displaced in the negative Z-axis direction, and the 1-2nd displacement portion D12 is displaced in the positive Z-axis direction.

The second deformable element 210B is subjected to tensile force like the tensile force shown in FIG. 4, due to the displacement of the force receiving portion 218 in the positive X-axis direction. In this case, the second tilting portion 213B tilts counterclockwise, and therefore, the second beam 221B also tilts counterclockwise. As a result, the 2-1st displacement portion D21 is displaced in the negative Z-axis direction, and the 2-2nd displacement portion D22 is displaced in the positive Z-axis direction.

The third deformable element 210C is subjected to tensile force like the tensile force shown in FIG. 4, due to the displacement of the force receiving portion 218 in the positive X-axis direction. In this case, the third tilting portion 213C tilts clockwise, and therefore, the third beam 221C also tilts clockwise. As a result, the 3-1st displacement portion D31 is displaced in the positive Z-axis direction, and the 3-2nd displacement portion D32 is displaced in the negative Z-axis direction.

Further, the fourth deformable element 210D is subjected to compressive force like the compressive force shown in FIG. 3, due to the displacement of the force receiving portion 219 in the positive X-axis direction. In this case, the fourth tilting portion 213D tilts clockwise, and therefore, the fourth beam 221D also tilts clockwise. As a result, the 4-1st displacement portion D41 is displaced in the positive Z-axis direction, and the 4-2nd displacement portion D42 is displaced in the negative Z-axis direction.

(2-2-2. Where a Force +Fy is Applied)

Figure 12:
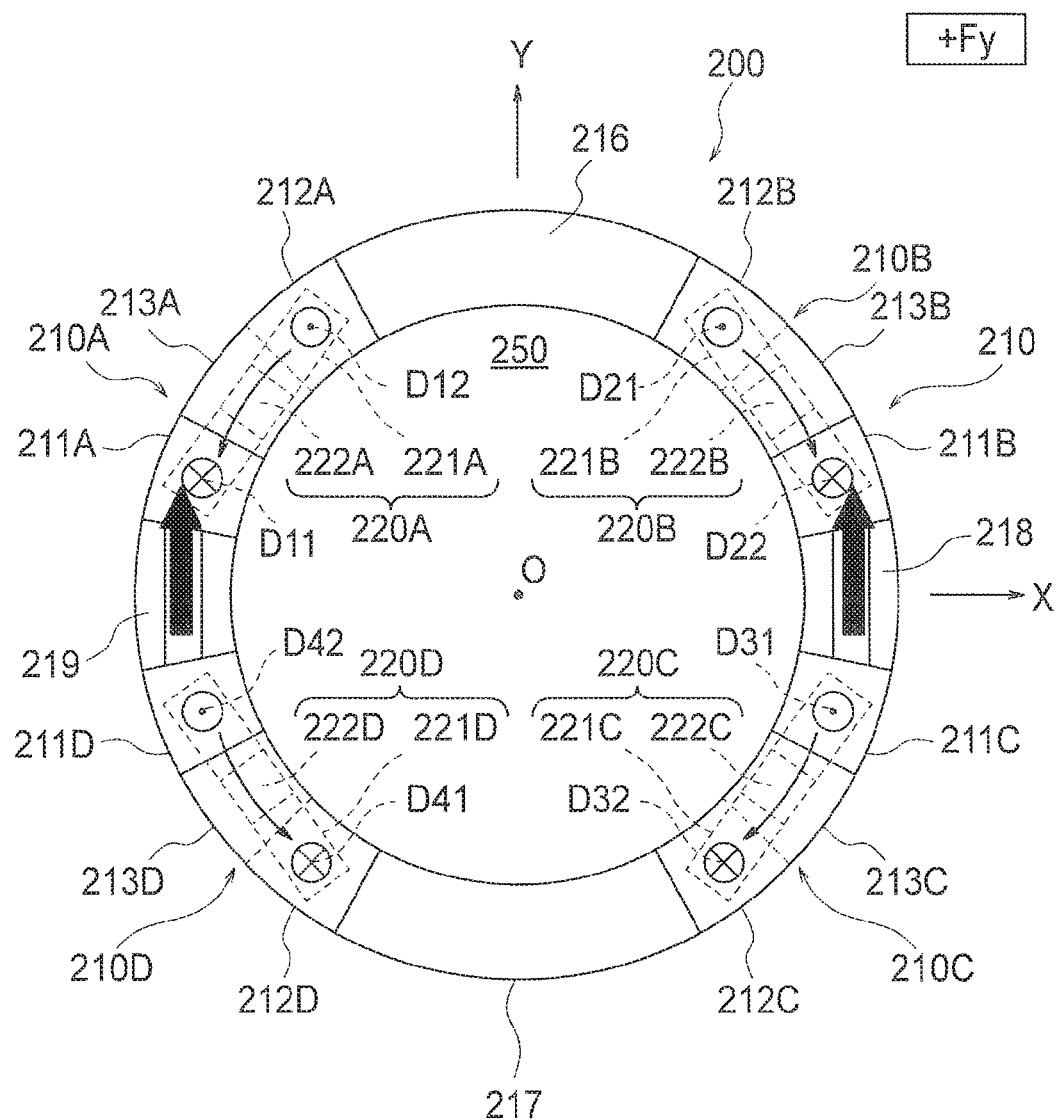
FIG. 12 is a diagram for explaining displacements caused in the respective displacement bodies of the basic structure in FIG. 8 when a force +Fy in the positive Y-axis direction acts on the force receiving portions.

FIG. 12 is a diagram for explaining displacements caused in the respective displacement bodies 220A through 220D of the basic structure 200 in FIG. 8 when a force +Fy in the positive Y-axis direction acts on the force receiving portions 218 and 219.

When a force +Fy in the positive Y-axis direction acts on the force receiving portions 218 and 219 via the force receiving body 260, the force receiving portions 218 and 219 are displaced in the positive Y-axis direction, as shown in FIG. 12. Because of this, the first deformable element 210A is subjected to compressive force like the compressive force shown in FIG. 3. In this case, the first tilting portion 213A and the first beam 221A tilt counterclockwise, as described above. Therefore, the 1-1st displacement portion D11 is displaced in the negative Z-axis direction, and the 1-2nd displacement portion D12 is displaced in the positive Z-axis direction.

The second deformable element 210B is subjected to compressive force like the compressive force shown in FIG. 3, due to the displacement of the force receiving portion 218 in the positive Y-axis direction. In this case, the second tilting portion 213B and the second beam 221B tilt clockwise. Therefore, the 2-1st displacement portion D21 is displaced in the positive Z-axis direction, and the 2-2nd displacement portion D22 is displaced in the negative Z-axis direction.

The third deformable element 210C is subjected to tensile force like the tensile force shown in FIG. 4, due to the displacement of the force receiving portion 218 in the positive Y-axis direction. In this case, the third tilting portion 213C and the third beam 221C tilt clockwise. Therefore, the 3-1st displacement portion D31 is displaced in the positive Z-axis direction, and the 3-2nd displacement portion D32 is displaced in the negative Z-axis direction.

The fourth deformable element 210D is subjected to tensile force like the tensile force shown in FIG. 4, due to the displacement of the force receiving portion 219 in the positive Y-axis direction. In this case, the fourth tilting portion 213D and the fourth beam 221D tilt counterclockwise. Therefore, the 4-1st displacement portion D41 is displaced in the negative Z-axis direction, and the 4-2nd displacement portion D42 is displaced in the positive Z-axis direction.

(2-2-3. Where a Force +Fz is Applied)

Figure 13:
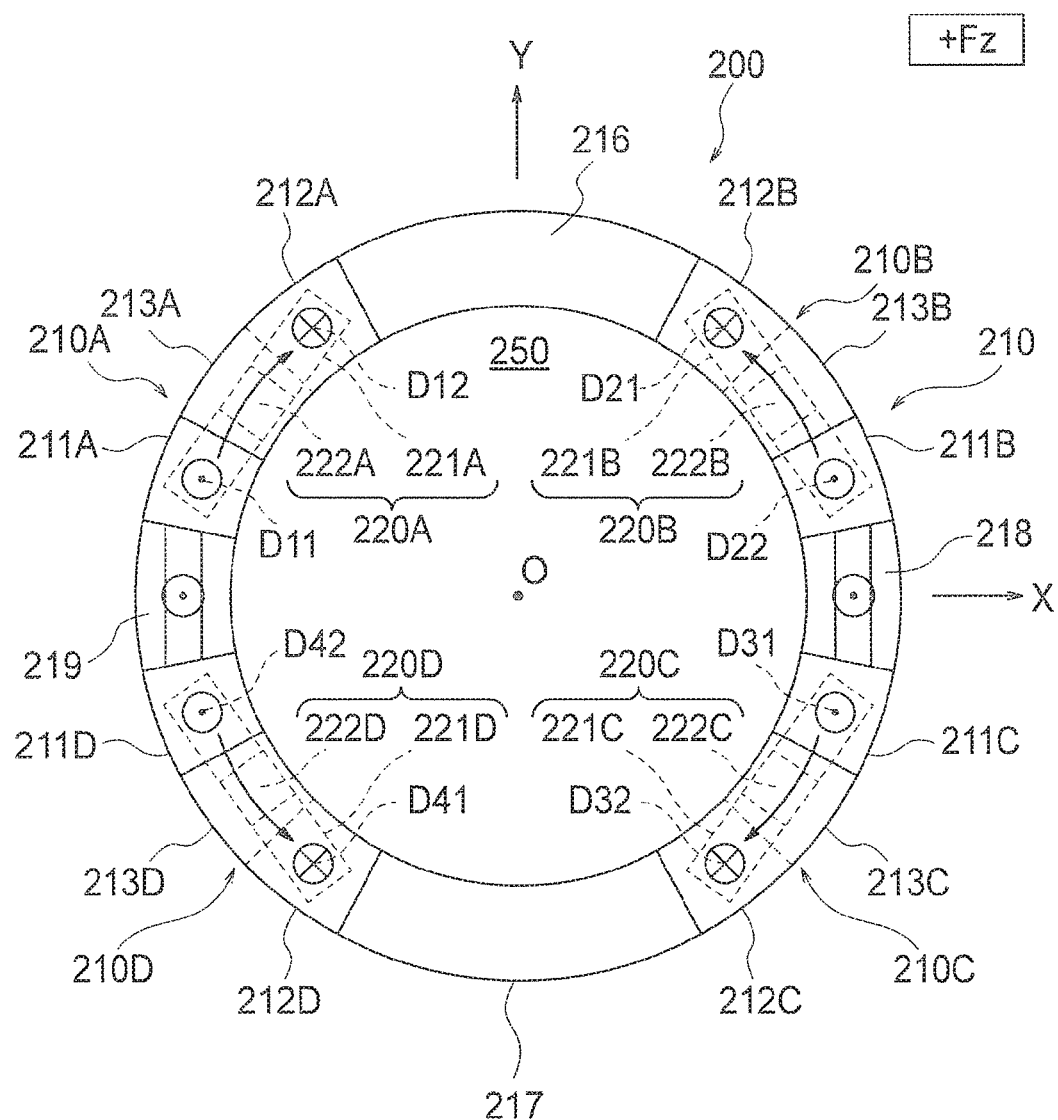
FIG. 13 is a diagram for explaining displacements caused in the respective displacement bodies of the basic structure in FIG. 8 when a force +Fz in the positive Z-axis direction acts on the force receiving portions.

FIG. 13 is a diagram for explaining displacements caused in the respective displacement bodies 220A through 220D of the basic structure 200 in FIG. 8 when a force +Fz in the positive Z-axis direction acts on the force receiving portions 218 and 219.

When a force +Fz in the positive Z-axis direction acts on the force receiving portions 218 and 219 via the force receiving body 260, the force receiving portions 218 and 219 are displaced in the positive Z-axis direction, as shown in FIG. 13. Because of this, each of the first through fourth deformable elements 210A through 210D is subjected to upward force like the upward force shown in FIG. 6. In this case, the first tilting portion 213A and the third tilting portion 213C tilt clockwise, and therefore, the first beam 221A and the third beam 221C also tilt clockwise. As a result, the 1-1st displacement portion D11 and the 3-1st displacement portion D31 are displaced in the positive Z-axis direction, and the 1-2nd displacement portion D12 and the 3-2nd displacement portion D32 are displaced in the negative Z-axis direction.

Meanwhile, the second tilting portion 213B and the fourth tilting portion 213D tilt counterclockwise, and therefore, the second beam 221B and the fourth beam 221D also tilt counterclockwise. As a result, the 2-1st displacement portion D21 and the 4-1st displacement portion D41 are displaced in the negative Z-axis direction, and the 2-2nd displacement portion D22 and the 4-2nd displacement portion D42 are displaced in the positive Z-axis direction.

(2-2-4. Where a Moment +Mx is Applied)

Figure 14:
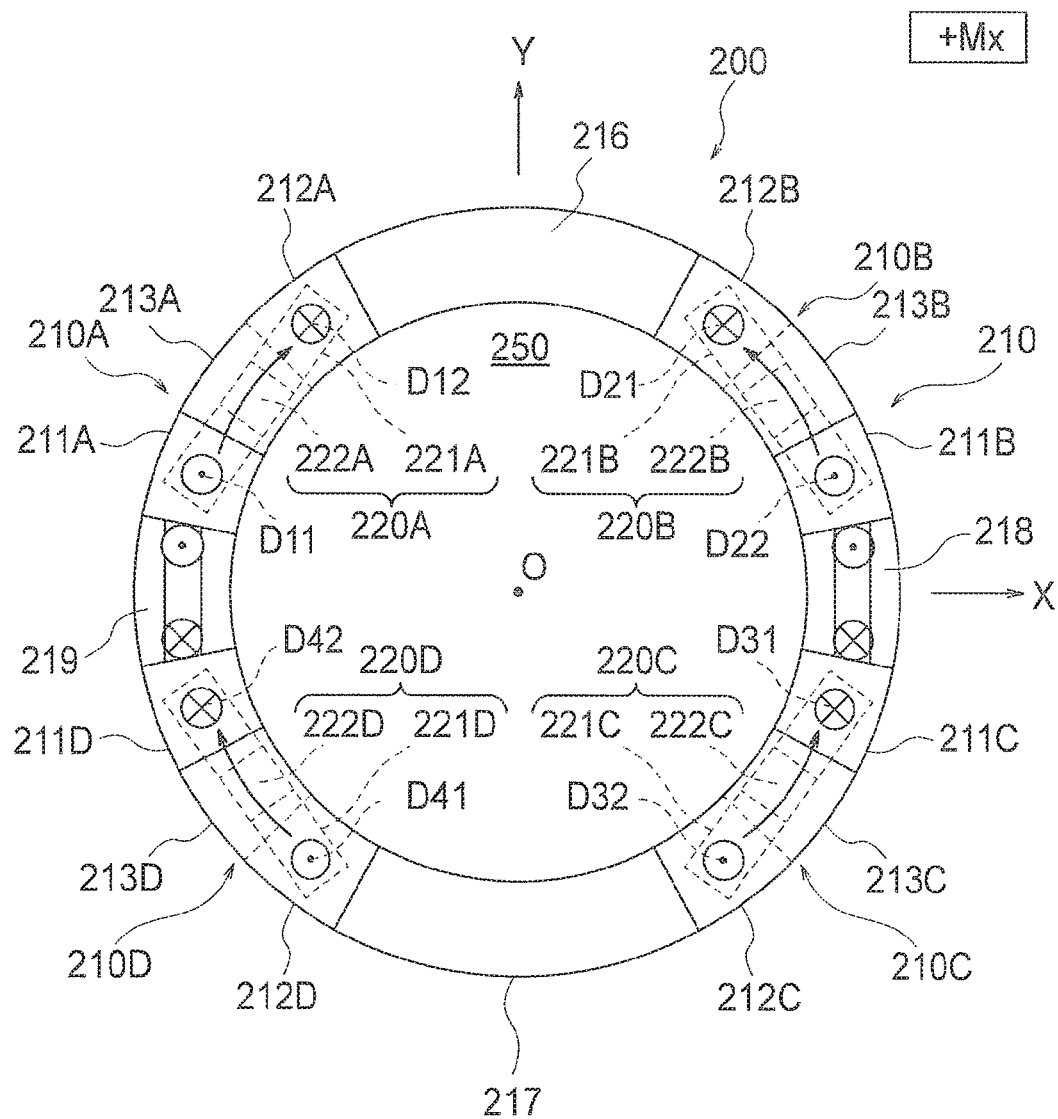
FIG. 14 is a diagram for explaining displacements caused in the respective displacement bodies of the basic structure in FIG. 8 when a moment +Mx around the positive X-axis acts on the force receiving portions.

FIG. 14 is a diagram for explaining displacements caused in the respective displacement bodies 220A through 220D of the basic structure 200 in FIG. 8 when a moment +Mx around the positive X-axis acts on the force receiving portions 218 and 219. In the present application, the direction of rotation of a right screw in a case where the right screw is advanced in the positive direction of a predetermined coordinate axis is defined as a positive moment around the coordinate axis.

When a moment +Mx around the positive X-axis acts on the force receiving portions 218 and 219 via the force receiving body 260, the portion of each of the force receiving portions 218 and 219 on the positive Y-axis side (the upper side in FIG. 14) is displaced in the positive Z-axis direction (the front side), and the portion of each of the force receiving portions 218 and 219 on the negative Y-axis side (the lower side in 14) is displaced in the negative Z-axis direction (the back side). That is, a force in the same direction as in FIG. 13 acts on the first deformable element 210A and the second deformable element 210B. Therefore, as described in 2-2-3., the 1-1st displacement portion D11 is displaced in the positive Z-axis direction, the 1-2nd displacement portion D12 is displaced in the negative Z-axis direction, the 2-1st displacement portion D21 is displaced in the negative Z-axis direction, and the 2-2nd displacement portion D22 is displaced in the positive Z-axis direction.

Meanwhile, the third deformable element 210C is subjected to downward force like the downward force shown in FIG. 5 from the force receiving portion 219. In this case, the third tilting portion 213C tilts counterclockwise, and therefore, the third beam 221C also tilts counterclockwise. As a result, the 3-1st displacement portion D31 is displaced in the negative Z-axis direction, and the 3-2nd displacement portion D32 is displaced in the positive Z-axis direction.

The fourth deformable element 210D is subjected to downward force like the downward force shown in FIG. 5 from the force receiving portion 218. In this case, the fourth tilting portion 213D tilts clockwise, and therefore, the fourth beam 221D also tilts clockwise. As a result, the 4-1st displacement portion D41 is displaced in the positive Z-axis direction, and the 4-2nd displacement portion D42 is displaced in the positive Z-axis direction.

(2-2-5. Where a Moment +My is Applied)

Figure 15:
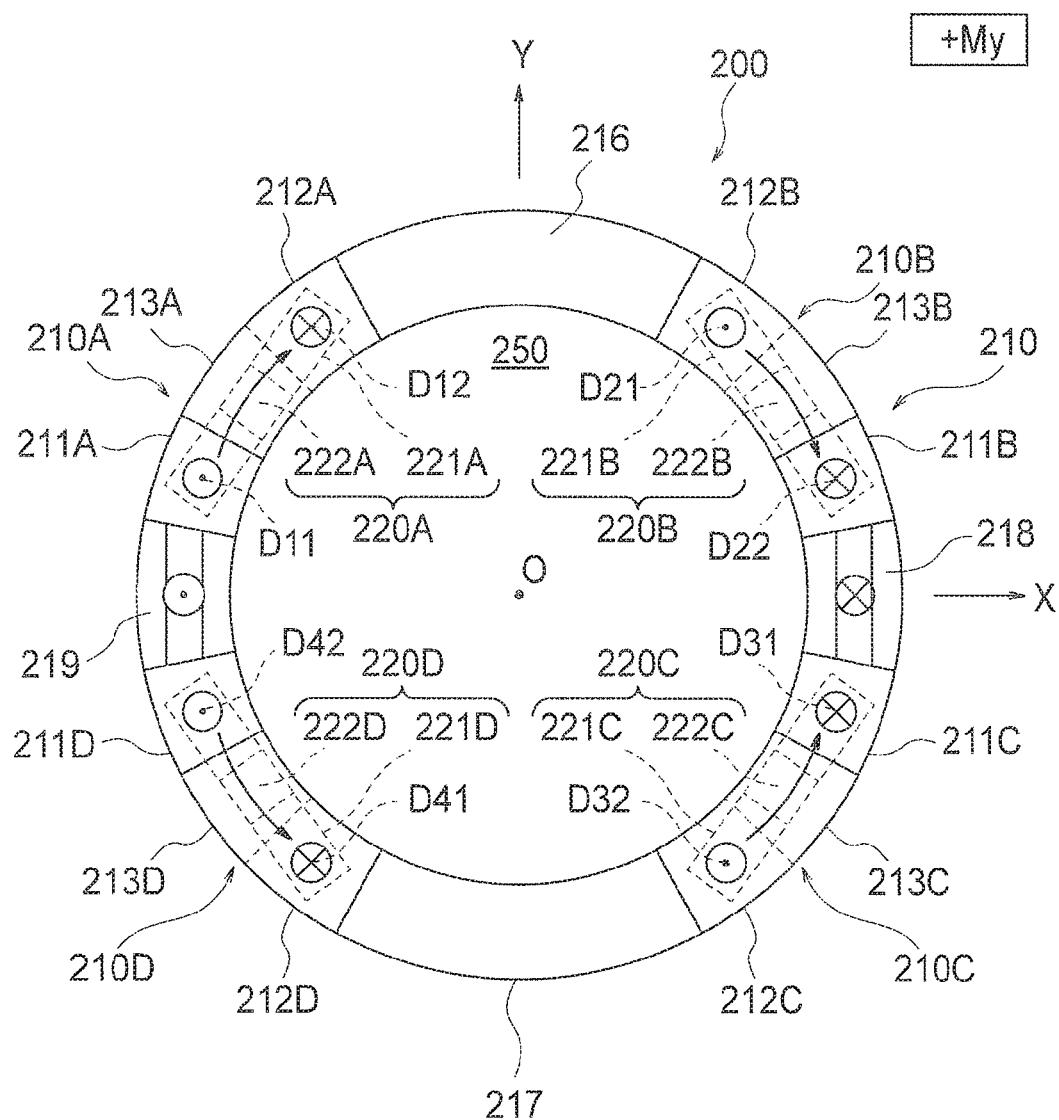
FIG. 15 is a diagram for explaining displacements caused in the respective displacement bodies of the basic structure in FIG. 8 when a moment +My around the positive Y-axis acts on the force receiving portions.

FIG. 15 is a diagram for explaining displacements caused in the respective displacement bodies 220A through 220D of the basic structure 200 in FIG. 8 when a moment +My around the positive Y-axis acts on the force receiving portions 218 and 219.

When a moment +My around the positive Y-axis acts on the force receiving portions 218 and 219 via the force receiving body 260, the force receiving portion 218 located on the negative X-axis side is displaced in the positive Z-axis direction (the direction from the front side toward the front side in FIG. 15), and the force receiving portion 219 located on the positive X-axis side is displaced in the negative Z-axis direction (the direction from the front side toward the back side in FIG. 15). That is, a force in the same direction as in FIG. 13 acts on the first deformable element 210A and the fourth deformable element 210D. Therefore, as described in 2-2-3., the 1-1st displacement portion D11 is displaced in the positive Z-axis direction, the 1-2nd displacement portion D12 is displaced in the negative Z-axis direction, the 4-1st displacement portion D41 is displaced in the negative Z-axis direction, and the 4-2nd displacement portion D42 is displaced in the positive Z-axis direction.

Meanwhile, as shown in FIG. 15, the second deformable element 210B and the third deformable element 210C are subjected to force in the negative Z-axis direction (see FIG. 5). Because of the action of such force, the second tilting portion 213B tilts clockwise in the second deformable element 210B, and therefore, the second beam 221B also tilts clockwise. As a result, the 2-1st displacement portion D21 is displaced in the positive Z-axis direction, and the 2-2nd displacement portion D22 is displaced in the negative Z-axis direction. In the third deformable element 210C, the third tilting portion 213C tilts counterclockwise, as in FIG. 14. Therefore, the 3-1st displacement portion D31 is displaced in the negative Z-axis direction, and the 3-2nd displacement portion D32 is displaced in the positive Z-axis direction.

(2-2-6. Where a Moment +Mz is Applied)

Figure 16:
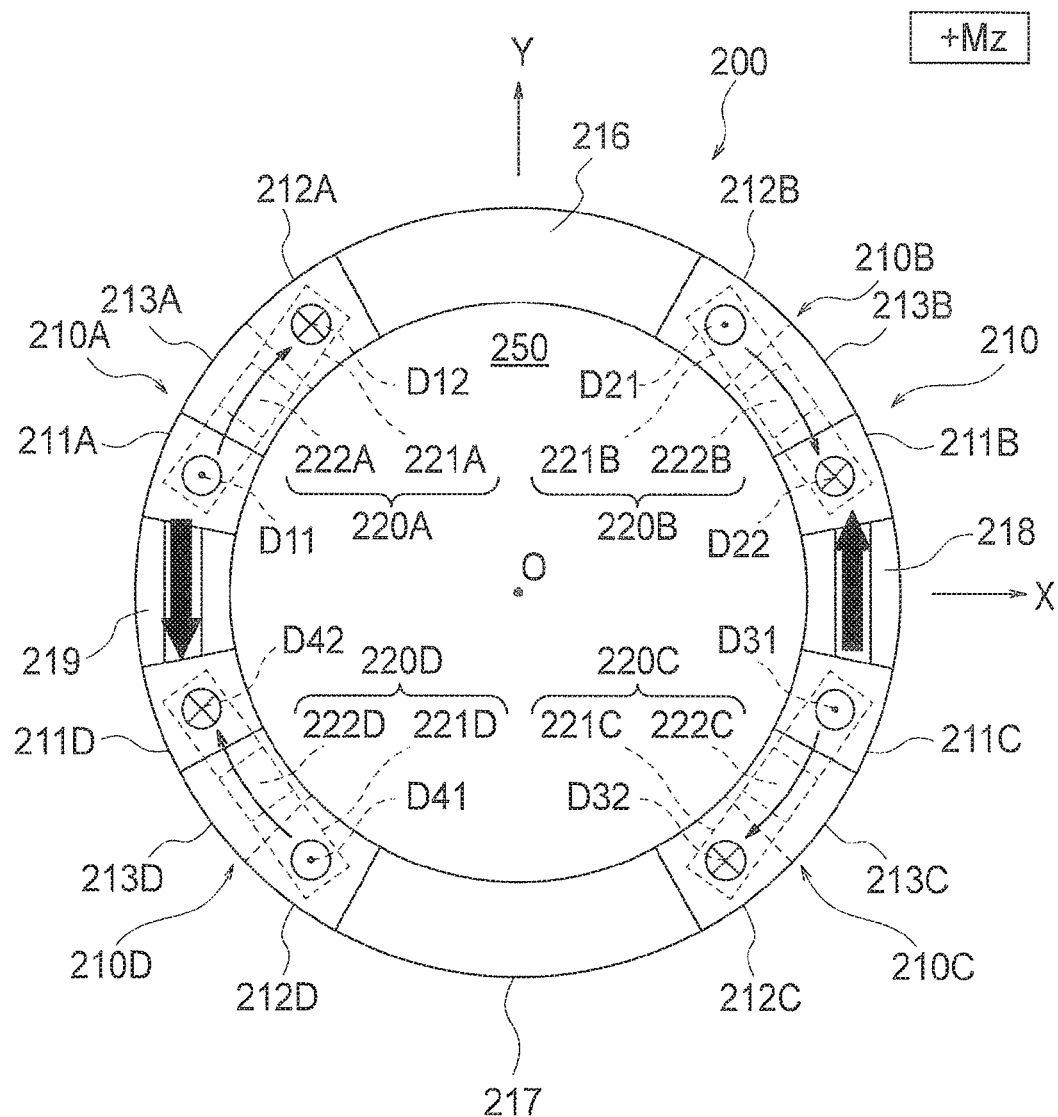
FIG. 16 is a diagram for explaining displacements caused in the respective displacement bodies of the basic structure in FIG. 8 when a moment +Mz around the positive Z-axis acts on the force receiving portions.

FIG. 16 is a diagram for explaining displacements caused in the respective displacement bodies 220A through 220D of the basic structure 200 in FIG. 8 when a moment +Mz around the positive Z-axis acts on the force receiving portions 218 and 219.

When a moment +Mz around the positive Z-axis acts on the force receiving portions 218 and 219 via the force receiving body 260, the force receiving portion 219 located on the negative X-axis side is displaced in the negative Y-axis direction, and the force receiving portion 218 located on the positive X-axis side is displaced in the positive Y-axis direction. Since the displacement of the force receiving portion 218 located on the positive X-axis side is in the same direction as in a case where the force +Fy is applied (see FIG. 12), the second deformable element 210B and the third deformable element 210C disposed on the positive X-axis side have the same elastic deformation as that in FIG. 12. That is, the 2-1st displacement portion D21 is displaced in the positive Z-axis direction, the 2-2nd displacement portion D22 is displaced in the negative Z-axis direction, the 3-1st displacement portion D31 is displaced in the positive Z-axis direction, and the 3-2nd displacement portion D32 is displaced in the negative Z-axis direction.

Meanwhile, the first deformable element 210A is subjected to tensile force like the tensile force shown in FIG. 4, due to the displacement of the force receiving portion 219 in the negative Y-axis direction. In this case, the first tilting portion 213A and the first beam 221A tilt clockwise. Therefore, the 1-1st displacement portion D11 is displaced in the positive Z-axis direction, and the 1-2nd displacement portion D12 is displaced in the negative Z-axis direction.

Further, the fourth deformable element 210D is subjected to compressive force like the compressive force shown in FIG. 3, due to the displacement of the force receiving portion 219 in the negative Y-axis direction. In this case, the fourth tilting portion 213D and the fourth beam 221D tilt clockwise. Therefore, the 4-1st displacement portion D41 is displaced in the positive Z-axis direction, and the 4-2nd displacement portion D42 is displaced in the negative Z-axis direction.

As a summary of the above description, FIG. 17 shows a list of the directions of the tilting movements caused in the respective tilting portions 213A through 213D of the basic structure 200 in FIG. 8 and the displacements caused in the respective displacement portions D11 through D42 of the displacement bodies 220A through 220D in a case where the forces +Fx, +Fy, and +Fz in the respective axis directions of the X-YZ three-dimensional coordinate system, and the moments +Mx, +My, and +Mz around the respective axes act on the force receiving portions 218 and 219. In FIG. 17, the directions of rotation (clockwise/counterclockwise) shown in the columns for the respective tilting portions 213A through 213D are the directions observed from the origin O. Further, the symbol "+" written in the columns for the respective displacement portions D11 through D42 means that the distance between the corresponding displacement portion and the support 250 increases, and the symbol "−" means that the distance between the corresponding displacement portion and the support 250 decreases.

In a case where the forces and moments acting on the force receiving body 260 are in negative directions and in negative rotative directions, the directions of the tilting movements of the tilting portions 213A through 213D are all reversed from those in the above described cases. As a result, the directions of displacements caused in the displacement portions D11 through D42 of the respective displacement bodies 220A through 220D are also reversed, and the directions of the tilting movements and the increases/decreases (+/−) in the distance between the respective displacement portions D11 through D42 and the support 250 are all reversed from those shown in the list in FIG. 17.

<2-3. Structure of a Force Sensor>

Next, the structure of the force sensor 200c including the basic structure 200 described above in 2-1 and 2-2 is described.

Figure 18:
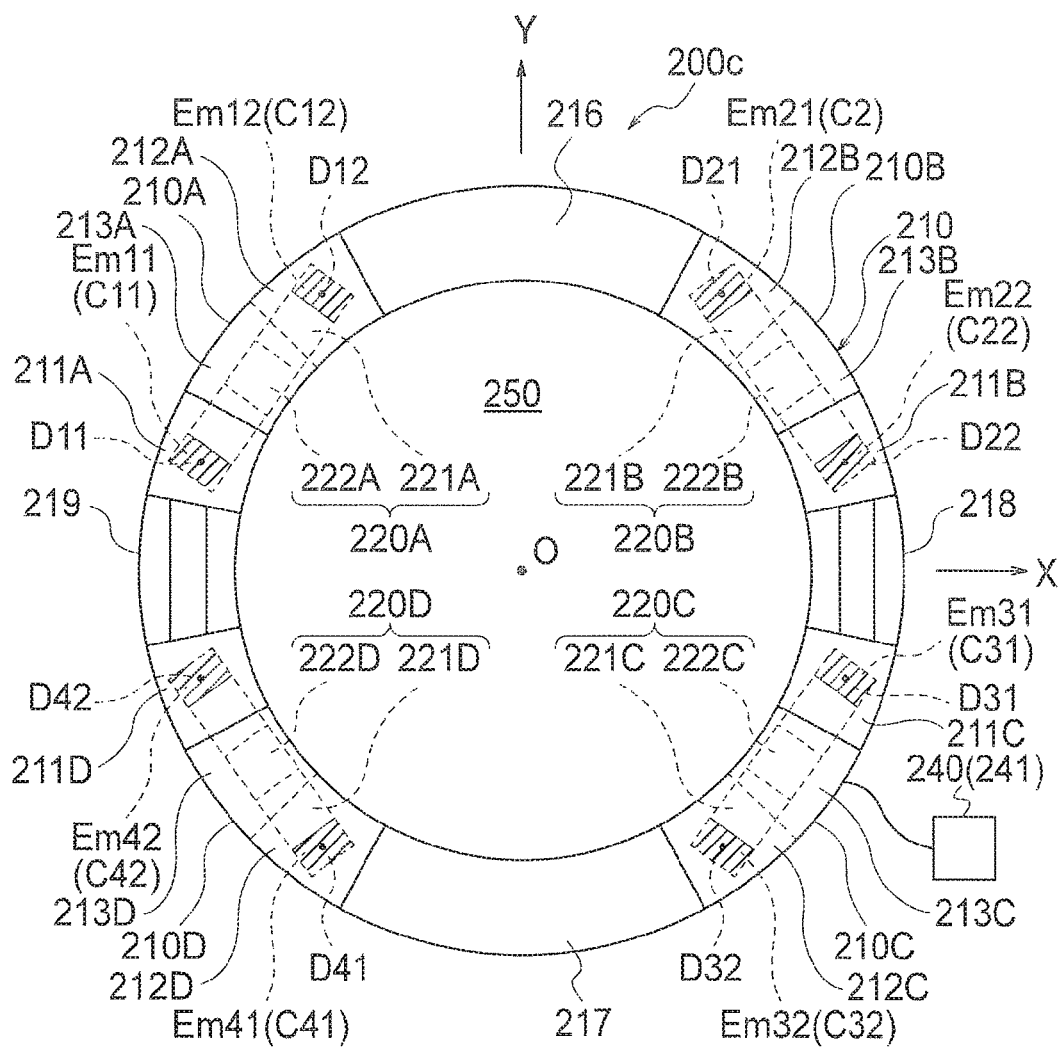
FIG. 18 is a schematic top view of an example of a force sensor that adopts the basic structure shown in FIG. 8.
Figure 19:
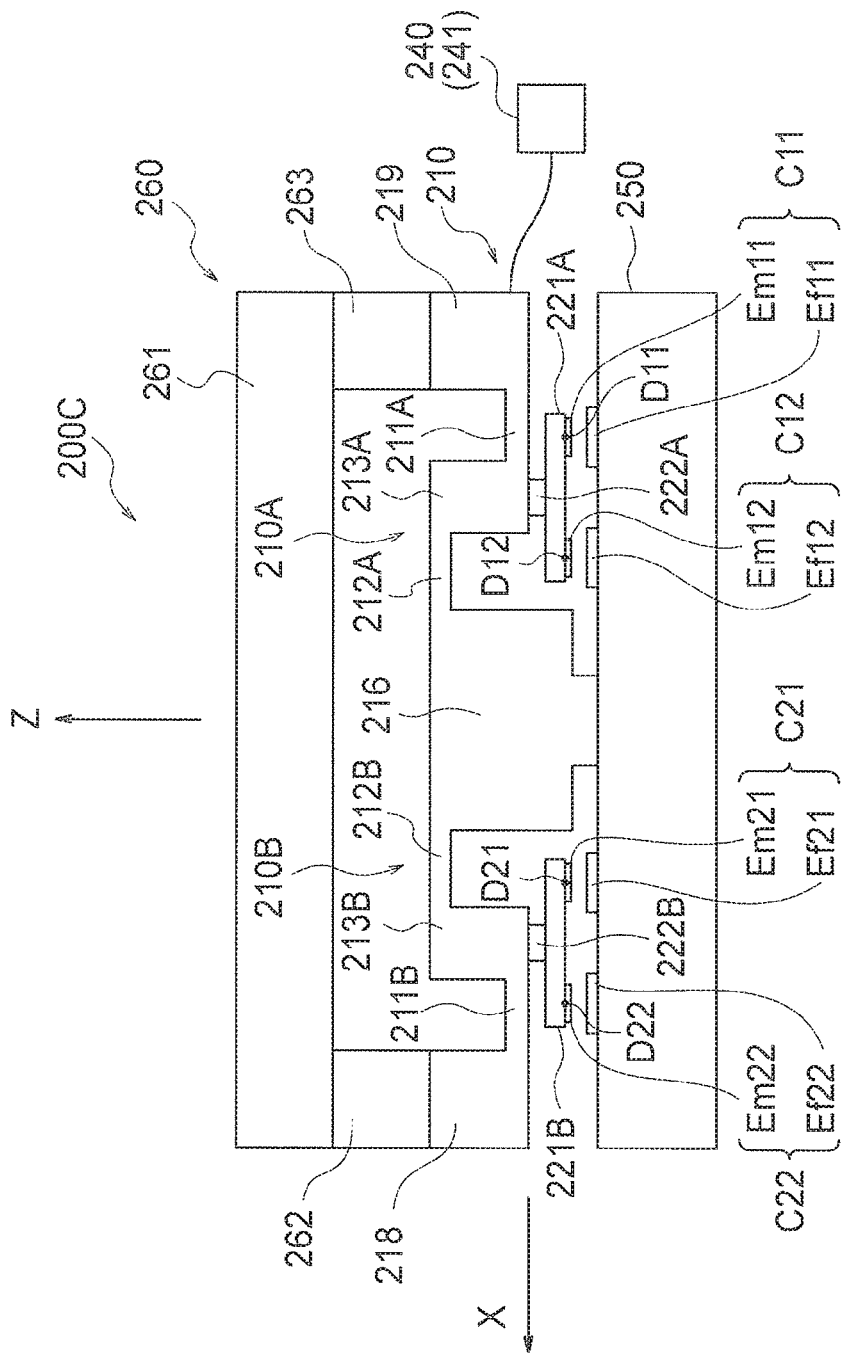
FIG. 19 is a schematic front view of the force sensor shown in FIG. 18 as viewed from the positive Y-axis side.

FIG. 18 is a schematic top view of an example of the force sensor 200c that adopts the basic structure 200 shown in FIG. 8. FIG. 19 is a schematic front view of the force sensor 200c of FIG. 18, as viewed from the positive Y-axis side.

As shown in FIGS. 18 and 19, the force sensor 200c includes the above described basic structure 200 and a detection circuit 240 that detects an applied force and an applied moment in accordance with displacements caused in the respective displacement portions D11 through D42 of the displacement bodies 220A through 220D of the basic structure 200. As shown in FIGS. 18 and 19, the detection circuit 240 of this embodiment includes: eight capacitive elements C11 through C42 disposed one by one in the respective displacement portions D11 through D42 of the displacement bodies 220A through 220D; and a measuring unit 241 that is connected to these capacitive elements C11 through C42, and measures the applied force in accordance with changes in the capacitance values of the capacitive elements C11 through C42.

The specific configurations of the eight capacitive elements C11 through C42 are as follows. Specifically, as shown in FIG. 19, the 1-1st capacitive element C11 includes: a 1-1st displacement electrode Em11 disposed on the 1-1st displacement portion D11 of the first beam 221A via an insulator (not shown); and a 1-1st fixed electrode Ef11 disposed on the support 250 via an insulator (not shown) in such a manner as to face the 1-1st displacement electrode Em11. Also, the 1-2nd capacitive element C12 includes: a 1-2nd displacement electrode Em12 disposed on the 1-2nd displacement portion D12 of the first beam 221A via an insulator (not shown); and a 1-2nd fixed electrode Ef12 disposed on the support 250 via an insulator (not shown) in such a manner as to face the 1-2nd displacement electrode Em12.

Likewise, as shown in FIG. 19, the 2-1st capacitive element C21 includes: a 2-1st displacement electrode Em21 disposed on the 2-1st displacement portion D21 of the second beam 221B via an insulator (not shown); and a 2-1st fixed electrode Ef21 disposed on the support 250 via an insulator (not shown) in such a manner as to face the 2-1st displacement electrode Em21. The 2-2nd capacitive element C22 includes: a 2-2nd displacement electrode Em22 disposed on the 2-2nd displacement portion D22 of the second beam 221B via an insulator (not shown); and a 2-2nd fixed electrode Ef22 disposed on the support 250 via an insulator (not shown) in such a manner as to face the 2-2nd displacement electrode Em22.

Further, although not shown in the drawing, the 3-1st capacitive element C31 includes: a 3-1st displacement electrode Em31 disposed on the 3-1st displacement portion D31 of the third beam 221C via an insulator; and a 3-1st fixed electrode Ef31 disposed on the support 250 via an insulator in such a manner as to face the 3-1st displacement electrode Em31. The 3-2nd capacitive element C32 includes: a 3-2nd displacement electrode Em32 disposed on the 3-2nd displacement portion D32 of the third beam 221C via an insulator; and a 3-2nd fixed electrode Ef32 disposed on the support 250 via an insulator in such a manner as to face the 3-2nd displacement electrode Em32.

Likewise, the 4-1st capacitive element C41 includes: a 4-1st displacement electrode Em41 disposed on the 4-1st displacement portion D41 of the fourth beam 221D via an insulator; and a 4-1st fixed electrode Ef41 disposed on the support 250 via an insulator in such a manner as to face the 4-1st displacement electrode Em41. The 4-2nd capacitive element C42 includes: a 4-2nd displacement electrode Em42 disposed on the 4-2nd displacement portion D42 of the fourth beam 221D via an insulator; and a 4-2nd fixed electrode Ef42 disposed on the support 250 via an insulator in such a manner as to face the 4-2nd displacement electrode Em42.

Although not clearly shown in FIGS. 18 and 19, these capacitive elements C11 through C42 are connected to the measuring unit 241 by a predetermined circuit, and the capacitance values of the capacitive elements C11 through C42 are supplied to the measuring unit 241.

<2-4. Operation of the Force Sensor>

Next, operation of the force sensor 200c described in 2-3. is described.

(2-4-1. Where a Force +Fx in the Positive X-Axis Direction is Applied)

When a force +Fx in the positive X-axis direction acts on the force receiving portions 218 and 219 of the force sensor 200c via the force receiving body 260, the distance between the 1-1st displacement electrode Em11 and the 1-1st fixed electrode Ef11 decreases in the 1-1st capacitive element C11, but the distance between the 1-2nd displacement electrode Em12 and the 1-2nd fixed electrode Ef12 increases in the 1-2nd capacitive element C12, as shown in FIG. 17. That is, the capacitance value of the 1-1st capacitive element C11 increases, and the capacitance value of the 1-2nd capacitive element C12 decreases. Likewise, the capacitance value of the 2-1st capacitive element C21 increases, and the capacitance value of the 2-2nd capacitive element C22 decreases, as can be seen from FIG. 17. The capacitance value of the 3-1st capacitive element C31 decreases, and the capacitance value of the 3-2nd capacitive element C32 increases.

Further, the capacitance value of the 4-1st capacitive element C41 decreases, and the capacitance value of the 4-2nd capacitive element C42 increases.

FIG. 20 is a table as a list that shows the increases/decreases in the capacitance values of the respective capacitive elements in a case where the forces +Fx, +Fy, and +Fz in the respective axis directions or the moments +Mx, +My, and +Mz around the respective axes in the X-Y-Z three-dimensional coordinate system act on the force receiving portions 218 and 219. The increases/decreases in the capacitance values of the above described capacitive elements C11 through C42 are summarized in the column for Fx in FIG. 20. In the list, each symbol "+" indicates that the capacitance value increases, and each symbol "−" indicates that the capacitance value decreases.

In this embodiment, in the respective beams 221A through 221D, the first displacement portions D11, D21, D31, and D41, and the second displacement portions D12, D22, D32, and D42 are arranged at equal distances from the centers of the tilting movements of the corresponding beams 221A through 221D. Accordingly, in the respective beams 221A through 221D, the magnitudes (|ΔC11|, |ΔC21|, |ΔC31|, and |ΔC41|) of the changes in the capacitance values of the capacitive elements C11, C21, C31, and C41 disposed in the first displacement portions D11, D21, D31, and D41 are equal to the magnitudes (|ΔC12|, |ΔC22|, |ΔC32|, and |ΔC42|) of the changes in the capacitance values of the capacitive elements C12, C22, C32, and C42 disposed in the second displacement portions D12, D22, D32, and D42. Because of this, where |ΔC11|=|ΔC12|=|ΔC21|=|ΔC22|=|ΔC31|ΔC32|=|C41|=|C42|=ΔC, the respective capacitance values C11a through C42a of the 1-1st through 4-2nd capacitive elements C11 through C42 when the force +Fx is applied are expressed by the following [Expression 7].

$$C11a = C11 + \Delta C$$

$$C12a = C12 - \Delta C$$

$$C21a = C21 + \Delta C$$

$$C22a = C22 - \Delta C$$

$$C31a = C31 - \Delta C$$

$$C32a = C32 + \Delta C$$

$$C41a = C41 - \Delta C$$

$$C42a = C42 + \Delta C \qquad \text{[Expression 7]}$$

In accordance with such changes in the capacitance values, the measuring unit 241 measures the applied force +Fx by using the following [Expression 8].

$$+Fx = C11 - C12 + C21 - C22 - C31 + C32 - C41 + C42 \qquad \text{[Expression 8]}$$

(2-4-2. Where a Force +Fy in the Positive Y-Axis Direction is Applied)

When a force +Fy in the positive Y-axis direction acts on the force receiving portions 218 and 219 of the force sensor 200c via the force receiving body 260, the capacitance value of the 1-1st capacitive element C11 increases, the capacitance value of the 1-2nd capacitive element C12 decreases, the capacitance value of the 2-1st capacitive element C21 decreases, and the capacitance value of the 2-2nd capacitive element C22 increases, as can be seen from FIG. 17. Further, the capacitance value of the 3-1st capacitive element C31 decreases, the capacitance value of the 3-2nd capacitive element C32 increases, the capacitance value of the 4-1st capacitive element C41 increases, and the capacitance value of the 4-2nd capacitive element C42 decreases. The increases/decreases in the capacitance values of these capacitive elements C11 through C42 are summarized in the column for Fy in FIG. 20.

In this case, in the respective beams 221A through 221D, the magnitudes of the changes in the capacitance values of the capacitive elements C11, C21, C31, and C41 disposed in the first displacement portions D11, D21, D31, and D41 can also be regarded as equal to the magnitudes of the changes in the capacitance values of the capacitive elements C12, C22, C32, and C42 disposed in the second displacement portions D12, D22, D32, and D42. Accordingly, taking into account the changes in the capacitance values of the respective capacitive elements C11 through C42 in the same manner as in the above [Expression 7], the measuring unit 241 measures the applied force +Fy according to the following [Expression 9], $$+Fy = C11 - C12 - C21 + C22 - C31 + C32 + C41 - C42 \qquad \text{[Expression 9]}$$

(2-4-3. Where a Force +Fz in the Positive Z-Axis Direction is Applied)

When a force +Fz in the positive Z-axis direction acts on the force receiving portions 218 and 219 of the force sensor 200c via the force receiving body 260, the capacitance value of the 1-1st capacitive element C11 decreases, the capacitance value of the 1-2nd capacitive element C12 increases, the capacitance value of the 2-1st capacitive element C21 increases, and the capacitance value of the 2-2nd capacitive element C22 decreases, as can be seen from FIG. 17. Further, the capacitance value of the 3-1st capacitive element C31 decreases, the capacitance value of the 3-2nd capacitive element C32 increases, the capacitance value of the 4-1st capacitive element C41 increases, and the capacitance value of the 4-2nd capacitive element C42 decreases. The increases/decreases in the capacitance values of these capacitive elements C11 through C42 are summarized in the column for Fz in FIG. 20.

More specifically, when the force +Fz is applied, the respective tilting portions 213A through 213D are displaced in the positive Z-axis direction in total. Therefore, the displacement caused in the 1-1st displacement portion D11 is the sum of the overall displacement of the first tilting portion 213A in the positive Z-axis direction and the displacement in the positive Z-axis direction due to the tilting movement of the beam 221A, and the displacement caused in the 1-2nd displacement portion D12 is the sum of the overall displacement of the tilting portion 213A in the positive Z-axis direction and the displacement in the negative Z-axis direction due to the tilting movement of the beam 221A. That is, if the changes in the capacitance values of the respective capacitive elements C11 and C12 are more accurately described, the distance between the 1-1st displacement electrode Em11 and the 1-1st fixed electrode Ef11 greatly increases by the amount equivalent to the overall displacement of the first tilting portion 213A in the positive Z-axis direction. In the 1-2nd capacitive element C12, on the other hand, the displacement due to the tilting movement of the first beam 221A is offset by the overall displacement of the first tilting portion 213A in the positive Z-axis direction, and therefore, the distance between the 1-2nd displacement electrode Em12 and the 1-2nd fixed electrode Ef12 slightly increases. The overall influence of the displacements of the tilting portions 213A through 213D in the positive Z-axis direction is also seen in the remaining capacitive elements C21 to C42.

However, for simplicity, the length of the respective beams 221A through 221D in the Z-axis direction is sufficiently greater than the length (height) of the respective tilting portions 213A through 221D in the Z-axis direction in this example. In view of this, the magnitudes (|ΔC11|, |ΔC21|, |ΔC31|, and |ΔC41|) of the changes in the capacitance values of the capacitive elements C11, C21, C31, and C41 provided in the first displacement portions D11, D21, D31, and D41 of the respective beams 221A through 221D can be regarded as equal to the magnitudes (|ΔC12|, |ΔC22|, |ΔC32|, and |ΔC42|) of the changes in the capacitance values of the capacitive elements C12, C22, C32, and C42 provided in the second displacement portions D12, D22, D32, and D42.

Accordingly, taking into account the changes in the capacitance values of the respective capacitive elements C11 through C42 in the same manner as in the above [Expression 7], the measuring unit 241 measures the applied force +Fz according to the following [Expression 10].

$$+Fz=-C11+C12+C21-C22-C31+C32+C41-C42 \quad \text{[Expression 10]}$$

(2-4-4. Where a Moment +Mx around the Positive X-Axis is Applied)

When a moment +Mx around the positive X-axis acts on the force receiving portions 218 and 219 of the force sensor 200c via the force receiving body 260, the capacitance value of the 1-1st capacitive element C11 decreases, the capacitance value of the 1-2nd capacitive element C12 increases, the capacitance value of the 2-1st capacitive element C21 increases, and the capacitance value of the 2-2nd capacitive element C22 decreases, as can be seen from FIG. 17.

Further, the capacitance value of the 3-1st capacitive element C31 increases, the capacitance value of the 3-2nd capacitive element C32 decreases, the capacitance value of the 4-1st capacitive element C41 decreases, and the capacitance value of the 4-2nd capacitive element C42 increases. The increases/decreases in the capacitance values of these capacitive elements C11 through C42 are summarized in the column for Mx in FIG. 20.

In this case, the respective tilting portions 213A through 213D are displaced in the Z-axis direction in total, as in the case where the force +Fz in the positive Z-axis direction is applied. Therefore, to be precise, it is necessary to take into account the displacements of the tilting portions 213A through 213D in evaluating the displacements of the respective displacement portions D11 through D42. However, the length of the respective beams 221A through 221D in the Z-axis direction is sufficiently greater than the length (height) of the respective tilting portions 213A through 221D in the Z-axis direction, as described above. Because of this, the overall displacements of the respective tilting portions 213A through 213D in the Z-axis direction can be ignored. That is, in this case, the magnitudes of the changes in the capacitance values of the capacitive elements C11, C21, C31, and C41 disposed in the displacement portions D11, D21, D31, and D41 of the respective beams 221A through 221D can also be regarded as equal to the magnitudes of the changes in the capacitance values of the capacitive elements C12, C22, C32, and C42 disposed in the other displacement portions D12, D22, D32, and D42. This also applies in the later described case where a moment +My around the positive Y-axis is applied.

Accordingly, taking into account the changes in the capacitance values of the respective capacitive elements C11 through C42 in the same manner as in the above [Expression 7], the measuring unit 241 measures the applied moment +Mx according to the following [Expression 11].

$$+Mx=-C11+C12+C21-C22+C31-C32-C41+C42 \quad \text{[Expression 11]}$$

(2-4-5. Where a Moment +My Around the Positive Y-Axis is Applied)

When a moment +My around the positive Y-axis acts on the force receiving portions 218 and 219 of the force sensor 200c via the force receiving body 260, the capacitance value of the 1-1st capacitive element C11 decreases, the capacitance value of the 1-2nd capacitive element C12 increases, the capacitance value of the 2-1st capacitive element C21 decreases, and the capacitance value of the 2-2nd capacitive element C22 increases, as can be seen from FIG. 17.

Further, the capacitance value of the 3-1st capacitive element C31 increases, the capacitance value of the 3-2nd capacitive element C32 decreases, the capacitance value of the 4-1st capacitive element C41 increases, and the capacitance value of the 4-2nd capacitive element C42 decreases. The increases/decreases in the capacitance values of these capacitive elements C11 through C42 are summarized in the column for My in FIG. 20.

Accordingly, taking into account the changes in the capacitance values of the respective capacitive elements C11 through C42 in the same manner as in the above [Expression 7], the measuring unit 241 measures the applied moment +My according to the following [Expression 12].

$$+My=-C11+C12-C21+C22+C31-C32+C41-C42 \quad \text{[Expression 12]}$$

(2-4-6. Where a Moment +Mz around the Positive Z-Axis is Applied)

When a moment +Mz around the positive Z-axis acts on the force receiving portions 218 and 219 of the force sensor 200c via the force receiving body 260, the capacitance value of the 1-1st capacitive element C11 decreases, the capacitance value of the 1-2nd capacitive element C12 increases, the capacitance value of the 2-1st capacitive element C21 decreases, and the capacitance value of the 2-2nd capacitive element C22 increases, as can be seen from FIG. 17.

Further, the capacitance value of the 3-1st capacitive element C31 decreases, the capacitance value of the 3-2nd capacitive element C32 increases, the capacitance value of the 4-1st capacitive element C41 decreases, and the capacitance value of the 4-2nd capacitive element C42 increases. The increases/decreases in the capacitance values of these capacitive elements C11 through C42 are summarized in the column for Mz in FIG. 20.

Accordingly, taking into account the changes in the capacitance values of the respective capacitive elements C11 through C42 in the same manner as in the above [Expression 7], the measuring unit 241 measures the applied moment +Mz according to the following [Expression 13].

$$+Mz = -C11 + C12 - C21 + C22 - C31 + C32 - C41 + C42 \quad \text{[Expression 13]}$$

It should be noted that, in cases where the negative forces −Fx, −Fy, and −Fz in the respective axis directions or the moments −Mx, −My, and −Mz around the respective negative axes act on the force receiving body 260 of the force sensor 200c, the increases/decreases in the distances between the electrodes of the respective capacitive elements C11 through C42 are reversed from those shown in FIG. 17, as described above. Therefore, to detect the forces −Fx, −Fy, and −Fz or the moments −Mx, −My, and −Mz, the signs of C11 through C42 in the right sides of [Expression 8] through [Expression 13] should be reversed.

<2-5. Other-Axis Sensitivity of the Force Sensor>

Referring now to FIG. 21, the other-axis sensitivity of the force sensor 200c according to this embodiment is described. FIG. 21 is a table as a list that shows the other-axis sensitivities VFx through VMz of the forces Fx, Fy, and Fz in the respective axis directions and the moments Mx, My, and Mz around the respective axes in the force sensor 200c shown in FIG. 18.

For ease of explanation, [Expression 8] through [Expression 13] are collectively shown below in [Expression 14]. In [Expression 14], the symbol "+" indicating that the force or the moment is positive is not shown.

[Expression 14]

$$Fx = C11 + C12 + C21 - C22 - C31 + C32 - C41 + C42 \quad \text{Expression 8:}$$

$$Fy = C11 - C12 - C21 + C22 - C31 + C32 + C41 - C42 \quad \text{Expression 9:}$$

$$Fz = -C11 - C12 - C12 + C21 - C22 - C31 + C32 + C41 - C42 \quad \text{Expression 10:}$$

$$Mx = -C11 + C12 + C21 - C22 + C31 - C32 - C41 + C42 \quad \text{Expression 11:}$$

$$My = -C11 + C12 - C21 + C22 + C31 - C32 + C41 - C42 \quad \text{Expression 12:}$$

$$Mz = -C + C12 - C21 + C22 - C31 + C32 - C41 + C42 \quad \text{Expression 13:}$$

The numbers shown in the table in FIG. 21 are values obtained by assigning the respective forces Fx, Fy, and Fz and the respective moments Mx, My, and Mz in the table shown in FIG. 20 to the respective right sides of the above [Expression 14] ([Expression 8] through [Expression 13]). Each capacitive element with the symbol "+" is represented by +1, and each capacitive element with the symbol "−" is represented by −1. That is, the number "8" shown in the cell where the column Fx and the row VFx intersect is the value obtained according to $C11 = C21 = C32 = C42 = +1$, and $C12 = C22 = C31 = C41 = -1$, which are based on the row for Fx in FIG. 20, in the expression for Fx ([Expression 8]). Also, the number "0" shown in the cell where the column Fx and the row VFy intersect is the value obtained according to $C11 = C22 = C32 = C41 = +1$, and $C12 = C21 = C31 = C42 = -1$, which are based on the row for Fy in FIG. 20, in the expression for Fx ([Expression 8]). The same applies to the numbers shown in the other cells.

According to FIG. 21, the other-axis sensitivities of Fx and My, and the other-axis sensitivities of Fy and Mx are 100%. Certainly, the signs of the right sides of [Expression 8] and [Expression 12] are the opposite, and the signs of the right sides of [Expression 9] and [Expression 11] are the opposite. Therefore, the force sensor 200c according to this embodiment cannot distinguish between Fx and My, and cannot distinguish between Fy and Mx, either. That is, the force sensor 200c cannot detect all the forces Fx, Fy, and Fz in the respective axis directions, and the moments Mx, My, and Mz around the respective axes. However, the force sensor 200c can be effectively used by limiting the use of the force sensor 200c to usage in which Fx and Fy are not applied or usage in which Mx and My are not applied.

According to this embodiment described above, displacements caused in the tilting portions 213A through 213D can be easily amplified by the actions of the beams 221A through 221D that are displaced by the tilting movements of the tilting portions 213A through 213D. Further, with the use of the 1-1st through 4-2nd capacitive elements C11 through C42, four components can be detected from among applied forces Fx, Fy, and Fz and applied moments Mx, My, and Mz, in accordance with the differences between changes in the capacitance values of these capacitive elements C11 through C42. That is, this embodiment can provide the force sensor 200c that is inexpensive but highly sensitive, and is hardly affected by temperature changes or in-phase noise in the use environment, because all the components of Fx through Mz calculated according to [Expression 8] through [Expression 13] are detected in accordance with differences.

Further, the displacement bodies 220A through 220D include connecting bodies 222A through 222D connecting the corresponding tilting portions 213A through 213D and the beams 221A through 221D, respectively, and the first displacement portions D11, D21, D31, and D41 and the second displacement portions D12, D22, D32, and D42 of the displacement bodies 220A through 220D are arranged symmetrically with respect to the connecting portions between the connecting bodies 222A through 222D and the corresponding beams 221A through 221D. Because of this, the displacements caused in the first displacement portions D11, D21, D31, and D41 and the displacements caused in the second displacement portions D12, D22, D32, and D42 are of the same magnitude but have different signs from each other, Thus, applied forces and moments can be detected through simple calculations.

The force sensor 200c also includes: the force receiving body 260 that is connected to the two force receiving portions 218 and 219 of the deformable body 210, and receives the applied forces Fx, Fy, and Fz and the moments Mx, My, and Mz; and the support 250 that is disposed to face the displacement bodies 220A through 220D, and is connected to the two fixed portions 216 and 217 of the deformable body 210. With this arrangement, it is possible to transmit the applied forces Fx, Fy, and Fz and the moments Mx, My, and Mz to the deformable body 210 without fail.

Further, the deformable body 210 has a ring-like shape, the two force receiving portions 218 and 219 are positioned symmetrically with respect to the origin O on the X-axis, and the two fixed portions 216 and 217 are positioned symmetrically with respect to the origin O on the Y-axis. With this arrangement, calculations for detecting the applied forces Fx, Fy, and Fz, and the moments Mx, My, and Mz are easy.

§ 3. Force Sensor According to a Third Embodiment of the Present Invention and Modifications Thereof

3-1. Force Sensor According to a Third Embodiment of the Present Invention

The force sensor 200c described in § 2 is capable of detecting four components from among the forces Fx, Fy, and Fz and moments Mx, My, and Mz in the respective axis directions. However, to detect these four components, it is not always necessary, to provide eight capacitive elements in a force sensor. In the description below, a force sensor capable of detecting four components with fewer capacitive elements according to a third embodiment will be described as a modification of the above described force sensor 200c.

Figure 22:
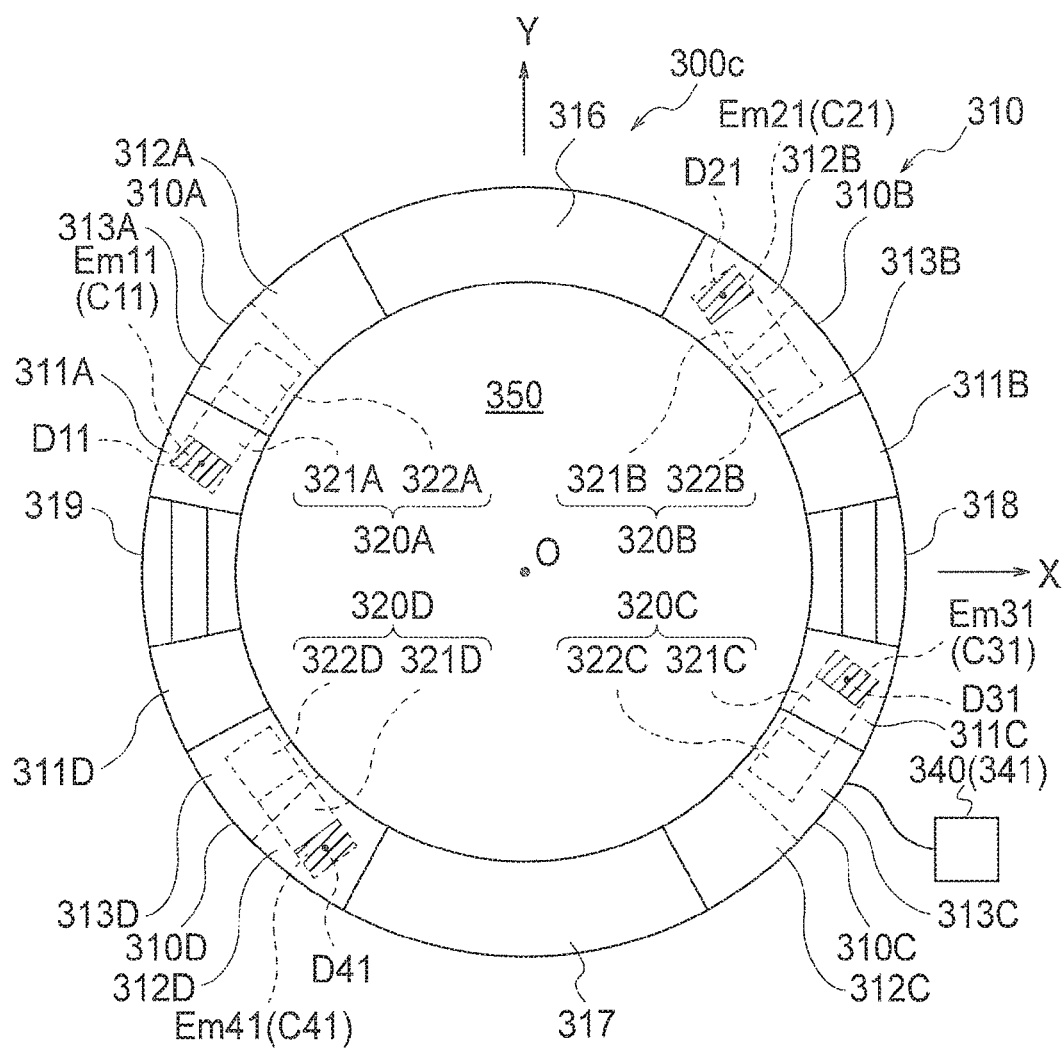
FIG. 22 is a schematic top view of a force sensor according to a third embodiment of the present invention.

FIG. 22 is a schematic top view of a force sensor 300c according to the third embodiment of the present invention.

As shown in FIG. 22, the force sensor 300c differs from the force sensor 200c according to the second embodiment in that beams 321A through 321D are designed as cantilever beams. Specifically, the beams 321A through 321D of the force sensor 300c each has a cantilever structure in which the top end portion in the clockwise direction in FIG. 18 is eliminated from each of the beams 221A through 221D of the force sensor 200c. Therefore, in the force sensor 300c, displacement portions D11, D21, D31, and D41 are formed in the beams 321A through 321D, respectively. Capacitive elements C11, C12, C31, and C41 are provided in the four displacement portions D11, D21, D31, and D41, respectively. The configuration of each of the capacitive elements C11 through C41 is the same as that of the second embodiment.

Although not shown in FIG. 22, the four capacitive elements C11 through C41 are connected to a measuring unit 341 of a detection circuit 340 by a predetermined circuit, and the capacitance values of the capacitive elements C11 through C41 are supplied to the measuring unit 341. As described later, the measuring unit 341 detects the force acting on the force sensor 300c, in accordance with changes in the capacitance values of the respective capacitive elements C11 through C41.

The other aspects of the force sensor 300c are the same as those of the second embodiment, Therefore, the same components as those of the second embodiment are denoted by substantially the same reference numerals as those used in the second embodiment, and detailed explanation thereof is not made herein.

Next, operation of the force sensor 300c according to this embodiment are described. The following is a description of a case where four components Fz, Mx, My, and Mz are detected from among forces Fx, Fy, and Fz in the respective axis directions and moments Mx, My, and Mz around the respective axes in the X-Y-Z three-dimensional coordinate system. It should be noted that these four components are four components the force sensor 200c according to the second embodiment can also detect.

As described above, the force sensor 300c according to this embodiment has substantially the same structure as the force sensor 200c according to the second embodiment, except that the beams 321A through 321D are designed as cantilever beams. Accordingly, when a force or a moment acts on force receiving portions 318 and 319 via a force receiving body 360, the detection portions D11, D21, D31, and D41 of the respective beams 321A through 321D have the same displacements as those of the corresponding detection portions D11, D21, D31, and D41 of the force sensor 200c according to the second embodiment.

Because of the above, when the four components Fz, Mx, My, and Mz of the forces and the moments act on the force sensor 300c, the capacitance values of the capacitive elements C11 through C41 change as shown in a list in FIG. 23. In the list, each symbol "+" indicates that the capacitance value increases, and each symbol "−" indicates that the capacitance value decreases, as in FIG. 20. In the table shown in FIG. 23, the increases/decreases in the capacitance values of the four capacitive elements C11, C21, C31, C41 are the same as those observed when the force Fz and the moments Mx, My, and Mz in FIG. 20 are applied.

In accordance with such changes in the capacitance values, the measuring unit 341 measures the applied force Fz and the moments Mx, My, and Mz according to [Expression 15] shown below. [Expression 15] is obtained by eliminating C12, C22, C32, and C42 from the expressions of Fz, Mx, My, and Mz in [Expression 14].

$$Fz = -C11 + C21 - C31 + C41$$

$$Mx = -C11 + C21 + C31 - C41$$

$$My = -C11 - C21 + C31 + C41$$

$$Mz = -C11 - C21 - C31 - C41 \qquad \text{[Expression 15]}$$

Where the other-axis sensitivities of the force Fz and the moments Mx, My, and Mz are calculated according to [Expression 15], the results are as shown in FIG. 24. The other-axis sensitivities are values obtained by assigning the force Fz and the moments Mx, My, and Mz in the table shown in FIG. 23 to the respective right sides of the above [Expression 15]. Each capacitive element with the symbol "+" is represented by +1, and each capacitive element with the symbol "−" is represented by −1, as in FIG. 21. As shown in FIG. 24, the other-axis sensitivities of the force Fz and the moments Mx, My, and Mz are zero. However, according to [Expression 15], the moment Mz around the Z-axis is obtained as the stun of C11 through C41. Therefore, it is necessary to pay attention to the point that the moment Mz is easily affected by temperature changes and in-phase noise in the use environment of the force sensor 300c.

According to this embodiment described above, displacements caused in the tilting portions 313A through 313D can be easily amplified by the actions of the beams 321A through 321D that are displaced by the tilting movements of the tilting portions 313A through 313D. Further, except for the moment Mz around the Z-axis, the applied force Fz and the moments Mx and My can be detected in accordance with the differences between changes in the capacitance values of the four capacitive elements C11 through C41. That is, this embodiment can provide the force sensor 300c that is inexpensive but highly sensitive, and is hardly affected by temperature changes or in-phase noise in the use environment with respect to the force Fz and the moments Mx and My.

The force sensor 300c also includes: the force receiving body 360 that is connected to the two force receiving portions 318 and 319 of a deformable body 310, and receives the applied force Fz and the moments Mx, My, and Mz; and a fixed body 350 that is disposed to face respective displacement bodies 320A through 320D, and is connected to two fixed portions 316 and 317 of the deformable body 310. With this arrangement, it is possible to transmit the applied force Fz and the moments Mx, My, and Mz to the deformable body 310 without fail.

Further, the deformable body 310 has a ring-like shape, the two force receiving portions 318 and 319 are positioned symmetrically with respect to the origin O on the X-axis, and the two fixed portions 316 and 317 are positioned symmetrically with respect to the origin O on the Y-axis. With this arrangement, calculations for detecting the applied force Fz and the moments Mx, My, and Mz are easy.

3-2. Force Sensor According to a Modification

As described above, when measuring the moment Mz around the Z-axis, the force sensor 300c is easily affected by temperature changes or in-phase noise in the use environment. Therefore, it is more preferable for a force sensor to be less affected by those factors when measuring the moment Mz. The following is a description of a force sensor as a modification that has six capacitive elements.

Figure 25:
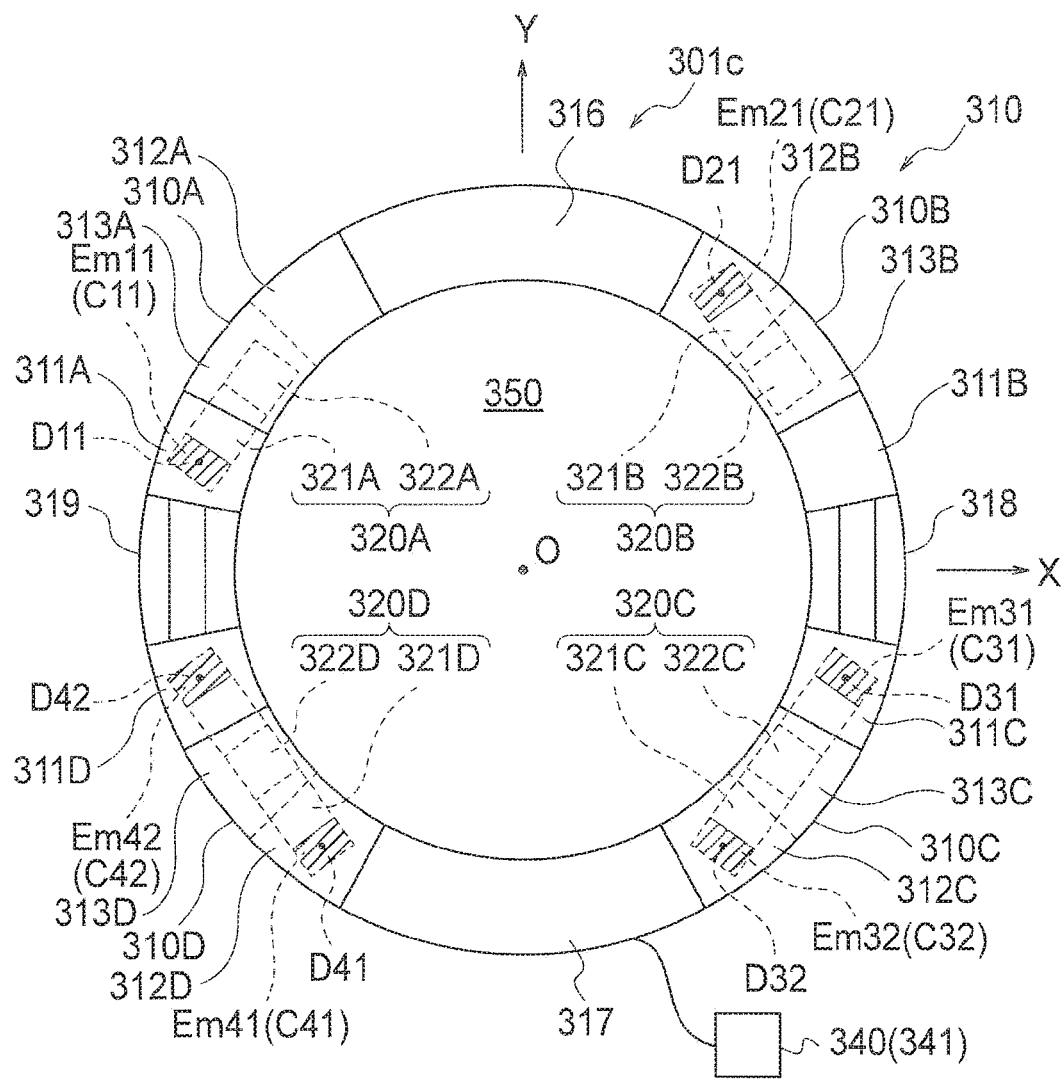
FIG. 25 is a schematic top view of a force sensor according to a modification of FIG. 22.

FIG. 25 is a schematic top view of a force sensor 301c according to a modification of the third embodiment.

As shown in FIG. 25, the force sensor 301c differs from the force sensor 200c according to the second embodiment in that first and second beams 321A and 321B are designed as cantilever beams. Specifically, the first and second beams 321A and 321B of the force sensor 301c according to this modification are the same as the first and second beams 321A and 321B of the force sensor 300c according to the third embodiment, and third and fourth beams 321C and 321D of the force sensor 301c are the same as the third and fourth beams 221C and 221D of the force sensor 200c according to the second embodiment shown in FIG. 18. Therefore, in the force sensor 301c, a 1-1st displacement portion D11 is formed in the first beam 321A, a 2-1st displacement portion D21 is formed in the second beam 321B, a 3-1st displacement portion D31 and a 3-2nd displacement portion D32 are formed in the third beam 321C, and a 4-1st displacement portion D41 and a 4-2nd displacement portion D42 are formed in the fourth beam 321D. The layout of the 3-1st displacement portion D31, the 3-2nd displacement portion D32, the 4-1st displacement portion D41, and the 4-2nd displacement portion D42 is identical to the layout of the displacement portions D31 through D42 of the force sensor 200c according to the second embodiment. Capacitive elements C11, C21, C31, C32, C41, and C42 are provided in the six displacement portions D11, D21, D31, D32, D41, and D42, respectively. The configuration of each of the capacitive elements is the same as that of the second embodiment.

Although not clearly shown in FIG. 25, these six capacitive elements C11, C21, C31, C32, C41, and C42 are connected to a measuring unit 341 by a predetermined circuit, and the capacitance values of the respective capacitive elements are supplied to the measuring unit 341. As described later, the measuring unit 341 detects the force acting on the force sensor 301c, in accordance with changes in the capacitance values of the respective capacitive elements.

The other aspects of the force sensor 301c are the same as those of the second embodiment. Therefore, the same components as those of the second embodiment are denoted by substantially the same reference numerals as those used in the second embodiment, and detailed explanation thereof is not made herein.

Next, operation of the force sensor 301c according to this embodiment is described. The following is a description of a case where four components Fz, Mx, My, and Mz are detected from among forces Fx, Fy, and Fz in the respective axis directions and moments Mx, My, and Mz around the respective axes in the X-Y-Z three-dimensional coordinate system, as in the third embodiment.

When a force or a moment acts on the force receiving portions 318 and 319 via the force receiving body 360 of the force sensor 301c according to this embodiment, the six detection portions D11, D21, D31, D32, D41, and D42 have the same displacements as those of the corresponding detection portions D11, D21, D31, D32, D41, and D42 of the force sensor 200c according to the second embodiment.

Therefore, when a force and moments act on the force sensor 301c, the capacitance value of each capacitive element changes like the capacitance value of each corresponding capacitive element shown in FIG. 20. In accordance with such changes in the capacitance values, the measuring unit 341 measures the applied force Fz and the moments Mx, My, and Mz according to [Expression 16] shown below. Of the four expressions shown in [Expression 16], the expressions of Fz, Mx, and My are identical to the corresponding expressions in [Expression 15]. In [Expression 16], all the other-axis sensitivities of the force Fz and the moments Mx, My, and Mz are of course zero.

$Fz = -C11 + C21 - C31 + C41$ $Mx = -C11 + C21 + C31 - C41$ $My = -C11 - C21 + C31 \pm C41$ $Mz = -C11 - C21 + C32 + C42$ [Expression 16]

According to this embodiment described above, the effects described in the third embodiment can be achieved, and further, the moment Mz around the Z-axis can be calculated in accordance with differences. Thus, the influence of temperature changes and in-phase noise in the use environment of the force sensor 301c can be eliminated, and the moment Mz can be measured with high precision.

3-3. Force Sensors According to Further Modifications (3-3-1, Modification 1)

Although a force sensor from which the four capacitive elements C12, C22, C32, and C42 are eliminated is shown as the force sensor 300c for detecting the force Fz and the moments Mx, My, and Mz in FIG. 22, this embodiment is not limited to such a mode. Another example of a force sensor may exclude the four capacitive elements C11, C22, C31, and C42. That is, this force sensor has the four capacitive elements C12, C21, C32, and C41.

The increases/decreases in the respective capacitive elements C12, C21, C32, and C41 when the force and the moments act on the force sensor are identical to the increases/decreases in the capacitive elements C12, C21, C32, and C41 shown in FIG. 20. Accordingly, the measuring unit 341 of this force sensor measures the applied force Fz and the moments Mx, My, and Mz according to [Expression 17] shown below. [Expression 17] is obtained by eliminating C11, C22, C31, and C42 from the expressions of Fz, Mx, My, and Mz in [Expression 14].

$Fz = C12 + C21 + C32 + C41$ $Mx = C12 + C21 - C32 - C41$ $My=C12-C21-C32+C41$ $Mz=C12-C21+C32-C41$ [Expression 17]

Where the other-axis sensitivities of the force Fz and the moments Mx, My, and Mz are calculated in accordance with the increases/decreases in the respective capacitive elements C12, C21, C32, and C41, and [Expression 17], the results are identical to those shown in FIG. 24. Accordingly, the other-axis sensitivities of the force Fz and the moments Mx, My, and Mz are zero. However, according to [Expression 17], the force Fz in the Z-axis direction is obtained in accordance with the sum of C12, C21, C32, and C41. Therefore, it is necessary to pay attention to the point that the force Fz is easily affected by temperature changes and in-phase noise in the use environment of the force sensor.

(3-3-2. Modification 2)

Alternatively, a force sensor from which the four capacitive elements C12, C21, C32, and C41 are eliminated may be used as the force sensor 300c for detecting the force Fz and the moments Mx, My, and Mz.

That is, this force sensor has the four capacitive elements C11, C22, C31, and C42.

The increases/decreases in the respective capacitive elements C12, C21, C32, and C41 when the force and the moments act on the force sensor are identical to the increases/decreases in the capacitive elements C11, C22, C31, and C42 shown in FIG. 20. Accordingly, the measuring unit 341 of this force sensor measures the applied force Fz and the moments Mx, My, and Mz according to [Expression 18] shown below. [Expression 18] is the same as an expression obtained by eliminating C12, C21, C32, and C41 from the expressions of Fz, Mx, My, and Mz in [Expression 14].

$Fz=-C11-C22-C31-C42$ $Mx=-C11-C22+C31+C42$ $My=-C11+C22+C31-C42$ $Mz=-C11+C22-C31+C42$ [Expression 18]

Where the other-axis sensitivities of the force Fz and the moments Mx, My, and Mz are calculated in accordance with the increases/decreases in the respective capacitive elements C11, C22, C31, and C42, and [Expression 18], the results are identical to those shown in FIG. 24. Accordingly, the other-axis sensitivities of the force Fz and the moments Mx, My, and Mz are zero. However, according to [Expression 18], the force Fz in the Z-axis direction is obtained in accordance with the sum of C11, C22, C31, and C42. Therefore, in this modification, it is also necessary to pay attention to the point that the force Fz, is easily affected by temperature changes and in-phase noise in the use environment of the force sensor.

§ 4. Force Sensor According to a Fourth Embodiment of the Present Invention and Modifications Thereof

4-1. Force Sensor According to a Fourth Embodiment of the Present Invention In § 3, force sensors that are particularly suitable for measuring mainly the moments Mx, My, and Mz have been described as the third embodiment and modifications thereof. The following is a description of a force sensor according to a fourth embodiment suitable for measuring mainly the forces Fx, Fy, and Fz.

Figure 26:
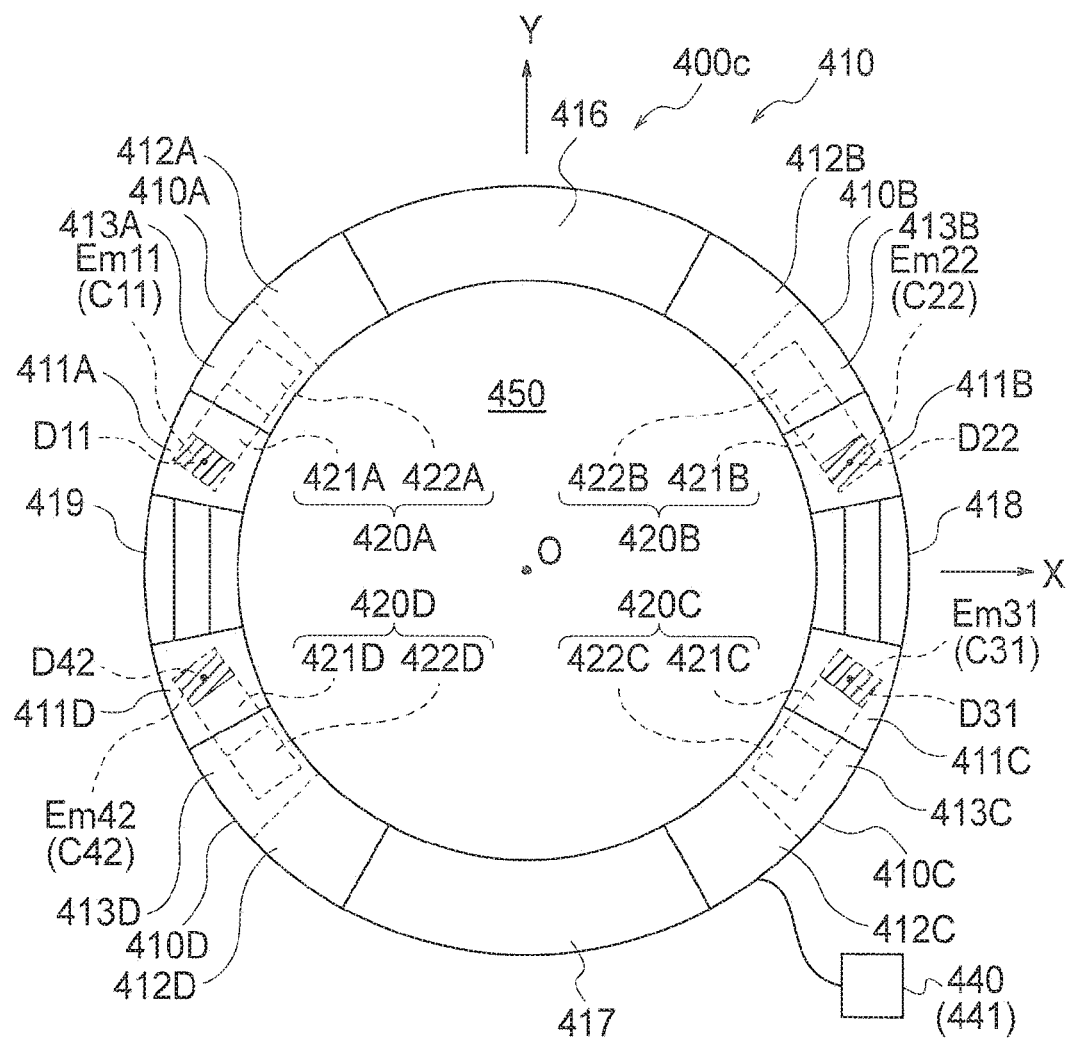
FIG. 26 is a schematic top view of a force sensor according to a fourth embodiment of the present invention.

FIG. 26 is a schematic top view of a force sensor 400c according to the fourth embodiment of the present invention, The force sensor 400c according to this embodiment is the same as the force sensor 300c of the third embodiment having four capacitive elements, except for the layout thereof. Specifically, the beams 421A through 421D of the force sensor 400c each has a cantilever structure in which the portion on the side of the fixed portions 216 and 217 is eliminated from each of the beams 221A through 221D of the force sensor 200c. Therefore, in the force sensor 400c, displacement portions D11, D22, D31, and D42 are formed in the beams 421A through 421D, respectively. Capacitive elements C11, C22, C31, and C42 are provided in the four displacement portions D11, D22, D31, and D42, respectively. The configuration of each of the capacitive elements is the same as that of the second embodiment.

Although not clearly shown in FIG. 26, these four capacitive elements C11, C22, C31, and C42 are connected to a measuring unit 441 by a predetermined circuit, and the capacitance values of the respective capacitive elements are supplied to the measuring unit 441. As described later, the measuring unit 441 detects the force acting on the force sensor 400c, in accordance with changes in the capacitance values of the respective capacitive elements.

The other aspects of the force sensor 400c are the same as those of the second and third embodiments. Therefore, the same components as those of the second and third embodiments are denoted by substantially the same reference numerals as those used in the second and third embodiments, and detailed explanation thereof is not made herein.

Next, operation of the force sensor 400c according to this embodiment is described. The following is a description of a case where four components Fx, Fy, Fz, and Mz are detected from among forces Fx, Fy, and Fz in the respective axis directions and moments Mx, My, and Mz around the respective axes in the X-Y-Z three-dimensional coordinate system. It should be noted that these four components are four components the force sensor 200c according to the second embodiment can also detect.

Figure 27:
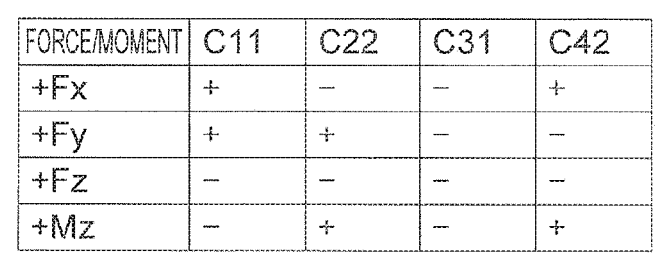

FIG. 27 is a table as a list showing changes in the capacitance values of the respective capacitive elements in a case where the four components Fx, Fy, Fz, and Mz of the forces and the moments act on the force sensor 400c shown in FIG. 26. As described above, the force sensor 400c according to this embodiment has the same structure as the force sensor 200c according to the second embodiment, except that the beams 421A through 421D are designed as cantilever beams. Accordingly, when a force or a moment acts on force receiving portions 418 and 419 via a force receiving body 460, the detection portions D11, D22, D31, and D42 of the respective beams 421A through 421D have the same displacements as those of the corresponding detection portions D11, D22, D31, and D42, respectively, in the force sensor 200c according to the second embodiment.

Because of the above, when the four components Fx, Fy, Fz, and Mz of the forces and the moments act on the force sensor 400c, the capacitance values of the respective capacitive elements change as shown in a list in FIG. 27. In the list, each symbol "+" indicates that the capacitance value increases, and each symbol "−" indicates that the capacitance value decreases, as in FIG. 20. In the table shown in FIG. 27, the increases/decreases in the capacitance values of the four capacitive elements C11, C22, C31, C42 are identical to those observed when the forces Fx, Fy, and Fz and the moment Mz in FIG. 20 are applied.

In accordance with such changes in the capacitance values, the measuring unit 441 measures the applied forces Fx, Fy, and Fz and the moment Mz according to [Expression 19] shown below. [Expression 19] is the same as an expression obtained by eliminating C11, C21, C32, and C41 from the expressions of Fz, Mx, My, and Mz in [Expression 14].

$$Fx = C11 - C22 - C31 + C42$$

$$Fy = C11 + C22 - C31 - C42$$

$$Fz = -C11 - C22 - C31 - C42$$

$$Mz = -C11 + C22 - C31 + C42 \qquad \text{[Expression 19]}$$

Where the other-axis sensitivities of the forces Fx, Fy, and Fz and the moment Mz are calculated according to [Expression 19], the results are all zero as shown in the list in FIG. 24. The method of calculating other-axis sensitivities is the same as that of the other embodiments. However, according to [Expression 19], the force Fz in the Z-axis direction is obtained in accordance with the sum of C11, C22, C31, and C42. Therefore, it is necessary to pay attention to the point that the force Fz is easily affected by temperature changes and in-phase noise in the use environment of the force sensor 400c.

According to this embodiment described above, displacements caused in the tilting portions 413A through 413B can be easily amplified by the actions of the beams 421A through 421D that are displaced by the tilting movements of the tilting portions 413A through 413D. Further, except for the force Fz in the Z-axis direction, the applied forces Fx and Fy, and the moment Mz can be detected in accordance with the differences between changes in the capacitance values of the four capacitive elements C11, C22, C31, and C42. That is, this embodiment can provide the force sensor 400c that is inexpensive but highly sensitive, and is hardly affected by temperature changes or in-phase noise in the use environment with respect to the forces Fx and Fy and the moment Mz.

The force sensor 400c also includes: the force receiving body 460 that is connected to the two force receiving portions 418 and 419 of a deformable body 410, and receives the applied forces Fx, Fy, and Fz, and the moment Mz; and a fixed body 450 that is disposed to face respective displacement bodies 420A through 420D, and is connected to two fixed portions 416 and 417 of the deformable body 410. With this arrangement, it is possible to transmit the applied forces Fx, Fy, and Fz and the moment Mz to the deformable body 410 without fail.

Further, the deformable body 410 has a ring-like shape, the two force receiving portions 418 and 419 are positioned symmetrically with respect to the origin O on the X-axis, and the two fixed portions 416 and 417 are positioned symmetrically with respect to the origin O on the Y-axis. With this arrangement, calculations for detecting the applied forces Fx, Fy, and Fz and the moment Mz are easy.

4-2. Force Sensor According to a Modification

As described above, when measuring the force Fz in the Z-axis direction, the force sensor 400c is easily affected by temperature changes or in-phase noise in the use environment. Therefore, it is more preferable for a force sensor to be less affected by those factors when measuring the force Fz. The following is a description of a force sensor as a modification that has six capacitive elements.

Figure 28:
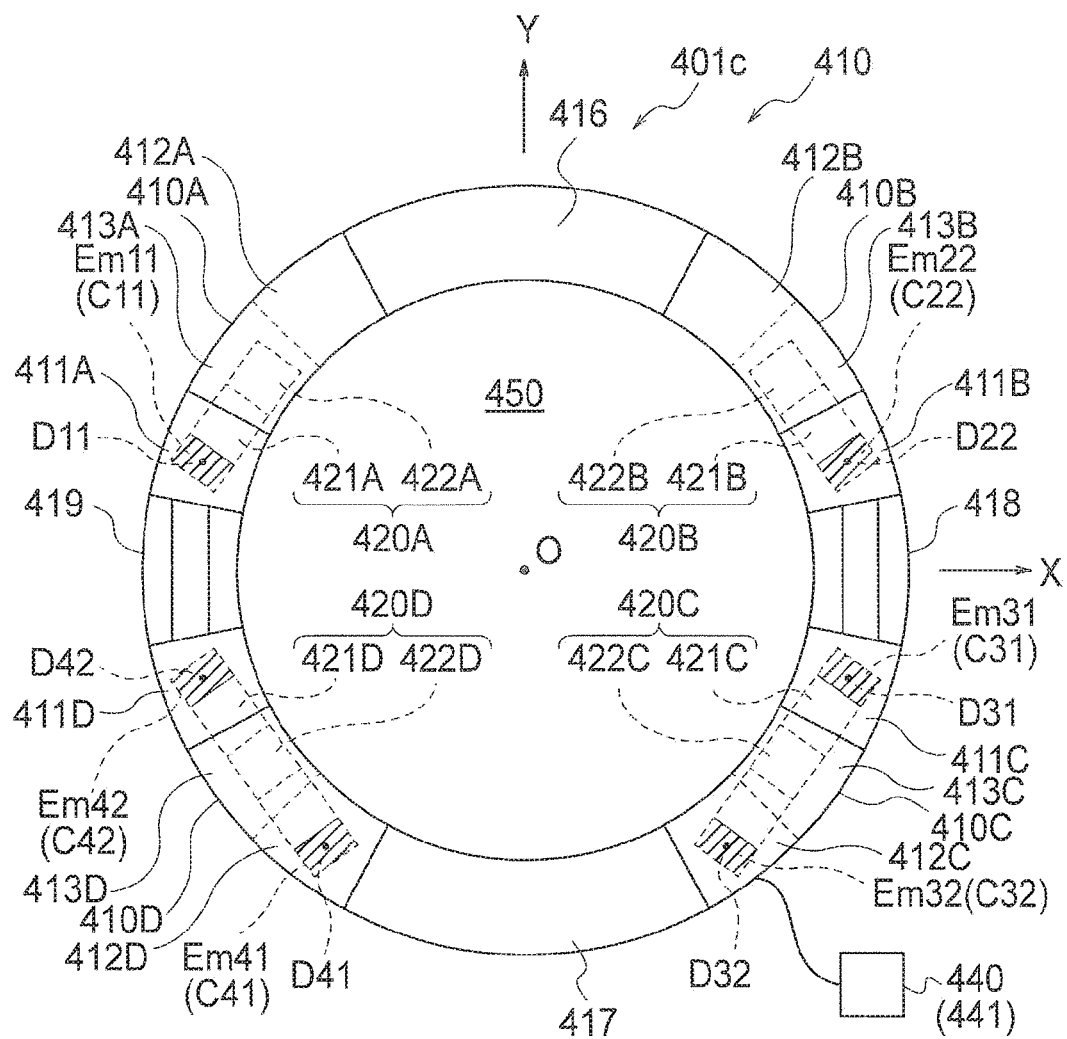
FIG. 28 is a schematic top view of a force sensor according to a modification of FIG. 26.

FIG. 28 is a schematic top view of a force sensor 401c according to a modification of the fourth embodiment.

As shown in FIG. 28, the force sensor 401c differs from the force sensor 200c according to the second embodiment in that first and second beams 421A and 421B are designed as cantilever beams. Specifically, the first and second beams 421A and 421B of the force sensor 401c are the same as the first and second beams 421A and 421B of the force sensor 400c according to the fourth embodiment, and third and fourth beams 4210 and 421D of the force sensor 401c are the same as the third and fourth beams 221C and 221D of the force sensor 200c according to the second embodiment shown in FIG. 18. Therefore, in the force sensor 401c, a 1-1st displacement portion D11 is formed in the first beam 421A, a 2-2nd displacement portion D22 is formed in the second beam 421B, a 3-1st displacement portion D31 and a 3-2nd displacement portion D32 are formed in the third beam 421C, and a 4-1st displacement portion D41 and a 4-2nd displacement portion D42 are formed in the fourth beam 421D. The layout of the 3-1st displacement portion D31, the 3-2nd displacement portion D32, the 4-1st displacement portion D41, and the 4-2nd displacement portion D42 is identical to the layout of the displacement portions D31 through D42 of the force sensor 200c according to the second embodiment. Capacitive element C11, C22, C31, C32, C41, and C42 are provided in the six displacement portions D11, D22, D31, D32, D41, and D42, respectively. The configuration of each of the capacitive elements is the same as that of the second embodiment.

Although not clearly shown in FIG. 28, these six capacitive elements C11, C22, C31, C32, C41, and C42 are connected to a measuring unit 441 by a predetermined circuit, and the capacitance values of the respective capacitive elements are supplied to the measuring unit 441. As described later, the measuring unit 441 detects the force acting on the force sensor 401c, in accordance with changes in the capacitance values of the respective capacitive elements.

The other aspects of the force sensor 401c are the same as those of the second embodiment. Therefore, the same components as those of the second embodiment are denoted by substantially the same reference numerals as those used in the second embodiment, and detailed explanation thereof is not made herein.

Next, operation of the force sensor 401c according to this embodiment is described. The following is a description of a case where four components Fx, Fy, Fz, and Mz are detected from among forces Fx, Fy, and Fz in the respective axis directions and moments Mx, My, and Mz around the respective axes in the X-Y-Z three-dimensional coordinate system, as in the fourth embodiment.

When a force or a moment acts on the force receiving portions 418 and 419 via the force receiving body 460 in the force sensor 401c according to this embodiment, the six detection portions D11, D22, D31, D32, D41, and D42 have the same displacements as those of the corresponding detection portions D11, D22, D31, D32, D41, and D42 of the force sensor 200c according to the second embodiment.

Therefore, when forces and a moment act on the force sensor 401c, the capacitance value of each capacitive element changes like the capacitance value of each corresponding capacitive element shown in FIG. 20 (or FIG. 27, as for C11, C22, C31, and C42). In accordance with such changes in the capacitance values, the measuring unit 441 measures the applied forces Fx, Fy, and Fz and the moment Mz according to [Expression 20] shown below. Of the four expressions shown in [Expression 20], the expressions of Fx, Fy, and Mz are identical to the corresponding expressions in [Expression 19]. In [Expression 20], all the other-axis sensitivities of the force Fx, Fz and the moment Mz are of course zero.

$Fx=C11-C22-C31+C42$ $Fy=C11+C22-C31-C42$ $Fz=-C11-C22+C32+C41$ $Mz=-C11+C22-C31+C42$ [Expression 20]

According to this embodiment described above, the effects described in the fourth embodiment can be achieved, and further, the force Fz in the Z-axis direction can be calculated in accordance with differences. Thus, the influence of temperature changes and in-phase noise in the use environment of the force sensor 401c can be eliminated, and the force Fz can be measured with high precision.

As described above in § 3 and § 4, four force sensors 100c shown in FIG. 1 are arranged in a closed-loop form so that four components (the set of Fz, Mx, My, and Mz, or the set of Fx, Fy, Fz, and Mz) of forces can be detected. It is of course also possible to detect only any desired component(s) from among the four components.

The force sensors 300c, 301c, 400c, and 401c according to the respective embodiments and their modifications described in § 3 and § 4 have been explained as models in which specific beams are replaced with cantilever structures. However, the present invention is not limited to such examples. While the doubly supported beam structures shown in FIG. 18 are maintained, applied forces and moments may be measured in accordance with changes in the capacitance values of any particular capacitive elements used in the force sensor 300c, 301c, 400c, or 401c.

§ 5. Force Sensor According to a Fifth Embodiment of the Present Invention

<5-1. Configuration of a Basic Structure>

Next, a force sensor according to a fifth embodiment of the present invention is described.

Figure 29:
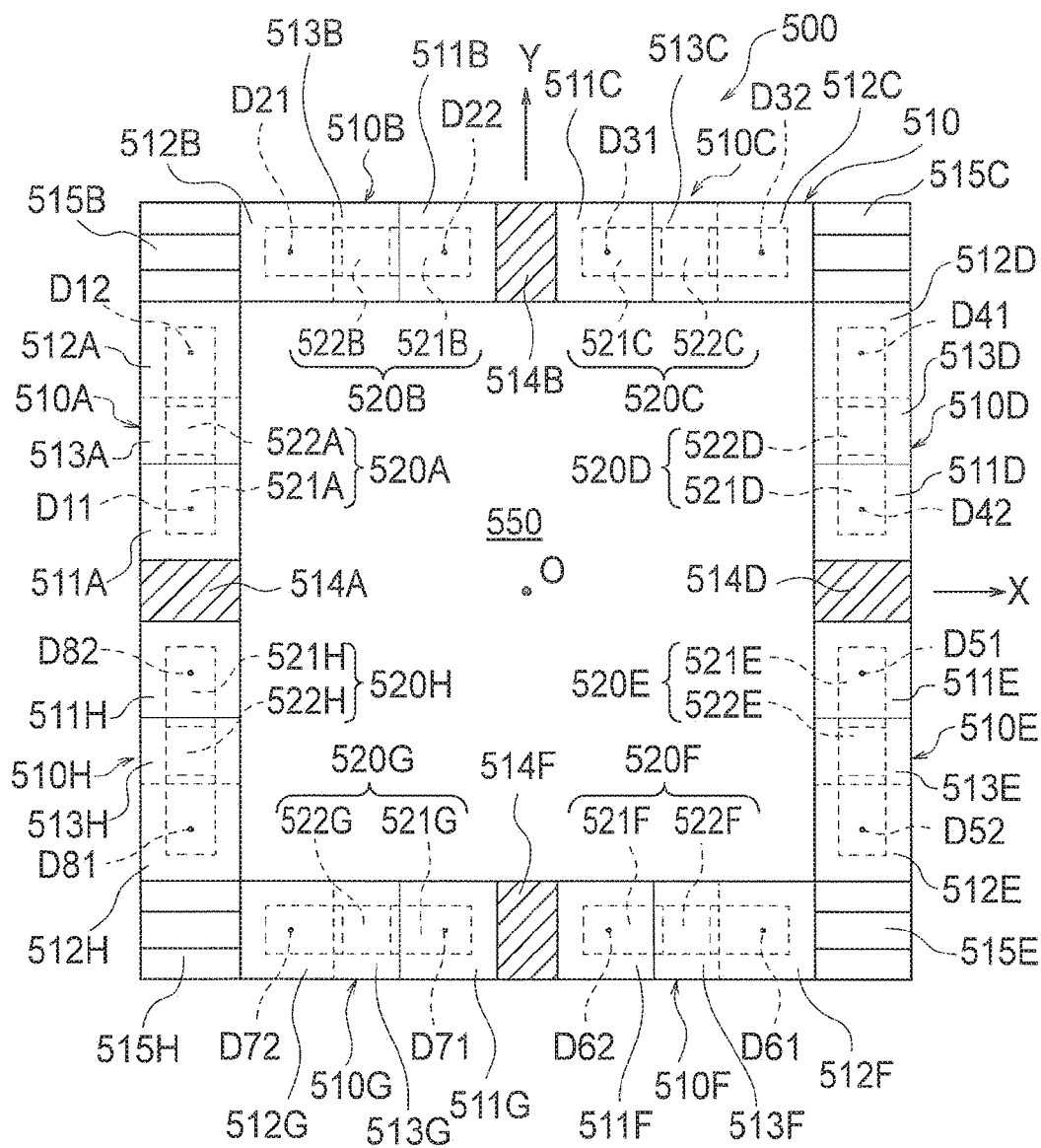
FIG. 29 is a schematic top view of the basic structure of a force sensor according to a fifth embodiment of the present invention.
Figure 30:
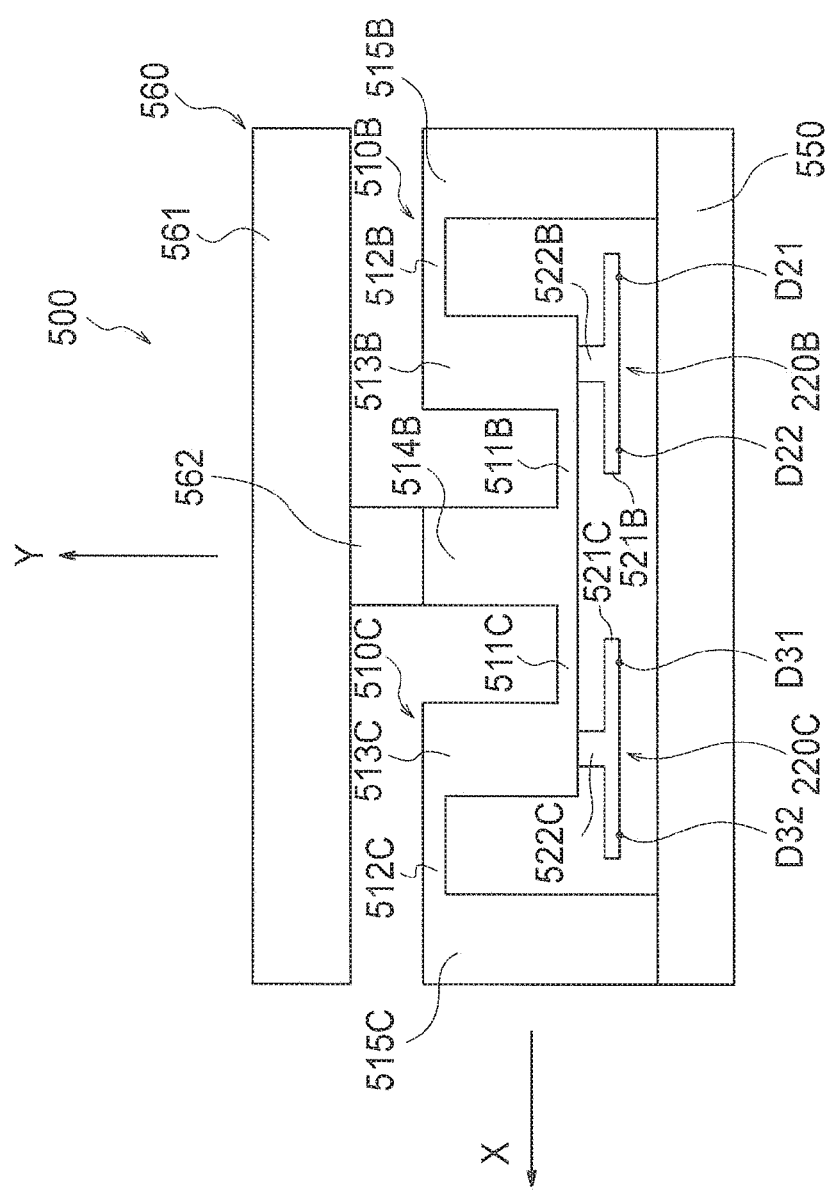
FIG. 30 is a schematic side view of the basic structure as viewed from the positive Y-axis side in FIG. 29.

FIG. 29 is a schematic top view of a basic structure 500 of a force sensor according to the fifth embodiment of the present invention. FIG. 30 is a schematic side view of the basic structure 500 as viewed from the positive Y-axis side. This embodiment is described below, with the X-Y-Z three-dimensional coordinate system being defined as shown in FIGS. 29 and 30. For ease of explanation, a force receiving body 560 is not shown in FIG. 29.

As shown in FIGS. 29 and 30, the basic structure 500 includes a rectangular deformable body 510 that is a closed-loop rectangular deformable body, and eight displacement bodies 520A through 520H. The rectangular deformable body 510 includes: four force receiving portions 514A, 514B, 514D, and 514F; four fixed portions 515B, 515C, 515E, and 515H arranged together with the four force receiving portions 514A, 514B, 514D, and 514F alternately along a closed-loop path; and eight deformable elements 510A through 510H that are disposed one by one in the eight spaces formed between the force receiving portions and the fixed portions, which are adjacent to one another along the closed-loop path, and are elastically deformed by a force or a moment acting on the force receiving portions 514A, 514B, 514D, and 514F. The displacement bodies 520A through 520H are connected to the deformable elements 510A through 510H, respectively, and are displaced by elastic deformation caused in the deformable elements 510A through 510H.

As shown in FIG. 29, the four force receiving portions 514A, 514B, 514D, and 5114F are disposed on the positive X-axis, the negative X-axis, the positive Y-axis, and the negative Y-axis, respectively, and are at equal distances from the origin O. Meanwhile, the four fixed portions 515B, 515C, 515E, and 515H are disposed one by one on a straight line that passes through the origin O and forms an angle of 45 degrees counterclockwise with respect to the positive X-axis, and on a straight line that passes through the origin O and forms an angle of 45 degrees counterclockwise with respect to the positive Y-axis, and are arranged symmetrically with respect to the origin O. These four fixed portions 515B, 515C, 515E, and 515H form the four vertices of the rectangular deformable body 510. Therefore, as shown in FIG. 29, the rectangular deformable body 510 has a square shape when viewed from the Z-axis direction.

As for the layout of the respective deformable elements 510A through 510H of the rectangular deformable body 510, the first deformable element 510A and the eighth deformable element 510H disposed on both sides of the first force receiving portion 514A disposed on the negative X-axis, and the fourth deformable element 510D and the fifth deformable element 510E disposed on both sides of the third force receiving portion 514D disposed on the positive X-axis both extend in parallel to the Y-axis. Also, the second deformable element 510B and the third deformable element 510C disposed on both sides of the second force receiving portion 514B disposed on the positive Y-axis, and the sixth deformable element 510F and the seventh deformable element 510G disposed on both sides of the fourth force receiving portion 514F disposed on the negative Y-axis both extend parallel to the X-axis.

Next, the configuration of each of the deformable elements 510A through 510H is described. In the description below, the configurations of the second and third deformable elements 510B and 510C are explained in detail with reference to FIGS. 29 and 30, and the configurations of the remaining deformation elements are described on the basis of the explanation.

As shown in FIGS. 29 and 30, the second deformable element 510B that is disposed parallel to the X-axis in the second quadrant (the upper left region in FIG. 29) of the X-Y plane is located between the first fixed portion 515B disposed on the negative X-axis side and the second force receiving portion 514B disposed on the Y-axis. The second deformable element 510B includes a second tilting portion 513B having the Z-axis direction (the depth direction in FIG. 29) as its longitudinal direction, a 2-1st deformable portion 511B connecting the second force receiving portion 514B and the second tilting portion 513B, and a 2-2nd deformable portion 512B connecting the first fixed portion 515B and the second tilting portion 513B. As shown in FIG. 30, the 2-1st deformable portion 511B extends parallel to the X-Y plane, and is connected to the second tilting portion 513B at the end portion (the lower end portion in FIG. 30) of the second tilting portion 513B on the negative Z-axis side. The 2-2nd deformable portion 512B extends parallel to the X-Y plane, and is connected to the second tilting portion 513B at the end portion (the upper end portion in FIG. 30) of the second tilting portion 513B on the positive Z-axis side.

As shown in FIGS. 29 and 30, the third deformable element 510C that is disposed parallel to the X-axis in the first quadrant (the upper right region in FIG. 29) of the X-Y plane is located between the second fixed portion 515C disposed on the positive X-axis side and the second force receiving portion 514B disposed on the Y-axis. The third deformable element 510C includes a third tilting portion 513C having the Z-axis direction as its longitudinal direction, a 3-1st deformable portion 511C connecting the second force receiving portion 514B and the third tilting portion 513C, and a 3-2nd deformable portion 5120 connecting the second fixed portion 515C and the third tilting portion 513C. As shown in FIG. 30, the 3-1st deformable portion 511C extends parallel to the X-Y plane, and is connected to the third tilting portion 513C at the end portion (the lower end) of the third tilting portion 5130 on the negative Z-axis side. The 3-2nd deformable portion 512C extends parallel to the X-Y plane, and is connected to the third tilting portion 513C at the end portion (the upper end) of the third tilting portion 513C on the positive Z-axis side.

Further, although not specifically shown in the drawings, the first deformable element 510A and the eighth deformable element 510H disposed parallel to the Y-axis in the region where the X-coordinate is negative (the region on the left side of the Y-axis in FIG. 29) correspond to the configurations of the third deformable element 510C and the second deformable element 510B, respectively, if the second and third deformable elements 510B and 510C are rotated 90 degrees counterclockwise around the origin O.

Also, the fourth deformable element 510D and the fifth deformable element 510E disposed parallel to the Y-axis in the region where the X-coordinate is positive (the region on the right side of the Y-axis in FIG. 29) correspond to the configurations of the second deformable element 510B and the third deformable element 510C, respectively, if the second and third deformable elements 510B and 510C are rotated 90 degrees clockwise around the origin O. The sixth deformable element 510F and the seventh deformable element 510G disposed parallel to the X-axis in the region where the Y-coordinate is negative (the region on the lower side of the X-axis in FIG. 29) correspond to the configurations of the second deformable element 510B and the third deformable element 510C, respectively, if the second and third deformable elements 5110B and 5110C, are rotated 180 degrees clockwise around the origin O.

As the above correspondence relationships have been described, the first and fourth through eighth deformable elements 510A and 510D through 510H are not described in detail herein. It should be noted that, in FIGS. 29 and 30, "A" and "D" through "H" are attached to the ends of the reference numerals for the components of the first and fourth through eighth deformable elements 510A and 510D through 510H, respectively.

Further, the lower end portions of the respective fixed portions 515B, 515C, 515E, and 515H of the basic structure 500 are connected to a support 550, with a predetermined distance being kept from first through eighth beams 521A through 521H that will be described later.

As shown in FIGS. 29 and 30, the above described eight displacement bodies 520A through 520H are connected one by one to the lower ends (the end on the negative Z-axis side) of the respective tilting portions 513A through 513H of the first through eighth deformable elements 510A through 510H. Each of the displacement bodies 520A through 520H has a displacement portion that is displaced by the tilting movement of the corresponding one of the tilting portions 513A through 513H. As shown in FIGS. 29 and 30, the displacement portions are the first through eighth beams 521A through 521H attached to the lower ends of the tilting portions 513A through 513H via connecting bodies 522A through 522H, respectively.

The specific configuration of each of the displacement bodies 520A through 520H is the same as that of the first displacement body 220A described in the second embodiment, Therefore, in FIGS. 29 and 30, the components corresponding to those of the second embodiment are denoted by the same reference numerals as those used in the second embodiment, and detailed explanation thereof is not made herein. As will be described later, capacitive elements are disposed in the displacement portions all through D82 of the respective displacement bodies 520A through 520H, so that forces and moments acting on the force receiving portions 514A, 514B, 514D, and 514F are detected. In short, the basic structure 500 is formed with eight basic structures 100 as the first through eighth deformable elements 510A through 510H arranged in a rectangular closed-loop form, and each of the eight basic structures 100 is the basic structure 100 described in § 1.

Further, as shown in FIG. 30, the force receiving body 560 (not shown in FIG. 29) for receiving the force to be detected is disposed on the positive Z-axis side of the rectangular deformable body 510. The force receiving body 560 includes: a force receiving body main body 561 having a rectangular shape that is exactly the same shape as the rectangular deformable body 510 when viewed from the Z-axis direction; and force receiving portion connecting bodies 562 through 565 (563 through 565 are not shown) provided on the portions of the force receiving body main body 561 facing the force receiving portions 514A, 514B, 514D, and 514F of the rectangular deformable body 510. The force receiving portion connecting bodies 562 through 565 are connected to the corresponding force receiving portions 514A, 514B, 514D, and 514F, so that a force and a moment acting on the force receiving body main body 561 are transmitted to the respective force receiving portions 514A, 514B, 514D, and 514F.

<5-2. Operation of the Basic Structure>

Next, operation of the above basic structure 500 is described.

(5-2-1. Where a Force +Fx is Applied)

Figure 31:
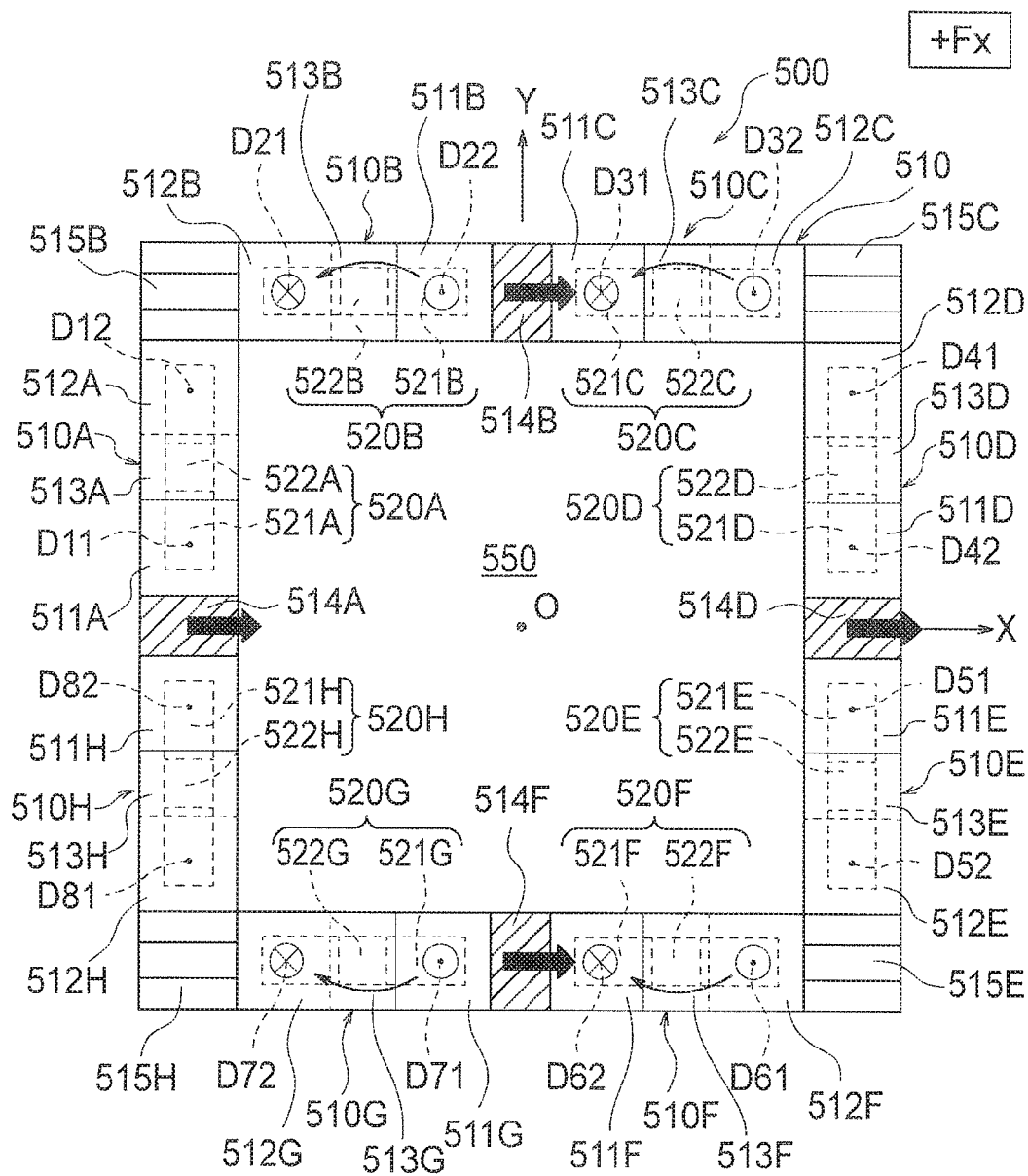
FIG. 31 is a diagram for explaining displacements caused in the respective displacement bodies of the basic structure in FIG. 29 when a force +Fx in the positive X-axis direction acts on a force receiving body.

FIG. 31 is a diagram for explaining displacements caused in the respective displacement bodies 520A through 520H of the basic structure 500 in FIG. 29 when a force +Fx in the positive X-axis direction acts on the force receiving body 560. The meanings of the symbols such as arrows in the drawing are the same as those described in § 2.

When a force +Fx in the positive X-axis direction acts on the force receiving portions 514A, 514B, 514D, and 514F via the force receiving body 560, the respective force receiving portions 514A, 514B, 514D, and 514F are displaced in the positive X-axis direction. As a result, as shown in FIG. 31, the third deformable element 510C and the sixth deformable element 510F are subjected to compressive force like the compressive force shown in FIG. 3. In this case, the third tilting portion 513C tilts counterclockwise, and the sixth tilting portion 513F tilts clockwise. That is, the third beam 521C tilts counterclockwise, and the sixth beam 521F tilts clockwise. As a result, the 3-1st displacement portion D31 is displaced in the negative Z-axis direction, the 3-2nd displacement portion D32 is displaced in the positive Z-axis direction, the 6-1st displacement portion D61 is displaced in the positive Z-axis direction, and the 6-2nd displacement portion D62 is displaced in the negative Z-axis direction.

At the same time, as shown in FIG. 31, the second deformable element 510B and the seventh deformable element 510G are subjected to tensile force like the tensile force shown in FIG. 4. As a result, the second tilting portion 513B tilts counterclockwise, and the seventh tilting portion 513G tilts clockwise. That is, the second beam 521B tilts counterclockwise, and the seventh beam 521G tilts clockwise. As a result, the 2-1st displacement portion D21 is displaced in the negative Z-axis direction, the 2-2nd displacement portion D22 is displaced in the positive Z-axis direction, the 7-1st displacement portion D71 is displaced in the positive Z-axis direction, and the 7-2nd displacement portion D72 is displaced in the negative Z-axis direction.

Meanwhile, the two force receiving portions 514A and 514D positioned on the X-axis move in a direction (the X-axis direction) orthogonal to the alignment direction (the Y-axis direction) of the first, fourth, fifth, and eighth deformable elements 510A, 510D, 510E, and 510H. Therefore, in the capacitive elements C11, C12, C41, C42, C51, C52, C81, and C82 corresponding to these four deformable elements 510A, 510D, 510E, and 510H, some of the displacement electrodes Em11, Em12, Em41, Em42, Em51, Em52, Em81, and Em82, which form the respective capacitive elements, are displaced in the positive Z-axis direction, and the other ones of the displacement electrodes are displaced in the negative Z-axis direction. That is, the distance between electrode plates increases in some of the capacitive elements, while the distance between electrode places decreases in the other capacitive elements. Therefore, it can be considered that none of the capacitance values of the eight capacitive elements C11, C12, C41, C42, C51, C52, C81, and C82 substantially changes.

It should be noted that, when a force +Fy in the positive Y-axis direction acts on the force receiving portions 514A, 514B, 514D, and 514F of the basic structure 500, operation of the basic structure 500 should be the same as the above described operation of the basic structure 500 in the case where the force +Fx in the positive X-axis direction is applied, except that all the aspects are rotated 90 degrees counterclockwise around the origin O. Therefore, detailed explanation thereof is not made herein.

(5-2-2. Where a Force +Fz is Applied)

Figure 32:
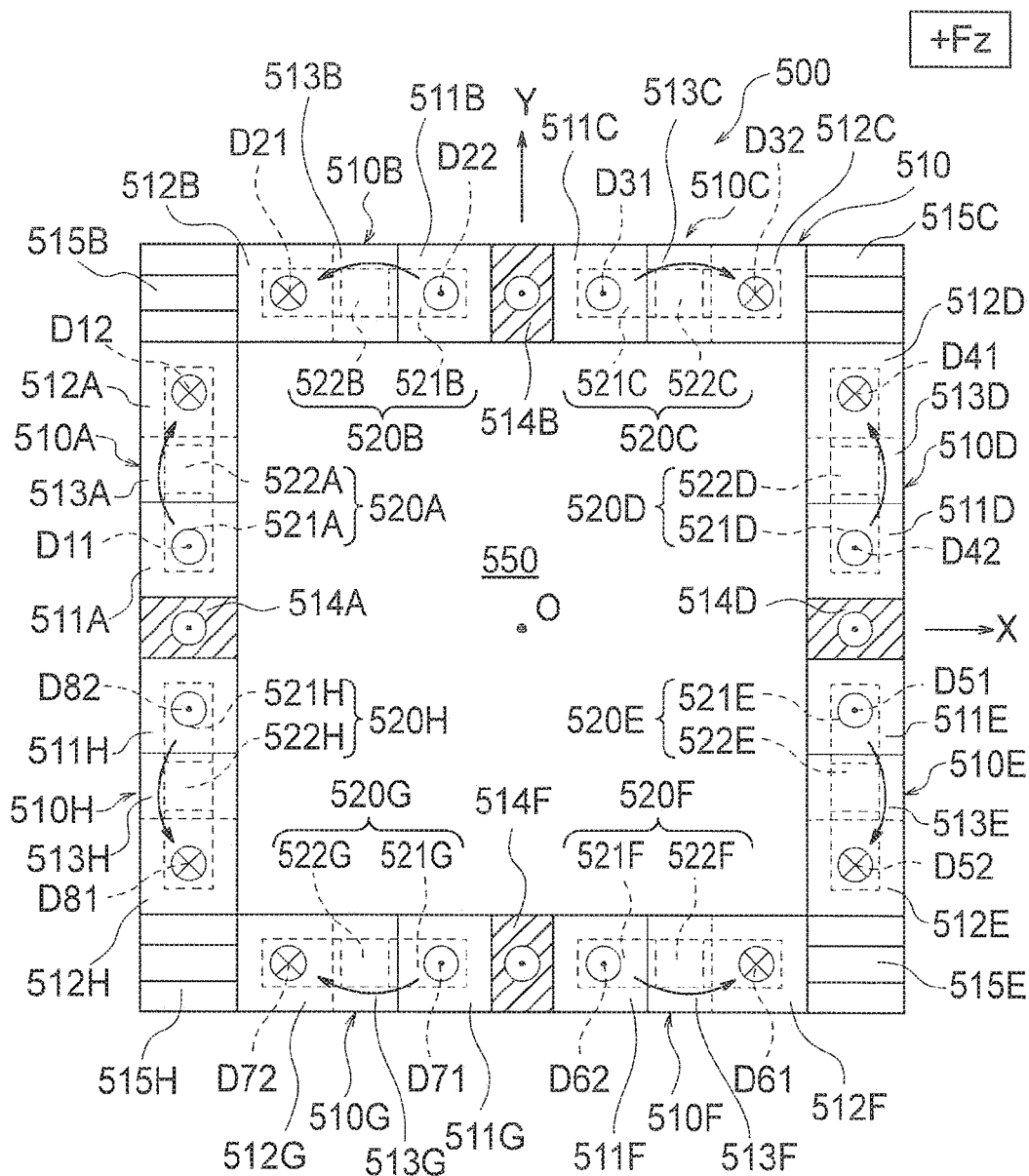
FIG. 32 is a diagram for explaining displacements caused in the respective displacement bodies of the basic structure in FIG. 29 when a force +Fz in the positive Z-axis direction acts on the force receiving body.

FIG. 32 is a diagram for explaining displacements caused in the respective displacement bodies 520A through 520H of the basic structure 500 in FIG. 29 when a force +Fz in the positive Z-axis direction acts on the force receiving body 560. The meanings of the symbols such as arrows in the drawing are the same as those described in § 2.

As the force +Fz in the positive Z-axis direction acts on the force receiving portions 514A, 514B, 514D, and 514F via the force receiving body 560, the respective force receiving portions 514A, 514B, 514D, and 514E are displaced in the positive Z-axis direction. As a result, as shown in FIG. 32, each of the first through eighth deformable elements 510A through 510H is subjected to upward force like the upward force shown in FIG. 6. In this case, the first, third, fifth, and seventh tilting portions 513A, 513C, 513E, and 513G tilt clockwise, and the remaining second, fourth, sixth, and eighth tilting portions 513B, 513D, 513F, 513H tilt counterclockwise. That is, the first, third, fifth, and seventh beams 521A, 521C, 521E, and 521G tilt clockwise, and the remaining second, fourth, sixth, and eighth tilting portions 513B, 513D, 513F, and 513H tilt counterclockwise.

As a result, the 1-1st, 2-2nd, 3-1st, 4-2nd, 5-1st, 6-2nd, 7-1st, and 8-2nd displacement portions D11, D22, D31, D42, D51, D62, D71, and D82 are displaced in the positive Z-axis direction, and the remaining 1-2nd, 2-1st, 3-2nd, 4-1st, 5-2nd, 6-1st, 7-2nd, and 8-1st displacement portions D12, D21, D32, D41, D52, D61, D72, and D81 are displaced in the negative Z-axis direction.

(5-2-3. Where a Moment +Mx is Applied)

Next, operation of the basic structure 500 when a moment +Mx around the positive X-axis acts on the force receiving body 560 (force receiving portions) of the basic structure 500 is described.

Figure 33:
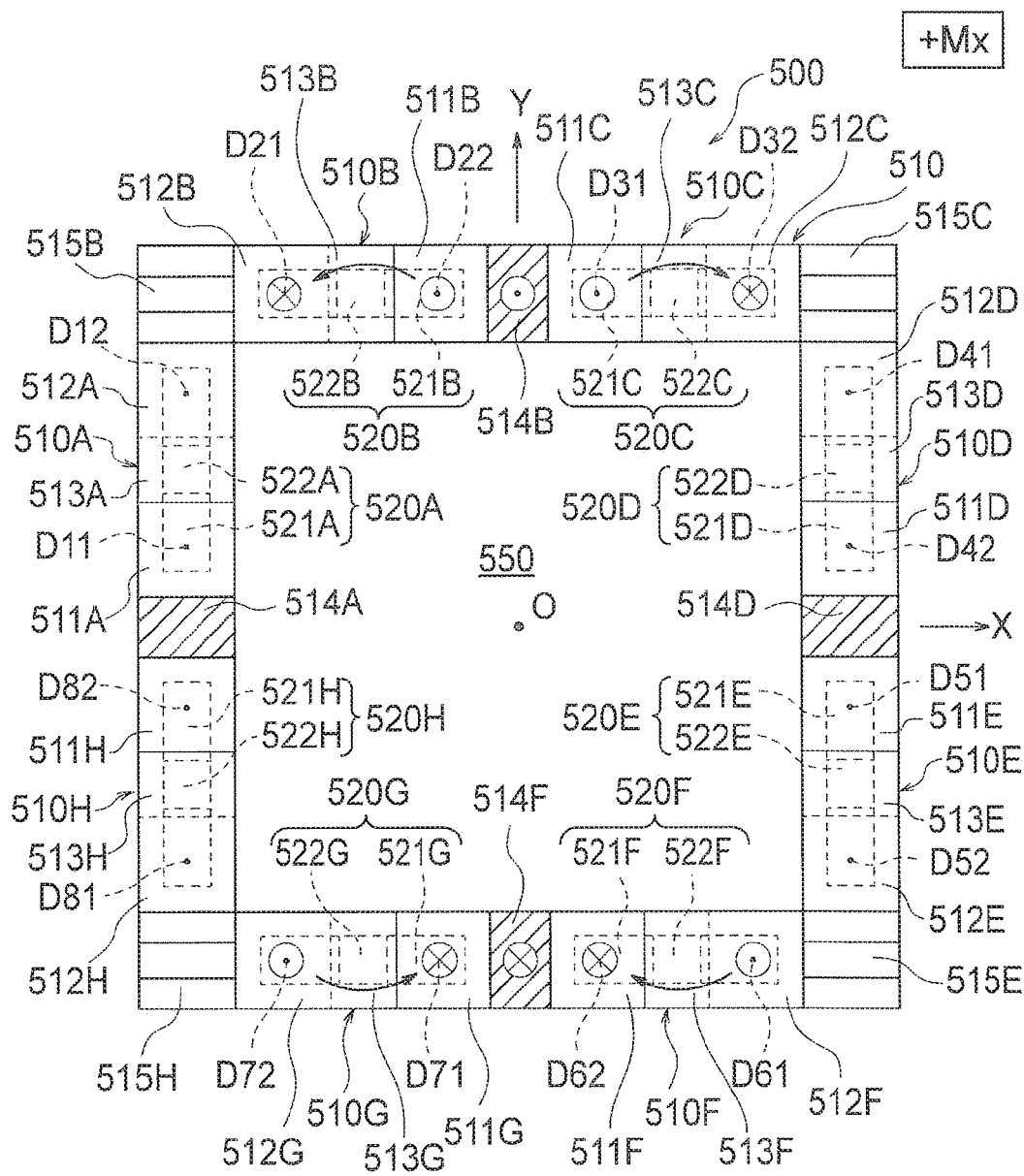
FIG. 33 is a diagram for explaining displacements caused in the respective displacement bodies of the basic structure in FIG. 29 when a moment +Mx around the positive X-axis acts on the force receiving body.

FIG. 33 is a diagram for explaining displacements caused in the respective displacement bodies 520A through 520H of the basic structure 500 in FIG. 29 when a moment +Mx around the positive X-axis acts on the force receiving body 560. The meanings of the symbols such as arrows in the drawing are the same as those described in § 2.

When the moment +Mx around the positive X-axis acts on the force receiving body 560, the second force receiving portion 514B located on the positive Y-axis is displaced in the positive Z-axis direction (toward the front side in FIG. 33), and the fourth force receiving portion 514F located on the negative Y-axis is displaced in the negative Z-axis direction (the depth direction in FIG. 33). Therefore, as shown in FIG. 33, the second and third deformable elements 510B and 510C are subjected to upward force like the upward force shown in FIG. 6, as in the case where the force +Fz is applied. That is, as described in 5-2-2., the 2-1st and 3-2nd displacement portions D2.1 and D32 are displaced in the negative Z-axis direction, and the 2-2nd and 3-1st displacement portions D22 and D31 are displaced in the positive Z-axis direction.

Meanwhile, as shown in FIG. 33, the sixth and seventh deformable elements 510F and 510G are subjected to downward force like the downward force shown in FIG. 5, which is the opposite of the force in the case where the force +Fz is applied. In this case, the sixth tilting portion 513F tilts clockwise, and the seventh tilting portion 513G tilts counterclockwise. That is, the sixth beam 52W tilts clockwise, and the seventh beam 521G tilts counterclockwise. As a result, the 6-1st displacement portion D61 and the 7-2nd displacement portion D72 are displaced in the positive Z-axis direction, and the 6-2nd displacement portion D62 and the 7-1st displacement portion D71 are displaced in the negative Z-axis direction.

Meanwhile, the first and third force receiving portions 514A and 514D located on the center axis line (on the X-axis) of the moment +Mx are not substantially displaced. Therefore, neither compressive force nor tensile force substantially acts on the first, fourth, fifth, and eighth deformable elements 510A, 510D, 510E, and 510H connected to the first and third force receiving portions 514A and 514D. That is, the displacement portions D11, D12, D41, D42, D51, D52, D81, and D82 corresponding to the respective deformable elements 510A, 510D, 510E, and 510H are not displaced in the Z-axis direction by the moment Mx around the X-axis.

It should be noted that, when a moment +My around the positive Y-axis acts on the force receiving portions 514A, 514B, 514D, and 514F of the basic structure 500, operation of the basic structure 500 should be the same as the above described operation of the basic structure 500 in the case where the moment +Mx around the positive X-axis is applied, except that all the aspects are rotated 90 degrees counterclockwise around the origin O. Therefore, detailed explanation thereof is not made herein.

(5-2-4. Where a Moment +Mz is Applied)

Figure 34:
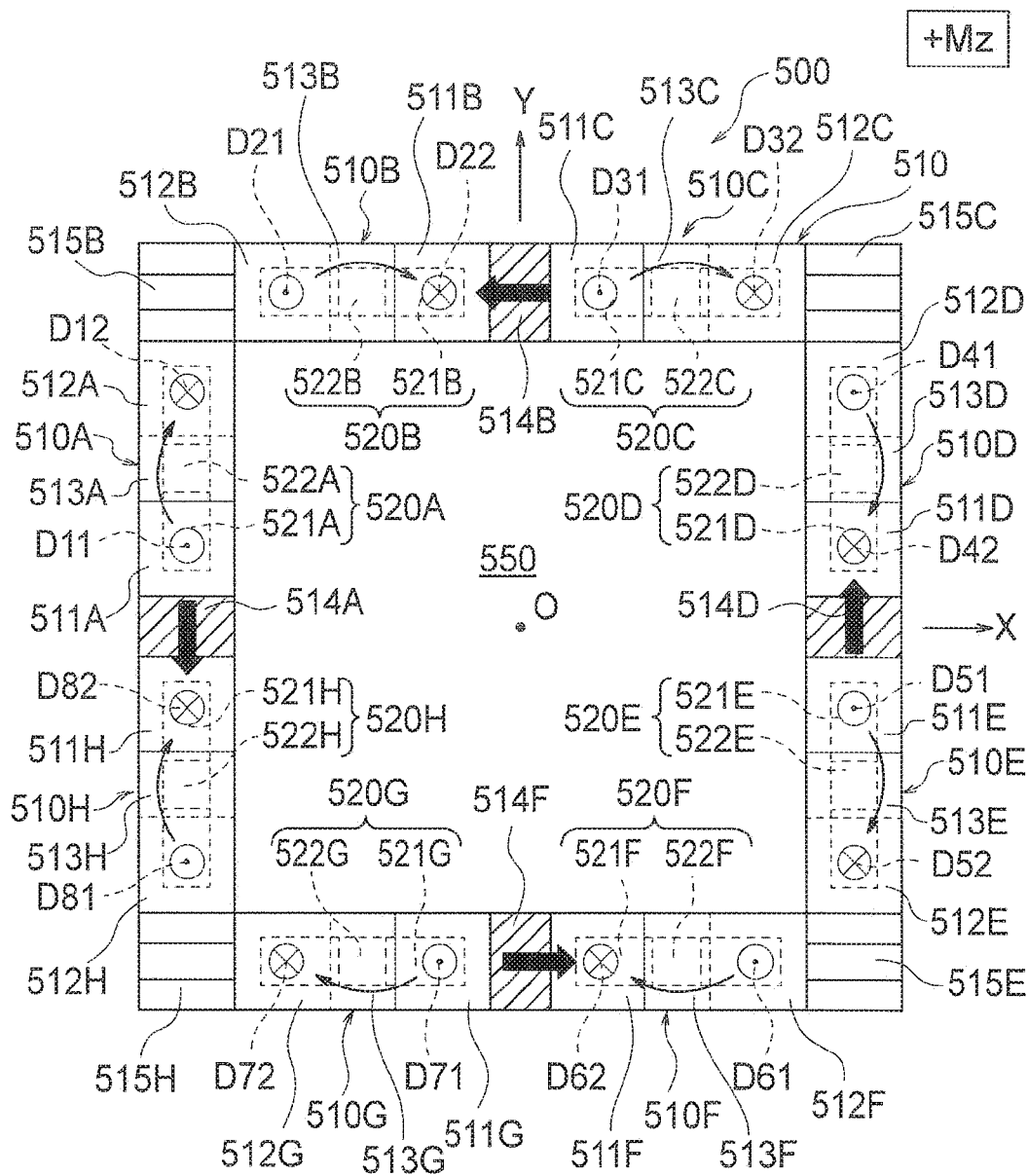
FIG. 34 is a diagram for explaining displacements caused in the respective displacement bodies of the basic structure in FIG. 29 when a moment +Mx around the positive Z-axis acts on the force receiving body.

FIG. 34 is a diagram for explaining displacements caused in the respective displacement bodies 520A through 520H of the basic structure 500 in FIG. 29 when a moment +Mz around the positive Z-axis acts on the force receiving body 560. The meanings of the symbols such as arrows in the drawing are the same as those described in § 2.

When the moment +Mz around the positive Z-axis acts on the force receiving body 560, the first force receiving portion 514A located on the negative X-axis is displaced in the negative X-axis direction, the second force receiving portion 514B located on the positive Y-axis is displaced in the negative X-axis direction, the third force receiving portion 514D located on the positive X-axis is displaced in the positive Y-axis direction, and the fourth force receiving portion 514F is displaced in the positive X-axis direction located on the negative Y-axis, as shown in FIG. 34. Therefore, as shown in FIG. 34, the second, fourth, sixth, and eighth deformable elements 510B, 510D, 510F, and 510H are subjected to compressive force like the compressive force shown in FIG. 3. In this case, the second, fourth, sixth, and eighth tilting portions 513B, 513D, 513F, and 513H tilt clockwise, and accordingly, the second, fourth, sixth, and eighth beams 521B, 521D, 521F, and 521H also tilt clockwise. As a result, the 2-1st, 4-1st, 6-1st, and 8-1st displacement portions D21, D41, D61, and D81 are displaced in the positive Z-axis direction, and the 2-2nd, 4-2nd, 6-2nd, and 8-2nd displacement portions D22, D42, D62, and D82 are displaced in the negative Z-axis direction, Further, as shown in FIG. 34, the first, third, fifth, and seventh deformable elements 510A, 510C, 510E, and 510G are subjected to tensile force like the tensile force shown in FIG. 4. In this case, the first, third, fifth, and seventh tilting portions 513A, 513C, 513E, and 513G tilt clockwise, and accordingly, the first, third, fifth, and seventh beams 521A, 521C, 521E, and 521G also tilt clockwise. As a result, the 1-1st, 3-1st, 5-1st, and 7-1st displacement portions D11, D31, D51, and D71 are displaced in the positive Z-axis direction, and the 1-2nd, 3-2nd, 5-2nd, and 7-2nd displacement portions D12, D32, D52, and D72 are displaced in the negative Z-axis direction.

As a summary of the above description, FIG. 35 shows a list of the directions of the tilting movements caused in the respective tilting portions 513A through 513H of the basic structure 500 in FIG. 29 and the displacements caused in the respective displacement portions D11 through D82 of the displacement bodies 520A through 520H in a case where the forces +Fx, +Fy, and +Fz, in the respective axis directions of the X-Y-Z three-dimensional coordinate system, and the moments +Mx, +My, and +Mz around the respective axes act on the force receiving body 560. In FIG. 35, the directions of rotation (clockwise/counterclockwise) shown in the columns for the respective tilting portions 513A through 513H are the directions observed from the origin O. Further, the symbol "+" written in the columns for the respective displacement portions all through D48 means that the distance between the corresponding displacement portion and the support 550 increases, and the symbol "−" means that the distance between the corresponding displacement portion and the support 550 decreases.

In a case where the forces and moments acting on the force receiving body 560 are in negative directions and in negative rotative directions, the directions of the tilting movements of the tilting portions 513A through 513H are all reversed from those in the above described cases. As a result, the directions of displacements caused in the displacement portions D11 through D82 of the respective displacement bodies 520A through 520H are also reversed, and the directions of the tilting movements and the increases/decreases (+/−) in the distance between the respective displacement portions D11 through D82 and the support 550 are all reversed from those shown in the list in FIG. 35.

<5-3. Structure of a Force Sensor>

Next, the structure of a force sensor 500c including the basic structure 500 described above in 5-1 and 5-2 is described.

Figure 36:
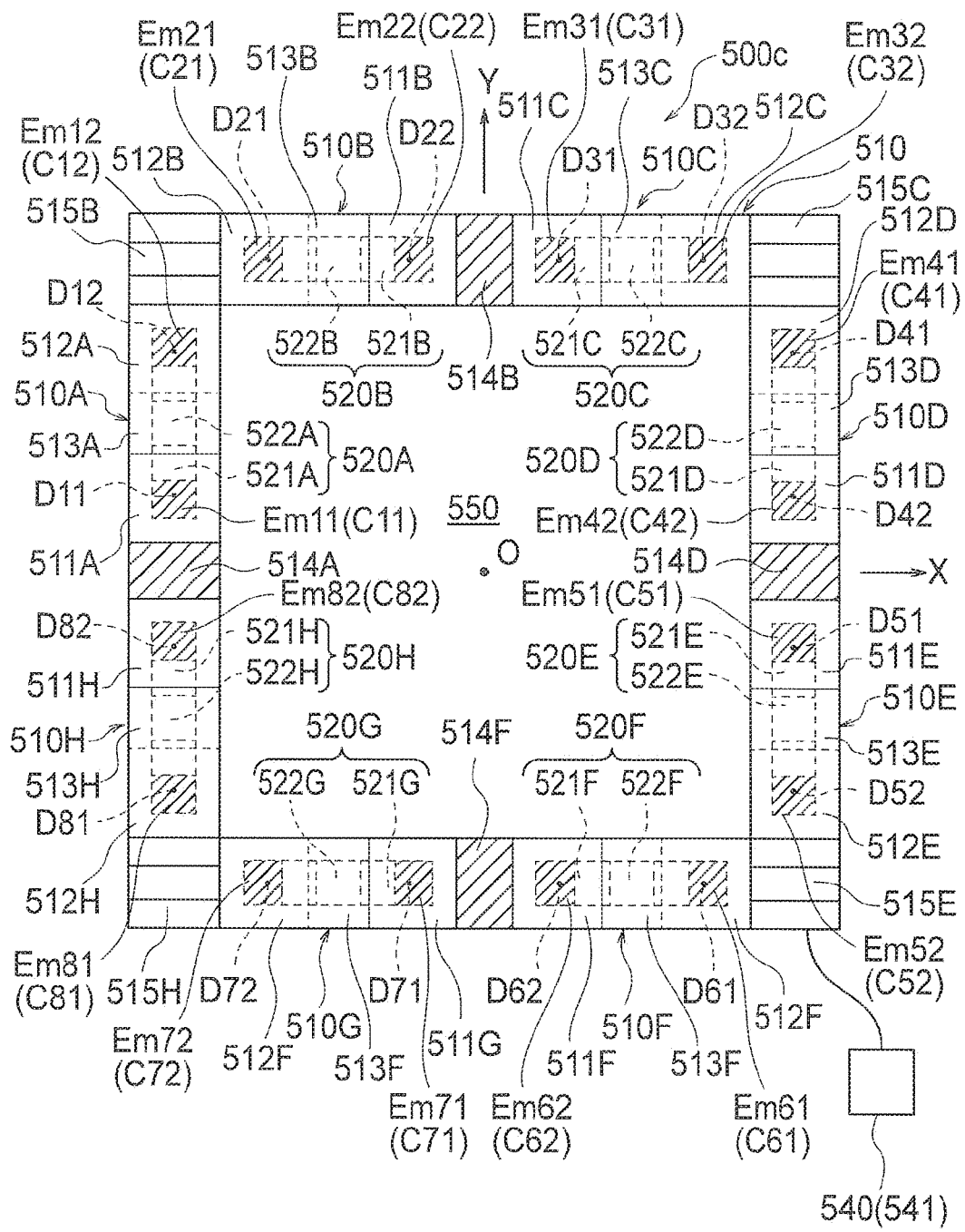
FIG. 36 is a schematic top view of a force sensor according to the fifth embodiment of the present invention using the basic structure shown in FIG. 29.
Figure 37:
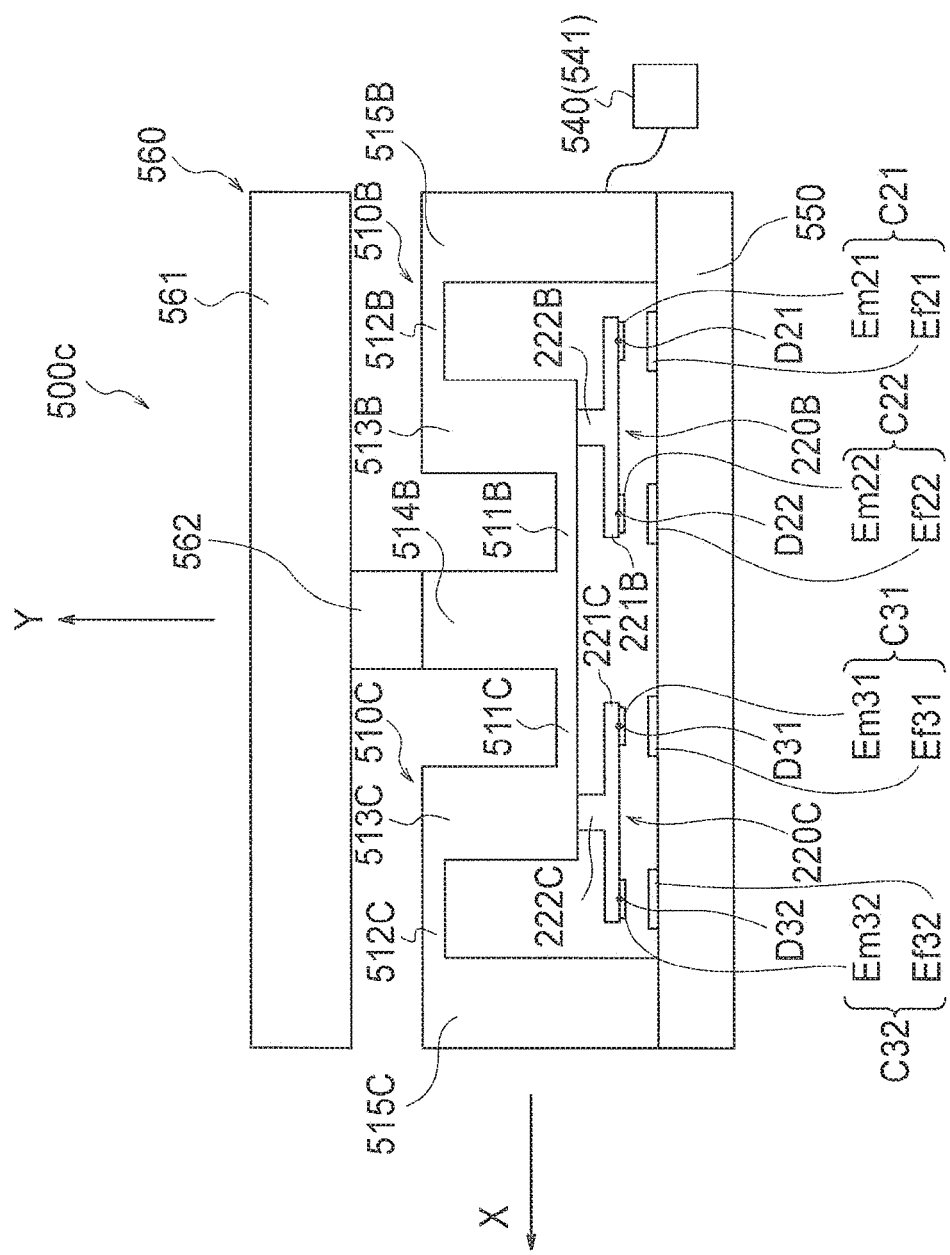
FIG. 37 is a schematic side view of the force sensor as viewed from the positive X-axis side in FIG. 36.

FIG. 36 is a schematic top view of the force sensor 500c according to the fifth embodiment of the present invention using the basic structure 500 shown in FIG. 29. FIG. 37 is a schematic side view of the force sensor 500c as viewed from the positive Y-axis side in FIG. 36.

As shown in FIGS. 36 and 37, the force sensor 500c includes the above described basic structure 500 and a detection circuit 540 that detects an applied force and an applied moment in accordance with displacements caused in the respective displacement portions D11 through D82 of the displacement bodies 520A through 520H of the basic structure 500. As shown in FIGS. 36 and 37, the detection circuit 540 of this embodiment includes: sixteen capacitive elements C11 through C82 disposed one by one in the respective displacement portions D11 through D82 of the displacement bodies 520A through 520H; and a measuring unit 541 that is connected to these capacitive elements C11 through C82, and measures the applied force in accordance with changes in the capacitance values of the capacitive elements C11 through C82.

The specific configurations of the sixteen capacitive elements C11 through C82 are as follows. Specifically, as shown in FIG. 37, the 2-1st capacitive element C21 includes: a 2-1st displacement electrode Em21 disposed on the 2-1st displacement portion D21 of the second beam 521B via an insulator (not shown); and a 2-1st fixed electrode Ef21 disposed on the support 550 via an insulator (not shown) in such a manner as to face the 2-1st displacement electrode Em21. Also, the 2-2nd capacitive element C22 includes: a 2-2nd displacement electrode Em22 disposed on the 2-2nd displacement portion D22 of the second beam 521B via an insulator (not shown); and a 2-2nd fixed electrode Ef22 disposed on the support 550 via an insulator (not shown) in such a manner as to face the 2-2nd displacement electrode Em22.

Likewise, as shown in FIG. 37, the 3-1st capacitive element C31 includes: a 3-1st displacement electrode Em31 disposed on the 3-1st displacement portion D31 of the third beam 221C via an insulator (not shown); and a 3-1st fixed electrode Ef31 disposed on the support 550 via an insulator (not shown) in such a manner as to face the 3-1st displacement electrode Em31. The 3-2nd capacitive element C32 includes: a 3-2nd displacement electrode Em32 disposed on the 3-2nd displacement portion D32 of the third beam 521C via an insulator (not shown); and a 3-2nd fixed electrode Ef32 disposed on the support 550 via an insulator (not shown) in such a manner as to face the 3-2nd displacement electrode Em32.

Further, although not specifically shown in the drawings, the 1-1st, 1-2nd, 8-1st, and 8-2nd capacitive elements C11, C12, C81, and C82 disposed parallel to the Y-axis in the region where the X-coordinate is negative (the region on the left side of the Y-axis in FIG. 36) correspond to the configurations of the capacitive elements C31, C32, C21, and C22, respectively, if the above described 3-1st, 3-2nd, 2-1st, and 2-2nd capacitive elements C31, C32, C21, and C22 are rotated 90 degrees counterclockwise around the origin O.

Also, the 4-1st, 4-2nd, 5-1st, and 5-2nd capacitive elements C41, C42, C51, and C52 disposed parallel to the Y-axis in the region where the X-coordinate is positive (the region on the right side of the Y-axis in FIG. 36) correspond to the configurations of the capacitive elements C31, C32, C21, and C22, respectively, if the above described 3-1st, 3-2nd, 2-1st, and 2-2nd capacitive elements C31, C32, C21, and C22 are rotated 90 degrees clockwise around the origin O. The 6-1st, 6-2nd, 7-1st, and 7-2nd capacitive elements disposed parallel to the X-axis in the region where the Y-coordinate is negative (the region on the lower side of the X-axis in FIG. 36) correspond to the configurations of the capacitive elements C21, C22, C31, and C32, respectively, if the above described 2-1st, 2-2nd, 3-1st, and 3-2nd capacitive elements C21, C22, C31, and C32 are rotated 180 degrees clockwise around the origin O.

With the above described correspondence relationship, the capacitive elements other than the 2-1st, 2-2nd, 3-1st, and 3-2nd capacitive elements C21, C22, C31, and C32 are not specifically described herein.

Although not clearly shown in FIGS. 36 and 37, these capacitive elements C11 through C82 are connected to the measuring unit 541 of the detection circuit 540 by a predetermined circuit, and the capacitance values of the capacitive elements C11 through C82 are supplied to the measuring unit 541.

<5-4. Operation of the Force Sensor>

Next, operation of the force sensor 500c described in 5-3. is described.

(5-4-1. Where a Force +Fx in the Positive X-Axis Direction is Applied)

When a force +Fx in the positive X-axis direction acts on the force receiving portions 514A, 514B, 514D, and 514F of the force sensor 500c via the force receiving body 560, the capacitance values of the 2-1st, 3-1st, 6-2nd, and 7-2nd capacitive elements C21, C31, C62, and C72 increase, while the capacitance values of the 2-2nd, 3-2nd, 6-1st, and 7-1st capacitive elements C22, C32, C61, and C71 decrease, as can be seen from the displacements of the respective detection portions D11 through D82 shown in FIG. 35. The capacitance values of the remaining 1-1st, 1-2nd, 4-1st, 4-2nd, 5-1st, 5-2nd, 8-1st, and 8-2nd capacitive elements C11, C12, C41, C42, C51, C52, C81, and C82 do not change.

FIG. 38 is a table as a list that shows the increases/decreases in the capacitance values of the respective capacitive elements in a case where the forces +Fx, +Fy, and +Fz in the respective axis directions or the moments +Mx, +My, and +Mz around the respective axes in the X-Y-Z three-dimensional coordinate system act on the force receiving portions 514A, 514B, 514D, and 514F. The increases/decreases in the capacitance values of the above described capacitive elements C11 through C82 are summarized in the column for Fx in FIG. 38. In the list, each symbol "+" indicates that the capacitance value increases, and each symbol "−" indicates that the capacitance value decreases.

In this embodiment, in the respective beams 521A through 521H, the first displacement portions D11, D21, . . . , and D81, and the second displacement portions D12, D22, . . . , and D82 are arranged at equal distances from the centers of the tilting movements of the corresponding beams 521A through 521H. Accordingly, in the four beams 521B, 521C, 521F, and 521G in which tilting movement are caused, the magnitudes (|ΔC21|, |ΔC31|, |ΔC61|, and |ΔC71|) of the changes in the capacitance values of the capacitive elements C21, C31, C61, and C71 disposed in the first displacement portions D21, D31, D61, and D71 are equal to the magnitudes (|C22|, |ΔC32|, |ΔC62|, and |ΔC72|) of the changes in the capacitance values of the capacitive elements C22, C32, C62, and C72 disposed in the second displacement portions D22, D32, D62, and D72. Because of this, where |ΔC21|=|ΔC22|=|ΔC31|=|ΔC32|=|ΔC61|=|ΔC62|=|ΔC71|=|ΔC72|=|ΔC|, the respective capacitance values C11a through C82a of the 1-1st through 8-2nd capacitive elements C11 through C82 when the force is applied are expressed by the following [Expression 21].

$$C11a = C11$$

$$C12a = C12$$

$$C21a = C21 + \Delta C$$

$$C22a = C22 - \Delta C$$

$$C31a = C31 + \Delta C$$

$$C32a = C32 - \Delta C$$

$$C41a = C41$$

$$C42a = C42$$

$$C51a = C51$$

$$C52a = C52$$

$$C61a = C61 - \Delta C$$

$$C62a = C62 + \Delta C$$

$$C71a = C71 - \Delta C$$

$$C72a = C72 + \Delta C$$

$$C81a = C81$$

$$C82a = C82 \qquad \text{[Expression 21]}$$

In accordance with such changes in the capacitance values, the measuring unit 541 measures the applied force +Fx by using the following [Expression 22].

$$+Fx = C21 - C22 + C31 - C32 - C61 + C62 - C71 + C72 \qquad \text{[Expression 22]}$$

(5-4-2. Where a Force +Fy in the Positive Y-Axis Direction is Applied)

When a force +Fy in the positive Y-axis direction acts on the force receiving portions 514A, 514B, 514D, and 514F of the force sensor 500c via the force receiving body 560, the capacitance values of the 1-1st, 4-2nd, 5-2nd, and 8-1st capacitive elements C11, C42, C52, and C81 increase, while the capacitance values of the 1-2nd, 4-1st, 5-1st, and 8-2nd capacitive elements C12, C41, C51, and C82 decrease, as can be seen from the displacements of the respective detection portions D11 through D82 shown in FIG. 35. The capacitance values of the remaining 2-1st, 2-2nd, 3-1st, 3-2nd, 6-1st, 6-2nd, 7-1st, and 7-2nd capacitive elements C21, C22, C31, C32, C61, C62, C71, and C72 do not change. The increases/decreases in the capacitance values of these capacitive elements C11 through C82 are summarized in the column for Fy in FIG. 38.

In this case, in the respective beams 521A through 521H, the magnitudes of the changes in the capacitance values of the capacitive elements C11, C21, . . . , and C81 disposed in the first displacement portions D11, D21, . . . , and D81 can also be regarded as equal to the magnitudes of the changes in the capacitance values of the capacitive elements C12, C22, and C82 disposed in the second displacement portions D12, D22, and D82. Accordingly, taking into account the changes in the capacitance values of the respective capacitive elements C11 through C82 in the same manner as in the above [Expression 21], the measuring unit 541 measures the applied force +Fy according to the following [Expression 23].

$$+Fy = C11 - C12 - C41 + C42 - C51 + C52 + C81 - C82 \qquad \text{[Expression 23]}$$

(5-4-3. Where a Force +Fz in the Positive Z-Axis Direction is Applied)

When a force +Fz in the positive Z-axis direction acts on the force receiving portions 514A, 514B, 514D, and 514F of the force sensor 500c via the force receiving body 560, the capacitance values of the 1-2nd, 2-1st, 3-2nd, 4-1st, 5-2nd, 6-1st, 7-2nd, and 8-1st capacitive elements C12, C21, C32, C41, C52, C61, C72, and C81 increase, while the capacitance values of the remaining 1-1st, 2-2nd, 3-1st, 4-2nd, 5-1st, 6-2nd, 7-1st, and 8-2nd capacitive elements C11, C22, C31, C42, C51, C62, C71, and C82 decrease, as can be seen from the displacements of the respective detection portions D11 through D82 shown in FIG. 35. The increases/decreases in the capacitance values of these capacitive elements C11 through C82 are summarized in the column for Fz in FIG. 38.

More specifically, when the force +Fz is applied, the respective tilting portions 513A through 513H are displaced in the positive Z-axis direction in total. Therefore, as described in detail in § 2, the displacements caused in the respective displacement portions D11 through D82 are the sums of the displacements in the positive Z-axis direction or the negative Z-axis direction due to the tilting movements of the respective tilting portions 513A through 513K and the displacements of the respective tilting portions 513A through 513H in the positive Z-axis direction. That is, in the displacement portions D11, D22, D31, D42, D51, D62, D71, and D82 that are displaced in the positive Z-axis direction, the displacements are amplified. In the displacement portions D12, D21, D32, D41, D52, D61, D72, and D81 that are displaced in the negative Z-axis direction, the displacements are offset.

Here, the length of the respective beams 521A through 521H in the Z-axis direction is sufficiently greater than the length (height) of the respective tilting portions 513A through 521H in the Z-axis direction. In view of this, the magnitudes (|ΔC11|, |ΔC21|, . . . , and |ΔC81|) of the changes in the capacitance values of the capacitive elements C11, C21, . . . , and C81 provided in the first displacement portions D11, D21, . . . , and D81 of the respective beams 521A through 521H can be regarded as equal to the magnitudes (|ΔC12|, |ΔC22|, . . . , and |ΔC82|) of the changes in the capacitance values of the capacitive elements C12, C22, . . . , and C82 provided in the second displacement portions D12, D22, . . . , and D82.

Accordingly, taking into account the changes in the capacitance values of the respective capacitive elements C11 through C82 in the same manner as in the above [Expression 21], the measuring unit 541 measures the applied force +Fz according to the following [Expression 24].

$$+Fz=-C11+C12+C21-C22-C31+C32+C41-C42-C51+C52+C61-C62-C71+C72+C81-C82 \quad \text{[Expression 24]}$$

(5-4-4. Where a Moment +Mx Around the Positive X-Axis is Applied)

When a moment +Mx around the positive X-axis acts on the force receiving portions 514A, 514B, 514D, and 514F of the force sensor 500c via the force receiving body 560, the capacitance values of the 2-1st, 3-2nd, 6-2nd, and 7-1st capacitive elements C21, C32, C62, and C71 increase, while the capacitance values of the 2-2nd, 3-1st, 6-1st, and 7-2nd capacitive elements C22, C31, C61, and C72 decrease, as can be seen from the displacements of the respective detection portions D11 through D82 shown in FIG. 35. The capacitance values of the remaining 1-1st, 1-2nd, 4-1st, 4-2nd, 5-1st, 5-2nd, 8-1st, and 8-2nd capacitive elements C11, C12, C41, C42, C51, C52, C81, and C82 do not change. The increases/decreases in the capacitance values of these capacitive elements C11 through C82 are summarized in the column for Mx in FIG. 38.

In this case, in the respective beams 521A through 521H, the magnitudes of the changes in the capacitance values of the capacitive elements C11, C21, . . . , and C81 disposed in the first displacement portions D11, D21, . . . , and D81 can also be regarded as equal to the magnitudes of the changes in the capacitance values of the capacitive elements C12, C22, . . . , and C82 disposed in the second displacement portions D12, D22, and D82. Accordingly, taking into account the changes in the capacitance values of the respective capacitive elements C11 through C82 in the same manner as in the above [Expression 21], the measuring unit 541 measures the applied moment +Mx according to the following [Expression 25].

$$+Mx=C21-C22-C31+C32-C61+C62+C71-C72 \quad \text{[Expression 25]}$$

(5-4-5. Where a Moment +My Around the Positive Y-Axis is Applied)

When a moment +My around the positive Y-axis acts on the force receiving portions 514A, 514B, 514D, and 514F of the force sensor 500c via the force receiving body 560, the capacitance values of the 1-2nd, 4-2nd, 5-1st, and 8-1st capacitive elements C12, C42, C51, and C81 increase, while the capacitance values of the 1-1st, 4-1st, 5-2nd, and 8-2nd capacitive elements C11, C41, C52, and C82 decrease, as can be seen from the displacements of the respective detection portions D11 through D82 shown in FIG. 35. The capacitance values of the remaining 2-1st, 2-2nd, 3-1st, 3-2nd, 6-1st, 6-2nd, 7-1st, and 7-2nd capacitive elements C21, C22, C31, C32, C61, C62, C71, and C72 do not change. The increases/decreases in the capacitance values of these capacitive elements C11 through C82 are summarized in the column for My in FIG. 38.

In this case, in the respective beams 521A through 521H, the magnitudes of the changes in the capacitance values of the capacitive elements C11, C21, . . . , and C81 disposed in the first displacement portions D11, D21, . . . , and D81 can also be regarded as equal to the magnitudes of the changes in the capacitance values of the capacitive elements C12, C22, and C82 disposed in the second displacement portions D12, D22, . . . , and D82. Accordingly, taking into account the changes in the capacitance values of the respective capacitive elements C11 through C82 in the same manner as in the above [Expression 21], the measuring unit 541 measures the applied moment +My according to the following [Expression 26].

$$+My=-C11+C12-C41+C42+C51-C52+C81-C82 \quad \text{[Expression 26]}$$

(5-4-6. Where a Moment +Mz Around the Positive Z-Axis is Applied)

When a moment +Mz around the positive Z-axis acts on the force receiving portions 514A, 514B, 514D, and 514F of the force sensor 500c via the force receiving body 560, the capacitance values of the 1-2nd, 2-2nd, 3-2nd, 4-2nd, 5-2nd, 6-2nd, 7-2nd, and 8-2nd capacitive elements C12, C22, C32, C42, C52, C62, C72, and C82 increase, while the capacitance values of the remaining 1-1st, 2-1st, 3-1st, 4-1st, 5-1st, 6-1st, 7-1st, and 8-1st capacitive elements C11, C21, C31, C41, C51, C61, C71, and C81 decrease, as can be seen from the displacements of the respective detection portions D11 through D82 shown in FIG. 35. The increases/decreases in the capacitance values of these capacitive elements C11 through C82 are summarized in the column for Mz in FIG. 38.

In this case, in the respective beams 521A through 521H, the magnitudes of the changes in the capacitance values of the capacitive elements C11, C21, and C81 disposed in the first displacement portions D11, D21, . . . , and D81 can also be regarded as equal to the magnitudes of the changes in the capacitance values of the capacitive elements C12, C22, and C82 disposed in the second displacement portions D12, D22, . . . , and D82. Accordingly, taking into account the changes in the capacitance values of the respective capacitive elements C11 through C82 in the same manner as in the above [Expression 21], the measuring unit 541 measures the applied moment +Mz according to the following [Expression 27].

+Mz=−C11+C12−C21+C22−C31+C32−C41+C42−C51+C52−C61+C62−C71+C72−C81+C82　　[Expression 27]

It should be noted that, in cases where the negative forces −Fx, −Fy, and −Fz in the respective axis directions or the moments −Mx, −My, and −Mz around the respective negative axes act on the force receiving body 560 of the force sensor 500c, the increases/decreases in the distances between the electrodes of the respective capacitive elements C11 through C82 are reversed from those shown in FIG. 35, as described above. Therefore, to detect the forces −Fx, −Fy, and −Fz or the moments −Mx, −My, and −Mz, the signs of C11 through C82 in the right sides of [Expression 22] through [Expression 27] should be reversed.

<5-5. Other-Axis Sensitivity of the Force Sensor>

Referring now to FIG. 39, the other-axis sensitivity of the force sensor 500c according to this embodiment is described. FIG. 39 is a table as a list that shows the other-axis sensitivities VFx through VMz of the forces Fx, Fy, and Fz in the respective axis directions and the moments Mx, My, and Mz around the respective axes in the force sensor 500c shown in FIG. 36, The numbers shown in the table in FIG. 39 are values obtained by assigning the respective forces Fx, Fy, and Fz, and the respective moments Mx, My, and Mz in the table shown in FIG. 38 to the respective right sides of the above [Expression 22] through [Expression 27]. Each capacitive element with the symbol "+" is represented by +1, and each capacitive element with the symbol "−" is represented by −1, as described in 2-5.

As can be seen from FIG. 39, the other-axis sensitivities of the forces Fx, Fy, and Fz in the respective axis directions and the moments Mx, My, and Mz around the respective axes are zero. Accordingly, the force sensor 500c shown in FIG. 36 can detect all the forces Fx, Fy, and Fz in the respective axis directions, and the moments Mx, My, and Mz around the respective axes.

In the actual force sensor 500c, however, there is a slight change in the capacitance value even in a capacitive element that has a "0" change in its capacitance value in FIG. 38. Further, in a case where the force Fz and the moments Mx and My act on the force receiving body 560, displacements in the Z-axis direction are caused in the tilting portions 513A through 513H, as described above. Therefore, the magnitudes of the Z-axis direction displacements caused in the first displacement portions D11, D21, and D81 differ from the magnitudes of the Z-axis direction displacements caused in the second displacement portions D21, D22, and D82. As is apparent from these facts, there is a slight other-axis sensitivity in practice. However, even in such a case, the other-axis sensitivity can be reduced to zero through a correcting operation in which an inverse matrix of an actual matrix of other-axis sensitivities (a matrix of six rows and six columns corresponding to the table shown in FIG. 39) is calculated, and the output of the force sensor 500c is multiplied by this inverse matrix.

According to this embodiment described above, displacements caused in the tilting portions 513A through 513H can be easily amplified by the actions of the beams 521A through 521H that are displaced by the tilting movements of the tilting portions 513A through 513H. Further, with the use of the 1-1st through 8-2nd capacitive elements C11 through C82, all of the applied forces Fx, Fy, and Fz and applied moments Mx, My, and Mz can be detected in accordance with differences between changes in the capacitance values of these capacitive elements. That is, this embodiment can provide the force sensor 500c that is inexpensive but highly sensitive, and is hardly affected by temperature changes or in-phase noise in the use environment.

Further, the displacement bodies 520A through 520H include connecting bodies 522A through 522H connecting the corresponding tilting portions 513A through 513H and the beams 521A through 521B, respectively, and the first displacement portions D11, D21, . . . , and D81 and the second displacement portions D12, D22, . . . , and D82 of the displacement bodies 520A through 520H are arranged symmetrically with respect to the connecting portions between the connecting bodies 522A through 522H and the corresponding beams 521A through 521H. Because of this, the displacements caused in the first displacement portions D11, D21, . . . , and D81 and the displacements caused in the second displacement portions D12, D22, and D82 are of the same magnitude but have different signs from each other. Thus, applied forces and moments can be detected through simple calculations.

The force sensor 500c also includes: the force receiving body 560 that is connected to the force receiving portions 514A, 514B, 514D, and 514F of the deformable body 510, and receives the applied forces Fx, Fy, and Fz and the moments Mx, My, and Mz; and the support 550 that is disposed to face the displacement bodies 520A through 520H, and is connected to the four fixed portions 515B, 515C, 515E, and 515H of the deformable body 510. With this arrangement, it is possible to transmit the applied forces Fx, Fy, and Fz and the moments Mx, My, and Mz to the deformable body 510 without fail.

Further, the deformable body 510 has a square shape. The four force receiving portions 514A, 514B, 514D, and 514F are positioned at the midpoints of the respective sides of the square, and the four fixed portions 515B, 515C, 515E, and 515H are positioned at the respective vertices. With this arrangement, calculations for detecting the applied forces Fx, Fy, and Fz, and the moments Mx, My, and Mz are easy.

§ 6. Force Sensor According to a Sixth Embodiment of the Present Invention

<6-1. Configuration of a Basic Structure>

The force sensor 500c described in § 5 is capable of detecting the six components of the forces Fx, Fy, and Fz and moments Mx, My, and Mz in the respective axis directions. However, to detect these six components, it is not always necessary to provide sixteen capacitive elements in a force sensor.

In the description below, a force sensor capable of detecting the six components with fewer capacitive elements according to a sixth embodiment will be described as a modification of the above described force sensor 500c.

Figure 40:
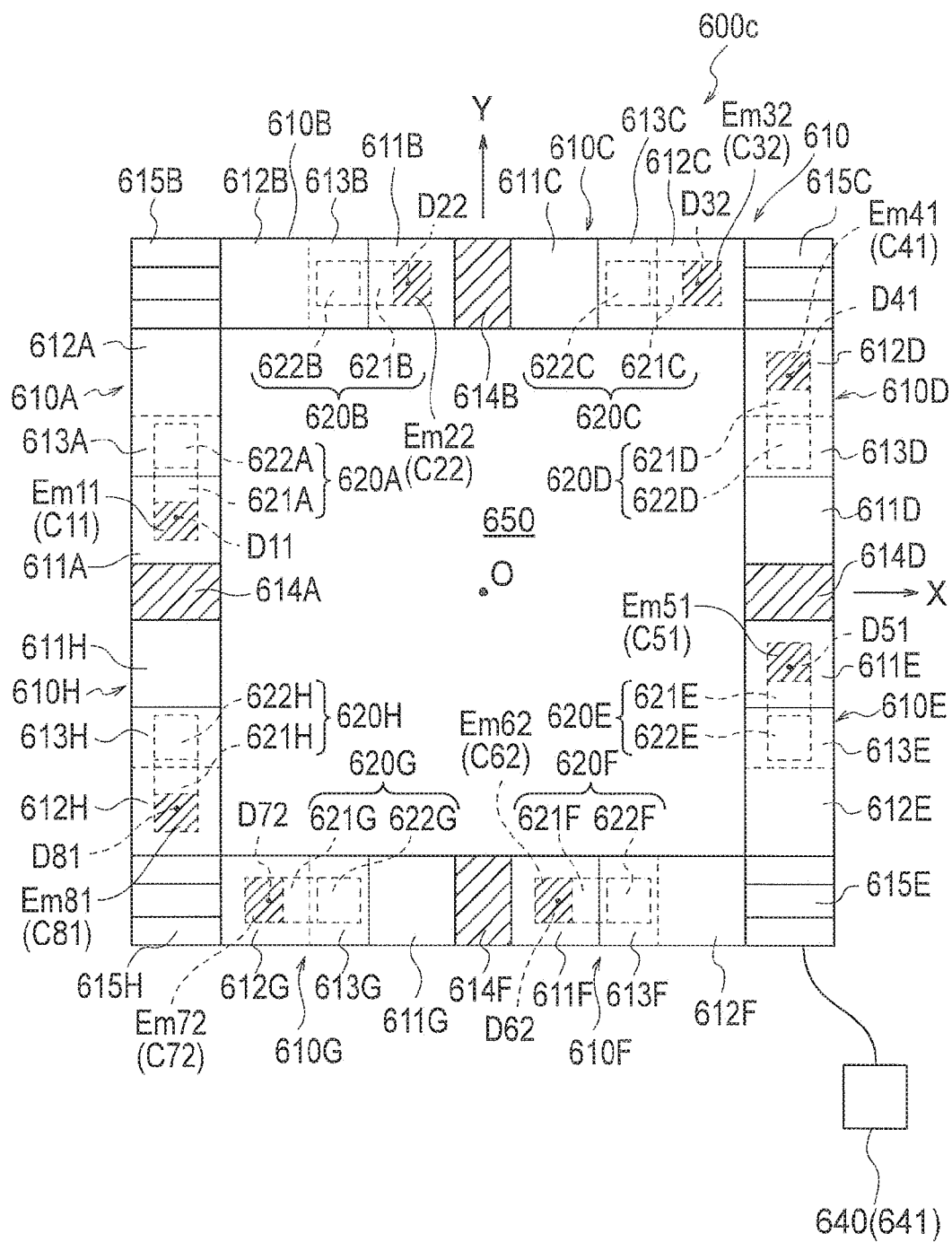
FIG. 40 is a schematic top view of a force sensor according to a sixth embodiment of the present invention.
Figure 41:
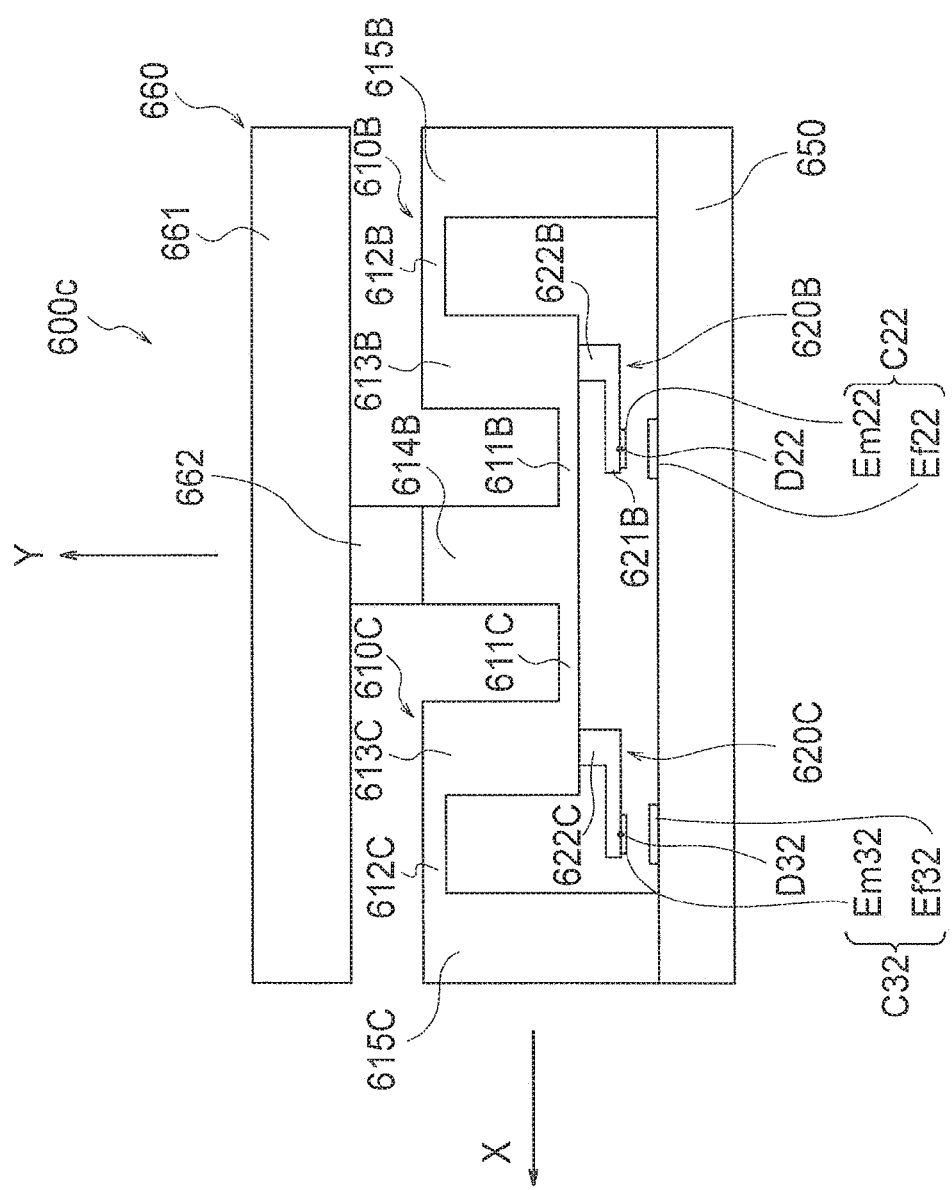
FIG. 41 is a schematic front view of the force sensor shown in FIG. 40 as viewed from the positive Y-axis side.

FIG. 40 is a schematic top view of a force sensor 600c according to the sixth embodiment of the present invention. FIG. 41 is a schematic side view of the force sensor 600c as viewed from the positive Y-axis side.

As shown in FIG. 40, the force sensor 600c differs from the force sensor 500c according to the fifth embodiment in that all beams 621A through 621H are designed as cantilever beams. Specifically, in the second, third, sixth, and seventh beams 621B, 621C, 621F, and 621G extending in parallel to the X-axis, the top end portions in the counterclockwise direction in FIG. 40 are removed, with respective connecting bodies 622B, 622C, 622F, and 622G in the middle being left. On the other hand, in the first, fourth, fifth, and eighth beams 621A, 621D, 621E, and 621H extending in parallel to the Y-axis, the top end portions in the clockwise direction in FIG. 40 are removed, with respective connecting bodies 622A, 622D, 622E, and 622H in the middle being left.

Therefore, in the force sensor 600c, a total of eight displacement portions D11, D22, D32, D41, D51, D62, D72, and D81 are formed one by one in the respective beams 621A through 621H. A total of eight capacitive elements C11, C22, C32, C41, C51, C62, C72, and C81 are disposed one by one at these eight displacement portions. The configuration of each of the capacitive elements is the same as that of the fifth embodiment.

Although not shown in FIGS. 40 and 41, the eight capacitive elements are connected to a measuring unit 641 of a detection circuit 640 by a predetermined circuit, and the capacitance values of the respective capacitive elements are supplied to the measuring unit 641. As described later, the measuring unit 641 detects forces and moments acting on the force sensor 600c, in accordance with changes in the capacitance values of the respective capacitive elements.

The other aspects of the force sensor 600c are the same as those of the fifth embodiment. Therefore, the same components as those of the fifth embodiment are denoted by substantially the same reference numerals as those used in the fifth embodiment, and detailed explanation thereof is not made herein, Next, operation of the force sensor 600c according to this embodiment is described. The following is a description of a case where all the six components of forces Fx, Fy, and Fz in the respective axis directions and moments Mx, My, and Mz around the respective axes in the X-Y-Z three-dimensional coordinate system are detected.

As described above, the force sensor 600c according to this embodiment has substantially the same structure as the force sensor 500c according to the fifth embodiment, except that the beams 621A through 621H are designed as cantilever beams. Accordingly, when a force or a moment acts on force receiving portions 614A, 614B, 614D, and 614F via a force receiving body 660, the detection portions D11, D22, D32, D41, D51, D62, D72, and D81 of the respective beams 621A through 621H have the same displacements as those of the corresponding detection portions D11, D22, D32, D41, D51, D62, D72, and D81 of the force sensor 500c according to the fifth embodiment.

Because of the above, when the six components Fx, Fy, Fz, Mx, My, and Mz of forces and moments act on the force sensor 600c, the capacitance values of the respective capacitive elements change as shown in a list in FIG. 42. In the list, each symbol "+" indicates that the capacitance value increases, and each symbol "−" indicates that the capacitance value decreases, as in FIG. 38. It should be noted that, in the table in FIG. 42, the increases/decreases in the capacitance values of the eight capacitive elements C11, C22, C32, C41, C51, C62, C72, and C81 are identical to those shown in FIG. 38.

In accordance with such changes in the capacitance values, the measuring unit 641 measures the applied forces and moments according to [Expression 28] shown below. [Expression 28] is the same as the expression formed by deleting C12, C21, C31, C42, C52, C61, C71, and C82 from the respective expressions of [Expression 22] through [Expression 27].

$+Fx=-C22-C32+C62+C72$ $+Fy=C11-C41-C51+C81$ $+Fz=-C11-C22+C32+C41-C51-C62+C72+C81$ $+Mx=-C22+C32+C62-C72$ $+My=-C11-C41+C51+C81$ $+Mz=-C11+C22+C32-C41-C51+C62+C72-C81$  [Expression 28]

Where the other-axis sensitivities of the six components of forces and moments are calculated according to [Expression 28], the results are as shown in a list in FIG. 43. The other-axis sensitivities are values obtained by assigning the force Fz and the moments Mx, My, and Mz in the table shown in FIG. 23 to the right sides of the respective expressions in the above [Expression 28]. Each capacitive element with the symbol "+" is represented by +1, and each capacitive element with the symbol "−" is represented by −1, as in FIG. 21. As shown in FIG. 43, the other-axis sensitivity of each component is zero. Furthermore, as can be seen from [Expression 28], each component is detected from differences between the electrostatic capacitance values in this embodiment. Accordingly, the detection results are hardly affected by temperature changes or in-phase noise in the surrounding environment.

According to this embodiment described above, it is possible to provide the force sensor 600c that can achieve the same effects as those of the force sensor 500c according to the fifth embodiment.

§ 7. Force Sensor According to a Seventh Embodiment of the Present Invention and Modifications Thereof 7-1. Force Sensor According to a Seventh Embodiment Next, a force sensor according to a seventh embodiment of the present invention is described.

Figure 44:
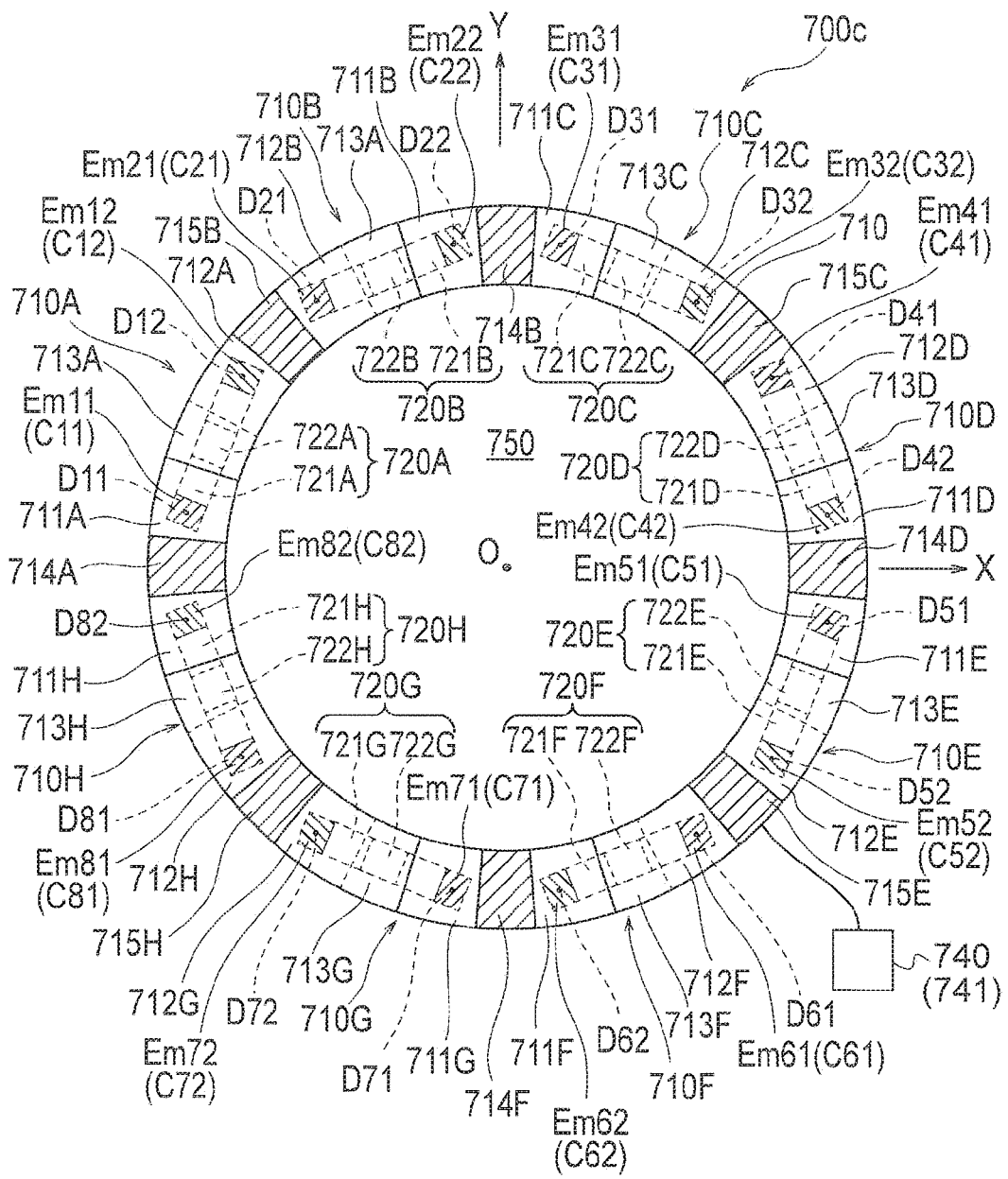
FIG. 44 is a schematic top view of a force sensor according to a seventh embodiment of the present invention.

FIG. 44 is a schematic top view of a force sensor 700c according to the seventh embodiment of the present invention. This embodiment is also described below, with the X-Y-Z three-dimensional coordinate system being defined as shown in FIG. 44. For ease of explanation, a force receiving body 760 is not shown in FIG. 44.

As shown in FIG. 44, the force sensor 700c differs from the fifth embodiment in that the rectangular deformable body 510 of the fifth embodiment is rounded at its four corners, and is designed as an annular deformable body 710 with the origin O at its center. For example, the longitudinal direction of the first beam 521A of the force sensor 500c according to the fifth embodiment is parallel to the Y-axis. However, the longitudinal direction of a first beam 721A of this embodiment is not parallel to the Y-axis. Specifically, the first beam 721A is disposed so as to be orthogonal to the straight line connecting the origin O and a first connecting body 722A. Such positioning is the same as the positioning of second through eighth beams 721B through 721H.

Next, operation of the above force sensor 700c is described.

In the force sensor 700c, the layout of respective deformable elements 710A through 710H is roughly the same as that of the fifth embodiment. Therefore, when a force −Fx in the positive X-axis direction acts on the force sensor 700c, for example, the 2-1st, 3-1st, 6-2nd, and 7-2nd displacement portions D21, D31, D62, and D72 are displaced in the negative Z-axis direction, and the 2-2nd, 3-2nd, 6-1st, and 7-1st displacement portions D22, D32, D61, and D71 are displaced in the positive Z-axis direction, as shown in FIG. 35.

Further, in this embodiment, the longitudinal directions of the beams 721A through 721H are not parallel to the X-axis and the Y-axis, as described above. Therefore, Z-axis direction displacements of relatively small values are also caused in the 1-1st, 1-2nd, 4-1st, 4-2nd, 5-1st, 5-2nd, 8-1st, and 8-2nd displacement portions D11, D12, D41, D42, D51, D52, D81, and D82, which are not displaced in the Z-axis direction in the fifth embodiment, Specifically, it is considered that the first, fourth, fifth, and eighth deformable elements 710A, 710D, 710E, and 710H; correspond to the first through fourth deformable elements 210A through 210D, respectively, of the basic structure 200 (see FIG. 8) described in § 2. Therefore, the 1-1st, 4-1st, 5-2nd, and 8-2nd displacement portions D11, D41, D52, and D82 are displaced in the negative Z-axis direction, and the 1-2nd, 4-2nd, 5-1st, and 8-1st displacement portions D12, D42, D51, and D81 are displaced in the positive Z-axis direction. This also applies in a where a force +Fy in the positive Y-axis direction is applied.

In a case where a force +Fz in the positive Z-axis direction and moments +Mx, +My, and +Mz around the respective positive axes are applied, on the other hand, the changes in the distances between the electrodes of the respective capacitive elements C11 through C82 are the same as those of the fifth embodiment.

FIG. 45 is a table as a list showing the directions of the tilting movements of the respective tilting portions 713A through 713H of the force sensor in FIG. 44, and the displacements caused in the respective displacement portions D11 through D82 in a case where forces in the respective axis directions and moments Fx through Mz in the respective axis directions in the X-Y-Z three-dimensional coordinate system act on force receiving portions.

In the table shown in FIG. 45, the signs of tilting movement directions and displacements are shown in parentheses in the columns corresponding to the tilting portions that exhibit relatively small tilt movements and the displacement portions that exhibit relatively small displacements when the deformable elements exhibit relatively small elastic deformations. It should be noted that the table shown in FIG. 45 is the same as that shown in FIG. 35, except for the columns showing parentheses. Although not shown, the signs of the displacements written in the columns for the displacement portions D11 through D82 corresponding to the capacitive elements C11 through C82 in the table in FIG. 45 should be reversed, to obtain the changes caused in the capacitance values of the respective capacitive elements C11 through C82 in a case where forces in the respective axis directions and moments in the respective axis directions Fx through Mz in the X-Y-Z three-dimensional coordinate system are applied. It should be understood that each sign "+" indicates an increase in capacitance value, and each sign "−" indicates a decrease in capacitance value.

A measuring unit 741 measures the applied forces and moments Fx through Mz according to [Expression 29] shown below.

$+Fx=C11-C12+C21-C22+C31-C32+C41-C42-C51+C52-C61+C62-C71+C72-C81+C82$ $+Fy=C11-C12+C21-C22-C31+C32-C41+C42-C51+C52-C61+C62+C71-C72+C81-C82$ $+Fz=-C11+C12+C21-C22-C31+C32+C41-C42-C51+C52+C61-C62-C71+C72+C81-C82$ $+Mx=C21-C22-C31+C32-C61+C62+C71-C72$ $+My=-C11+C12-C41+C42+C51-C52+C81-C82$ $+Mz=-C11+C12-C21+C22-C31+C32-C41+C42-C51+C52-C61+C62-C71+C72-C81+C82$ [Expression 29]

It should be noted that, in cases where forces −Fx, −Fy, and −Fz in the negative axis directions or moments −Mx, −My, and −Mz around the negative axes act on the force receiving body 760 of the force sensor 700c, the Z-axis direction displacements of the respective displacement portions D11 through D82 are reversed from those shown in FIG. 45, as described above. Therefore, to detect the forces −Fx, −Fy, and −Fz, or the moments −Mx, −My, and −Mz, the signs of C11 through C82 in the right sides of [Expression 29] should be reversed.

In the force sensor 700c according to this embodiment, changes are caused even in the capacitance values of the capacitive elements that have no changes in the capacitance values in the fifth embodiment, as described above.

Because of this, there exist other-axis sensitivities in this embodiment. However, the other-axis sensitivities can be reduced to zero through a correcting operation in which an inverse matrix of an actual matrix of other-axis sensitivities is calculated, and the output of the force sensor 700c is multiplied by this inverse matrix, as described above.

According to this embodiment described above, it is possible to provide the force sensor 700c that can achieve the same effects as those of the force sensor 500c according to the fifth embodiment.

7-2. Modification

The force sensor 700c described in 7-1 is capable of detecting the six components of the forces Fx, Fy, and Fz and moments Mx, My, and Mz in the respective axis directions. However, to detect these six components, it is not always necessary to provide sixteen capacitive elements in a force sensor. In the description below, a force sensor 701c capable of detecting the six components with fewer capacitive elements will be described as a modification of the above described force sensor 700c.

Figure 46:
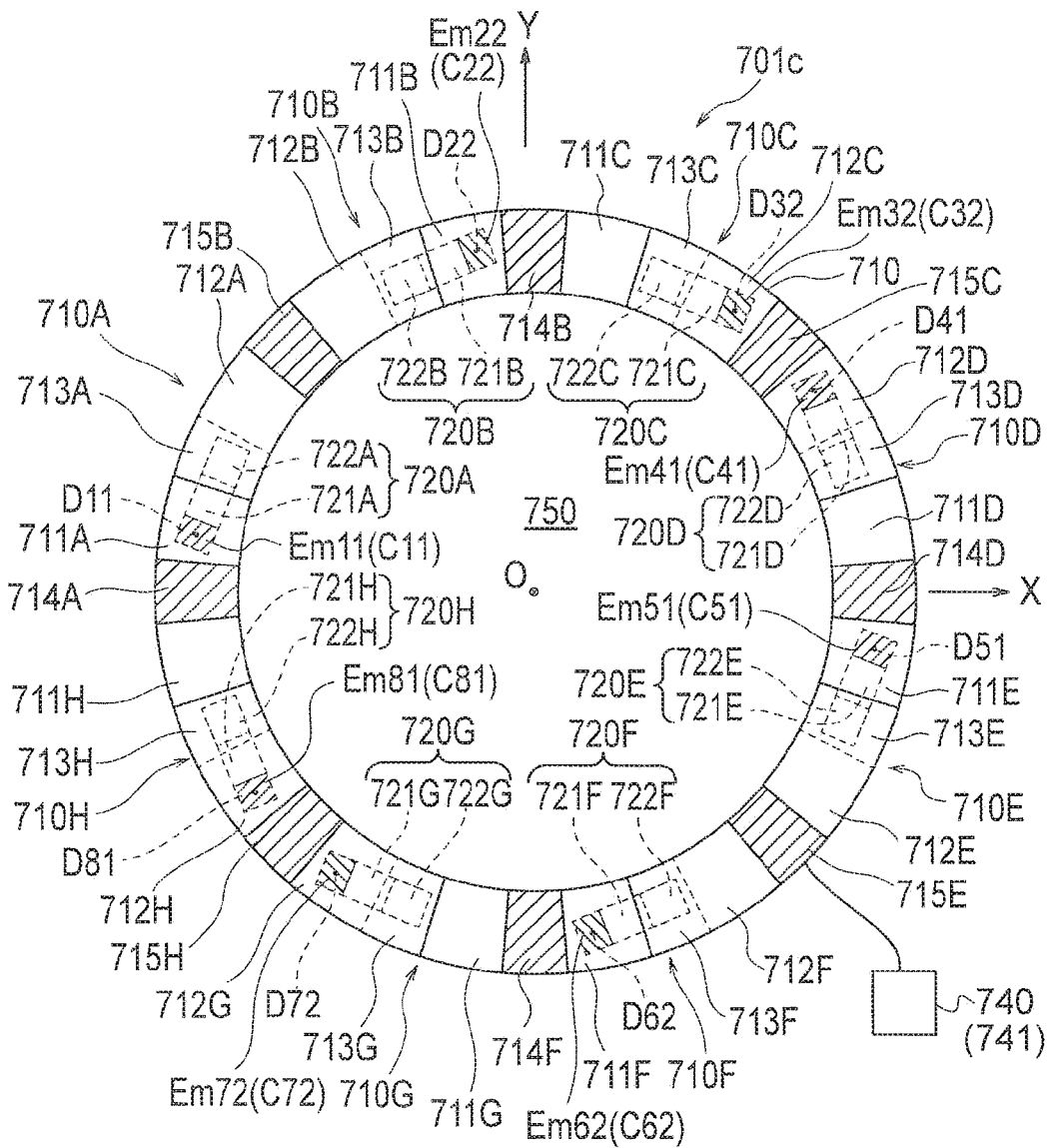
FIG. 46 is a schematic top view of a force sensor according to a modification of FIG. 44.

FIG. 46 is a schematic top view of the force sensor 701c according to a modification of FIG. 44.

As shown in FIG. 46, the force sensor 701c differs from the force sensor 700c according to the seventh embodiment in that the beams 721A through 721H are designed as cantilever beams. Specifically, in the second, third, sixth, and seventh beams 721B, 721C, 721F, and 721G, the top end portions in the counterclockwise direction in FIG. 46 are removed, with respective connecting bodies 722B, 722C, 722F, and 722G in the middle being left. On the other hand, in the first, fourth, fifth, and eighth beams 721A, 721D, 721E, and 721H, the top end portions in the clockwise direction in FIG. 46 are removed, with respective connecting bodies 722A, 722D, 722E, and 722H in the middle being left.

Therefore, in the force sensor 701c, a total of eight displacement potions D11, D22, D32, D41, D51, D62, D72, and D81 are formed one by one in the respective beams 721A through 721H. A total of eight capacitive elements C11, C22, C32, C41, C51, C62, C72, and C81 are disposed one by one at these eight displacement portions. The configuration of each of the capacitive elements is the same as that of the fifth through seventh embodiments.

Although not shown in FIG. 46, the eight capacitive elements are connected to the measuring unit 741 of a detection circuit 740 by a predetermined circuit, and the capacitance values of the respective capacitive elements are supplied to the measuring unit 741. As described later, the measuring unit 741 detects forces and moments acting on the force sensor 701*c*, in accordance with changes in the capacitance values of the respective capacitive elements.

The other aspects of the force sensor 701*c* are the same as those of the seventh embodiment. Therefore, the same components as those of the seventh embodiment are denoted by the same reference numerals as those used in the seventh embodiment, and detailed explanation thereof is not made herein. In short, the force sensor 700*c* according to the seventh embodiment is the same as the force sensor 500*c* according to the fifth embodiment, except that the deformable shape is changed to an annular shape. The force sensor 701*c* according to this modification is the same as the force sensor 600*c* according to the sixth embodiment, except that the shape of the deformable body is changed into an annular shape.

Next, the operation of the force sensor 701*c* according to this embodiment is described. The following is a description of a case where all the six components of forces Fx, Fy, and Fz in the respective axis directions and moments Mx, My, and Mz around the respective axes in the X-Y-Z three-dimensional coordinate system are detected.

As described above, the force sensor 701*c* according to this modification has substantially the same structure as the force sensor 700*c* according to the seventh embodiment, except that the beams 721A through 721H are designed as cantilever beams. Accordingly, when a force or a moment acts on the force receiving portions 714A, 714B, 714D, and 714F via the force receiving body 760, the detection portions D11, D22, D32, D41, D51, D62, D72, and D81 of the respective beams 721A through 721H have the same displacements as those of the corresponding detection portions D11, D22, D32, D41, D51, D62, D72, and D81 of the force sensor 700*c* according to the seventh embodiment.

In view of the above, in a case where the six components Fx, Fy, Fz, Mx, My, and Mz of forces and moments act on the force sensor 701*c*, the increases/decreases in the capacitance values of respective capacitive elements are identical to the increases/decreases in the capacitance values of the corresponding eight capacitive elements C11, C22, C32, C41, C51, C62, C72, and C81 in a case where the forces and the moments act on the force sensor 700*c* according to the seventh embodiment.

In accordance with such changes in the capacitance values, the measuring unit 741 measures the applied forces and moments according to [Expression 30] shown below. [Expression 30] is the same as the expression formed by deleting C12, C21, C31, C42, C52, C61, C71, and C82 from the respective expressions in [Expression 29].

+Fx=C11−C22−C32+C41−C51+C62+C72−C81

+Fy=C11−C22+C32−C41−C51+C62−C72+C81

+Fz=−C11−C22+C32+C41−C51−C62+C72−C82

+Mx=−C22+C32+C62−C72

+My=−C11−C41+C51+C81

+Mz=−C11+C22+C32−C41−C51+C62+C72−C81    [Expression 30]

It should be noted that, in cases where negative forces −Fx, −Fy, and −Fz in the respective axis directions or moments −Mx, −My, and −Mz around the respective negative axes act on the force receiving body 760 of the force sensor 701*c*, the increases/decreases in the distances between the electrodes of the respective capacitive elements are reversed from those shown in FIG. 45 with respect to the corresponding displacement portions, as described above. Therefore, to detect the forces −Fx, −Fy, and −Fz or the moments −Mx, −My, and −Mz, the signs of C11 through C81 in the right sides of [Expression 30] should be reversed.

In the force sensor 701*c* according to this modification, other-axis sensitivities can also be reduced to zero through the above described correcting operation.

According to this modification described above, it is possible to provide the force sensor 701*c* that can achieve the same effects as those of the force sensor 700*c* according to the seventh embodiment.

§ 8. Force Sensor According to an Eighth Embodiment of the Present Invention

<8-1. Structure of a Force Sensor>

Next, a force sensor 800*c* according to an eighth embodiment of the present invention is described.

Figure 47:
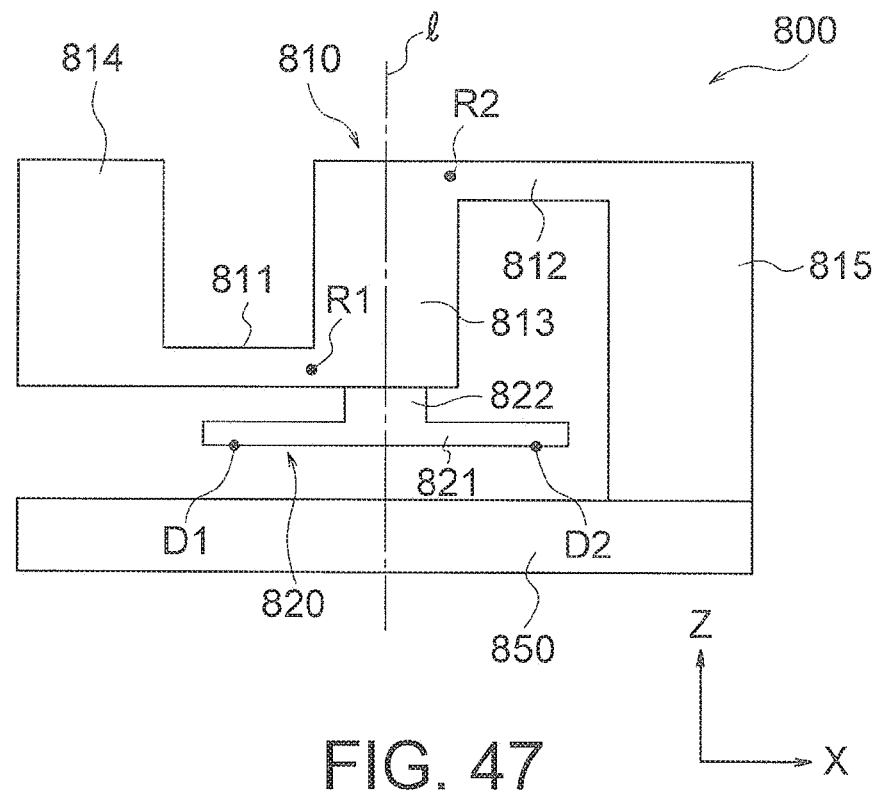
FIG. 47 is a schematic top view of the basic structure of a force sensor according to an eighth embodiment of the present invention.
Figure 48:
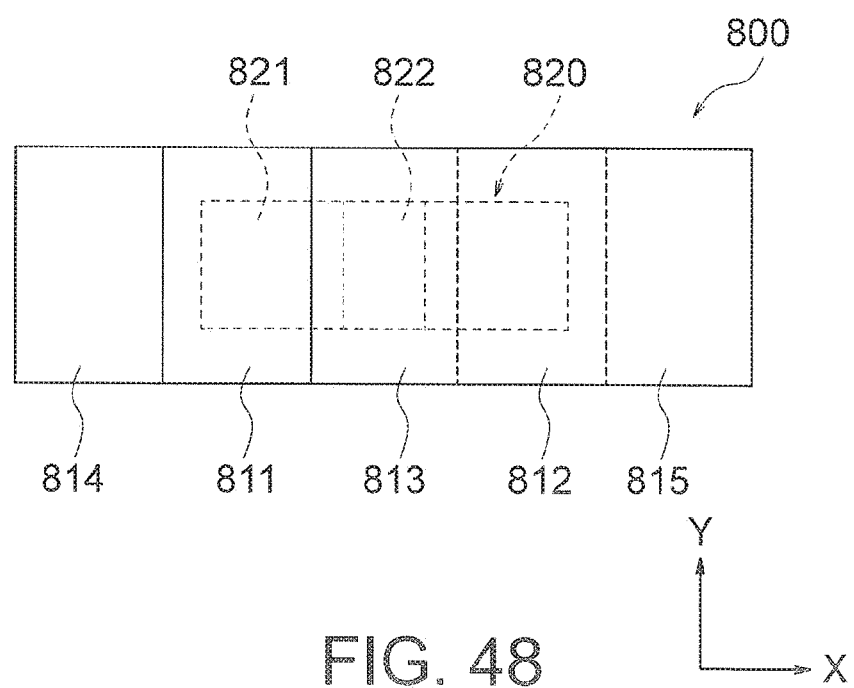
FIG. 48 is a schematic top view of the basic structure shown in FIG. 47.

FIG. 47 is a schematic top view of the basic structure 800 of a force sensor 800*c* according to the eighth embodiment of the present invention. FIG. 48 is a schematic top view of the basic structure 800.

As shown in FIGS. 47 and 48, the overall structure of the basic structure 800 is the same as that of the first embodiment described in § 1. Further, the capacitive elements C1 and C2 provided in the basic structure 800 are also the same as those of the first embodiment (see FIG. 7). Therefore, in FIGS. 47 and 48, the same components as those of the basic structure 100 according to the first embodiment are denoted by substantially the same reference numerals as those used in the first embodiment, and detailed explanation thereof is not made herein. In this embodiment, however, the length of a connecting body 822 in the Z-axis direction, and the distance from the longitudinal direction 1 of a tilting portion 813 to a second displacement portion D2 are set so that the second displacement portion D2 is not displaced in the Z-axis direction when a force −Fz in the negative Z-axis direction acts on a force receiving portion 814. This aspect will be described below in detail.

Figure 49:
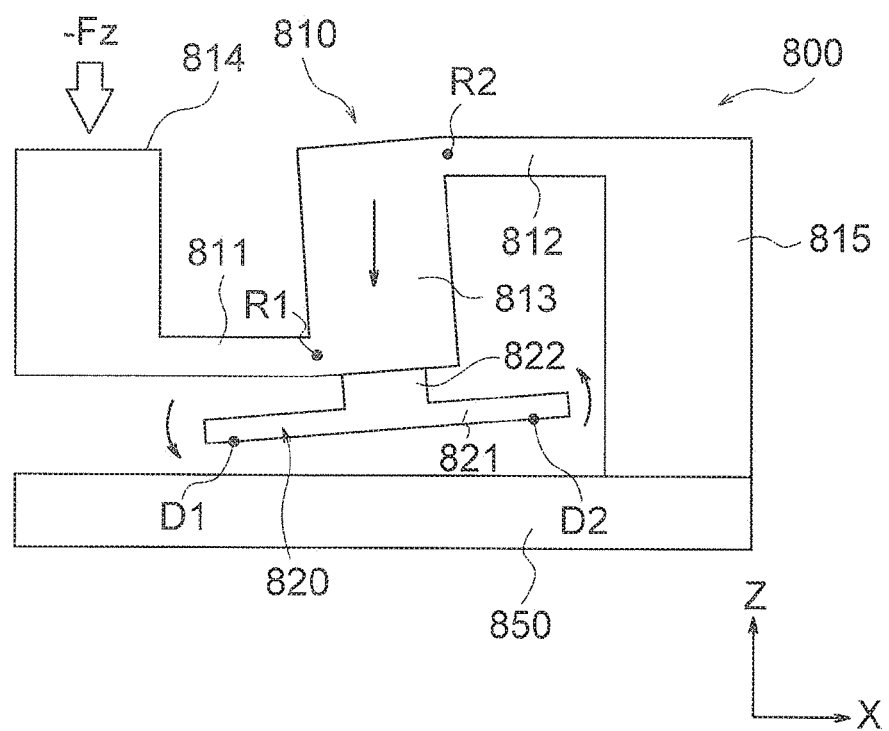
FIG. 49 is a schematic front view of the basic structure in a deformed state when a force −Fx in the negative X-axis direction acts on a force receiving portion.

FIG. 49 is a schematic front view of the basic structure 800 in a deformed state when a force −Fx in the negative X-axis direction acts on the force receiving portion 814. As described in § 1, when a force −Fz in the negative Z-axis direction acts on the force receiving portion 814, a force in the negative Z-axis direction (the downward direction in FIG. 47) acts on a connecting portion R1 at the lower left end of the tilting portion 813, and a force in the positive Z-axis direction (the upward direction in FIG. 47) acts as a reaction of the applied force −Fz on a connecting portion R2 at the upper right end of the tilting portion 813.

Because of the actions of these forces, the tilting portion 813 tilts counterclockwise as shown in FIG. 49. Furthermore, because of the action of the applied force −Fz, the tilting portion 813 is pulled downward in the negative Z-axis direction via a first deformable portion 811, and accordingly, the entire tilting portion 813 is slightly displaced in the negative Z-axis direction.

At the same time, due to the tilting movement of the tilting portion 813, a beam 821 connected to the lower end of the tilting portion 813 also tilts counterclockwise as shown in FIG. 49. As a result, the first displacement portion D1 of the beam 821 is displaced in the direction (the downward direction in FIG. 49) in which the distance to a support 850 decreases, and the second displacement portion D2 is displaced in the direction (the upward direction in FIG. 49) in which the distance to the support 850 increases. More specifically, the displacement caused in the first displacement portion D1 when the force −Fz is applied is the sum of the overall displacement of the above described tilting portion 813 in the negative Z-axis direction and the displacement in the negative Z-axis direction due to the tilting movement of the beam 821, and the displacement caused in the second displacement portion D2 is the sum of the overall displacement of the tilting portion 813 in the negative Z-axis direction and the displacement in the positive Z-axis direction due to the tilting movement of the beam 821. That is, when the force −Fz in the negative Z-axis direction acts on the force receiving portion 814, the overall displacement of the tilting portion 813 in the negative Z-axis direction is added to the displacement due to the tilting movement of the beam 821 in the first displacement portion D1. Therefore, the distance between the first displacement portion D1 and the support 850 greatly decreases. In the second displacement portion D2, on the other hand, the displacement due to the tilting movement of the beam 821 is offset by the overall displacement of the tilting portion 813 in the negative Z-axis direction. Therefore, the change in the distance between a second displacement electrode Em2 and a second fixed electrode Ef2 remains small. Particularly, in a case where the length of the connecting body 822 in the Z-axis direction and the distance from the longitudinal direction 1 of the tilting portion 813 to the second displacement portion D2 are in a predetermined relationship, it is possible to maintain substantially a constant distance between the second displacement electrode Em2 and the second fixed electrode Ef2. This fact was taken into consideration in devising this embodiment.

Specifically, in a case where the length of the connecting body 822 in the Z-axis direction and the distance from the longitudinal direction 1 of the tilting portion 813 to the second displacement portion D2 are in the predetermined relationship, the capacitance values C1a and C2a of the capacitive elements C1 and C2 (not shown) of the force sensor 800c at a time when the force −Fz in the negative Z-axis direction acts on the force receiving portion 814 are expressed by [Expression 31] shown below.

$$C1a = C1 + \Delta C$$

$$C2a = C2 \qquad \text{[Expression 31]}$$

Although not shown in the drawings, when a force +Fz in the positive Z-axis direction acts on the force sensor 800c, on the other hand, the tilting portion 813 tilts clockwise, and, due to the action of the applied force +Fz, the tilting portion 813 is pulled upward in the positive Z-axis direction via the first deformable portion 811. As a result, the tilting portion 813 is slightly displaced in the positive Z-axis direction in total.

At the same time, due to the tilting movement of the tilting portion 813, the beam 821 connected to the lower end of the tilting portion 813 also tilts clockwise. As a result, the first displacement portion D1 of the beam 821 is displaced in a direction in which the distance to the support 850 increases, and the second displacement portion D2 is displaced in a direction in which the distance to the support 850 decreases. Therefore, the displacement caused in the first displacement portion D1 when the force +Fz is applied is the sum of the overall displacement of the above described tilting portion 813 in the positive Z-axis direction and the displacement in the positive Z-axis direction due to the tilting movement of the beam 821, and the displacement caused in the second displacement portion D2 is the sum of the overall displacement of the tilting portion 813 in the positive Z-axis direction and the displacement in the negative Z-axis direction due to the tilting movement of the beam 821. In this embodiment, the length of the connecting body 822 in the Z-axis direction and the distance from the longitudinal direction 1 of the tilting portion 813 to the second displacement portion D2 are in the above predetermined relationship. Accordingly, the distance between the second displacement electrode Em2 and the second fixed electrode Ef2 does not actually change.

As described above, in the force sensor 800c according to this embodiment, the second displacement portion D2 is designed not to be substantially displaced in the Z-axis direction when the tilting portion 813 is displaced in its longitudinal direction 1. Thus, it is possible to detect the applied force Fz in the Z-axis direction through a simple calculation.

<8-2. Modification of the Force Sensor 200c Shown in FIG. 18>

Next, a modification of the force sensor 200c shown in FIG. 18 to which the configuration described in 8-1, is applied is described.

As described above, the force sensor 200c shown in FIG. 18 is formed with four basic structures 100 that are the same as the basic structure 100 shown in FIG. 1 and are arranged in a ring-like form (see 2-1.). This modification is a force sensor 801c formed by replacing each of the four basic structures 100 (first through fourth deformable elements 210A through 210D) with the basic structure 800 described in 8-1. Therefore, the same names as the names used in describing the force sensor 200c are used for the components equivalent to the components of the force sensor 200c shown in FIG. 18.

In a case where a force +Fx in the positive X-axis direction, a force +Fy in the positive Y-axis direction, and a moment around the positive Z-axis act on the force sensor 801c according to this modification, any force in the Z-axis direction does not act on the force receiving portions 814A through 814D of respective deformable elements 810A through 810D. Therefore, the changes in the capacitance values of the capacitive elements C11 through C42 are as shown in the respective columns for Fx, Fy, and Mz in the table shown in FIG. 20.

When a force +Fz in the positive Z-axis direction acts on the force sensor 801c, on the other hand, a force in the Z-axis direction acts on the respective force receiving portions of the first through fourth deformable elements 810A through 810D. Therefore, the displacement of the 1-2nd displacement portion D12 in the Z-axis direction is zero in the first deformable element 810A, the displacement of the 2-1st displacement portion D21 in the Z-axis direction is zero in the second deformable element 810B, the displacement of the 3-2nd displacement portion D32 in the Z-axis direction is zero in the third deformable element 810C, and the displacement of the 4-1st displacement portion D41 in the Z-axis direction is zero in the fourth deformable element 810D. The same applies in cases where the force −Fz, in the negative Z-axis direction acts on the force sensor 801c. Further, the phenomenon that the displacements of the four displacement portions D12, D21, D32, and D41 in the Z-axis direction become zero as described above also occurs in cases where a moment Mx around the X-axis and a moment My around the Y-axis are applied. In view of the above results, the changes caused in the capacitance values of the capacitive elements C11 through C42 when forces and moments Fx through Mz act on the force sensor 801c are shown in a list in FIG. 50.

In accordance with the changes in the capacitance values of the respective capacitive elements C11 through C42, the measuring unit 841 of a detection circuit 840 measures the applied forces and moments according to [Expression 32] shown below. [Expression 32] is an expression formed by deleting C12, C21, C32, and C41 from Mx and My in [Expression 14].

$Fx = C11 - C12 + C21 - C22 - C31 + C32 - C41 + C42$ $Fy = C11 - C12 - C21 + C22 - C31 + C32 + C41 - C42$ $Fz = -C11 + C12 + C21 - C22 - C31 + C32 + C41 - C42$ $Mx = -C11 - C22 + C31 + C42$ $My = -C11 + C22 + C31 - C42$ $Mz = -C11 + C12 - C21 + C22 - C31 + C32 - C41 + C42$ [Expression 32]

It should be noted that Fz in [Expression 32] still has C12, C21, C32, and C41. This is a devise for eliminating the influence of temperature changes and in-phase noise by measuring Fz through difference detection.

Next, the other-axis sensitivity of the force sensor 801c according to this modification is described.

FIG. 51 is a table as a list showing the other-axis sensitivities of the six components of forces and moments in the force sensor 801c according to the modification shown FIG. 47. As can be seen from FIG. 51, in the force sensor 801c, the force Fx in the X-axis direction and the moment My around the Y-axis affect each other, and the force Fy in the Y-axis direction and the moment Mx around the X-axis affect each other. Therefore, the force sensor 801c should be used as a sensor for detecting the four components Fx, Fy, Fz, and Mz in an environment where Mx and My are not applied, or should be used as a sensor for detecting the four components Fz, Mx, My, and Mz in an environment where Fx, and Fy are not applied.

Alternatively, applied forces and moments can also be measured according to [Expression 33] shown below.

$Fx = -C12 + C31 + C32 - C41$ $Fy = -C12 - C21 + C32 + C41$ $Fz = -C11 + C12 + C21 - C22 - C31 + C32 + C41 - C42$ $Mx = -C11 - C12 - C21 - C22 + C31 + C32 + C41 + C42$ $My = -C11 + C12 - C21 + C22 + C31 - C32 - C41 - C42$ $Mz = -C11 + C21 - C21 + C22 - C31 + C32 - C41 + C42$ [Expression 33]

In [Expression 33], the expressions for Fx and Fy are expressions focusing on only one of the two displacement portions provided in each beam. Since any of the six components can be measured in accordance with differences, it is possible to obtain the applied forces and moments without being affected by changes in environmental temperature and in-phase noise.

Further, where the other-axis sensitivities of the forces in the respective axis directions and the moments Fx through Mz around the respective axes are calculated according to [Expression 33], the results are as shown in a list in FIG. 52. The other-axis sensitivities are values obtained by assigning the six components Fx through Mz in the table shown in FIG. 51 to the respective right sides of the above [Expression 33]. Each capacitive element with the symbol "+" is represented by +1, each capacitive element with the symbol "−" is represented by −1, and each capacitive element with "0" is represented by 0. As shown in FIG. 52, the other-axis sensitivities are zero in cases where any of the components Fx through Mz is detected.

According to this modification described above, the same effects as those of the force sensor 200c according to the second embodiment can be achieved, and further, applied forces and moments can be detected through simpler calculations.

<8-3. Modification of the Force Sensor 500c Shown in FIG. 36>

Next, a modification of the force sensor 500c shown in FIG. 36 to which the configuration described in 8-1. is applied is described.

As described above, the force sensor 500c shown in FIG. 36 is formed with eight basic structures 100 that are the same as the basic structure 100 shown in FIG. 1 and are arranged in a rectangular closed-loop form (see 5-1). This modification is a force sensor 802c formed by replacing each of the eight basic structures 100 (first through eighth deformable elements 210A through 210H) with the basic structure 800 described in 8-1. Here, the same names as the names used in describing the force sensor 500c are used for the components equivalent to the components of the force sensor 500c shown in FIG. 36.

In a case where a force −Fx in the positive X-axis direction, a force +Fy in the positive Y-axis direction, and a moment around the positive Z-axis act on the force sensor 802c according to this modification, any force in the Z-axis direction does not act on the force receiving portions 814A through 814H of respective deformable elements 810A through 810H. Therefore, the changes in the capacitance values of the capacitive elements C11 through C82 are as shown in the respective columns for Fx, Fy, and Mz in the table shown in FIG. 38.

When a force −Fz in the positive Z-axis direction acts on the force sensor 802c, on the other hand, a force in the positive Z-axis direction acts on the respective force receiving portions of the first through eighth deformable elements 810A through 810H. Therefore, the displacement of the 1-2nd displacement portion D12 in the Z-axis direction is zero in the first deformable element 810A, the displacement of the 2-1st displacement portion D21 in the Z-axis direction is zero in the second deformable element 810B, the displacement of the 3-2nd displacement portion D32 in the Z-axis direction is zero in the third deformable element 810C, the displacement of the 4-1st displacement portion D41 in the Z-axis direction is zero in the fourth deformable element 810D, the displacement of the 5-2nd displacement portion D52 in the Z-axis direction is zero in the fifth deformable element 810E, the displacement of the 6-1st displacement portion D61 in the Z-axis direction is zero in the sixth deformable element 810F, the displacement of the 7-2nd displacement portion D72 in the Z-axis direction is zero in the seventh deformable element 810G, and the displacement of the 8-1st displacement portion D81 in the Z-axis direction is zero in the eighth deformable element 810H. The same applies in cases where the force −Fz in the negative Z-axis direction acts on the force sensor 802c. Further, the phenomenon that the displacements of the eight displacement portions D12, D21, D32, D41, D52, D61, D72, and D81 in the Z-axis direction become zero as described above also occurs in cases where a moment Mx around the X-axis and a moment My around the Y-axis are applied. In view of the above results, the changes caused in the capacitance values of the capacitive elements C11 through C82 when forces and moments Fx through Mz act on the force sensor 802c are shown in a list in FIG. 53.

In accordance with the changes in the capacitance values of the respective capacitive elements C11 through C82, the measuring unit 841 of the detection circuit 840 measures the applied forces and moments according to [Expression 34] shown below. [Expression 34] is based on [Expression 22] through [Expression 27], and is an expression obtained by deleting C12, C21, C32, C41, C52, C61, C72, and C81 from the expressions for Mx and My.

+Fx=C21−C22+C31−C32−C61+C62−C71+C72

+Fy=C11−C12−C41+C42−C51+C52+C81−C82

+Fz=−C11+C12+C21−C22−C31+C32+C41−C42−C51+C52+C61−C62−C71+C72+C81−C82

+Mx=−C22−C31+C62+C71

+My=−C11+C42+C51−C82

+Mz=−C11+C12−C21+C22−C31+C32−C41+C42−C51+C52−C61+C62−C71+C72C81+C82    [Expression 34]

It should be noted that Fz in [Expression 34] still has C12, C21, C32, C41, C52, C61, C72, and C81. This is a devise for eliminating the influence of temperature changes and in-phase noise by measuring Fz through difference detection. Since any of the six components can be measured from differences according to [Expression 34], it is possible to obtain the applied forces and moments without being affected by changes in environmental temperature and in-phase noise.

Next, the other-axis sensitivity of the force sensor 802c according to this modification is described.

FIG. 54 is a table as a list showing the other-axis sensitivities of the six components of forces and moments in the force sensor 802c corresponding to FIG. 53, The method of calculating other-axis sensitivities is as described in 8-2. As shown in FIG. 54, in the force sensor 802c, the other-axis sensitivities are zero in cases where any of the components Fx through Mz is detected.

According to this modification described above, the same effects as those of the force sensor 500c according to the fifth embodiment can be achieved, and further, applied forces and moments can be detected through simpler calculations.

In [Expression 34], the six components Fx through Mz are calculated from sixteen variables C11 through C82, and therefore, there is redundancy. To carry out more efficient measurement, capacitance analysis may be conducted through computer simulations, and six or more capacitive elements may be selected from the sixteen capacitive elements. In this case, the influence of other-axis sensitivities can be eliminated by performing the above described correcting operation.

§ 9. Modifications

<9-1. Modification of the Force Receiving Body>

Figure 55:
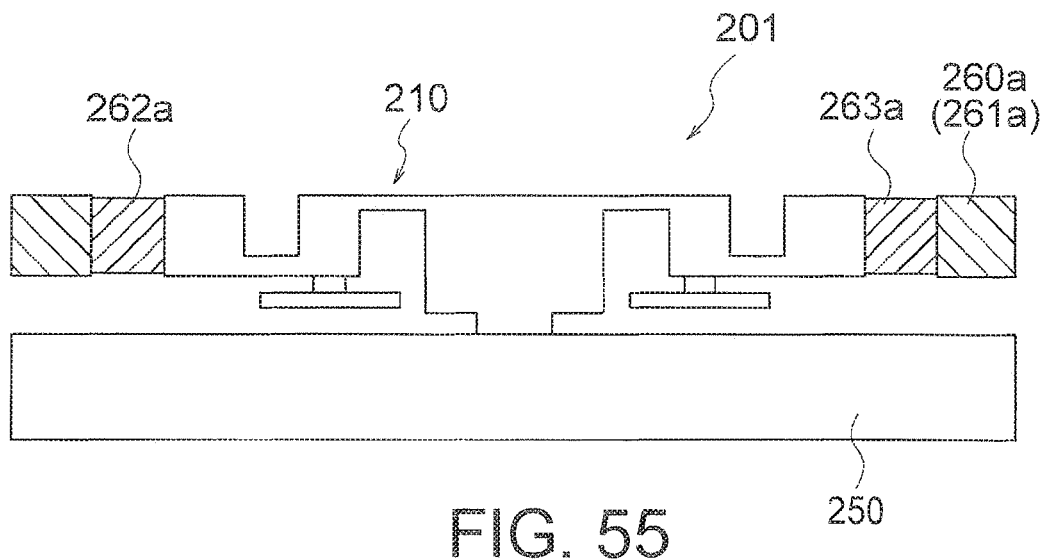
FIG. 55 is a schematic cross-sectional view of an example of the basic structure of a force sensor in which a force receiving body is disposed on the outer circumferential side of a deformable body.

In each of the force sensors 200c through 802c described in § 2 through § 8, the deformable bodies and the force receiving body are aligned in the Z-axis direction (in the vertical direction in each drawing), as shown in FIGS. 9, 10, 19, 30, 37, and 41, and other drawings. However, the present invention is not limited to such a mode, FIG. 55 is a schematic cross-sectional view of an example of the basic structure 201 of a force sensor in which a force receiving body is disposed on the outer circumferential side of a deformable body. The structure shown in FIG. 55 corresponds to a modification of the basic structure 200 of the force sensor 200c according to the second embodiment. Therefore, in FIG. 55, in each of the force sensors 200c through 802c described above, the force receiving body main body 261a of a force receiving body 260a is formed in a shape similar to the shape of the contour of the outer circumference of a deformable body 210, and may be positioned to surround the outer circumference of the deformable body 210, as shown in FIG. 55. In this case, force receiving portion connecting bodies 262a and 263a that connect the force receiving body main body 261a and the deformable body 210 are provided on the outer circumferential surface of the deformable body 210.

In this case, the deformable body 210 and the force receiving body 260a are disposed in the same plane, and thus, the size of the force sensor in the Z-axis direction can be made smaller (thinner).

<9-2. Modification (1) of the Deformable Body>

Figure 56:
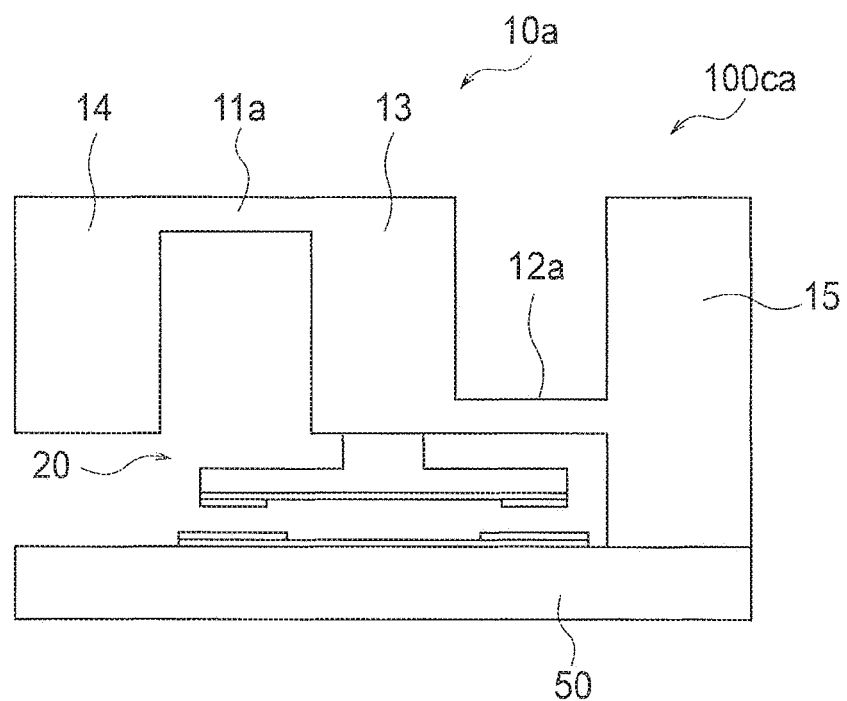
FIG. 56 is a schematic side view of a modification of the force sensor according to the first embodiment.

FIG. 56 is a schematic side view of a modification of the force sensor 100c of § 1.

As shown in FIG. 56, a force sensor 100ca according to this modification differs from the force sensor 100c according to the first embodiment in the layout of a first deformable portion 11a and a second deformable portion 12a. Specifically, the first deformable portion 11 and the tilting portion 13 are connected at the lower end portion (the end portion on the negative Z-axis side) of the tilting portion 13 in the force sensor 100c according to the first embodiment, but are connected at the upper end portion (the end portion on the positive Z-axis side) of the tilting portion 13 in this modification. Furthermore, the second deformable portion 12 and the tilting portion 13 are connected at the upper end portion of the tilting portion 13 in the force sensor 100c according to the first embodiment, but a second deformable portion 12c and the tilting portion 13 are connected at the lower end portion of the tilting portion 13 in this modification. The other aspects are the same as those of the force sensor 100c according to the first embodiment. In FIG. 56, the same components as those of the force sensor 100c are denoted by the same reference numerals as those used in the force sensor 100c, and detailed explanation thereof is not made herein.

In the force sensor 100ca according to this modification, when a force +Fx in the positive X-axis direction (the rightward direction in FIG. 56) acts on the force receiving portion 14, the tilting portion 13 tilts clockwise, and, when a force −Fx in the negative X-axis direction (the leftward direction in FIG. 56) acts on the force receiving portion 14, the tilting portion 13 tilts counterclockwise. These tilting directions are the opposite of those in the first embodiment. On the other hand, when a force +Fz in the positive Z-axis direction (the upward direction in FIG. 56) acts on the force receiving portion 14, the tilting portion 13 tilts clockwise, and, when a force −Fz in the negative Z-axis direction (the downward direction in FIG. 56) acts on the force receiving portion 14, the tilting portion 13 tilts counterclockwise. These tilting directions are the same as those in the first embodiment.

Therefore, to measure a force acting on the force receiving portion 14 with the force sensor 100ca according to this modification, the sign of the right side of [Expression 3] should be reversed in a case where a force in the X-axis direction is to be detected, and [Expression 5] should be adopted without any change in a case where a force in the Z-axis direction is to be detected.

It should be understood that the above deformable portion 10a is not only used in the first embodiment, but may also be used in the force sensors according to the respective embodiments and modifications described in § 2 through § 8. In this case, when a force in the X-axis direction acts on the deformable portion 10a, the signs of the changes in the capacitance values of the respective capacitive elements described in the embodiments and modifications in § 2 through § 8 should be reversed.

<9-3, Modification (2) of the Deformable Body>

Figure 57:
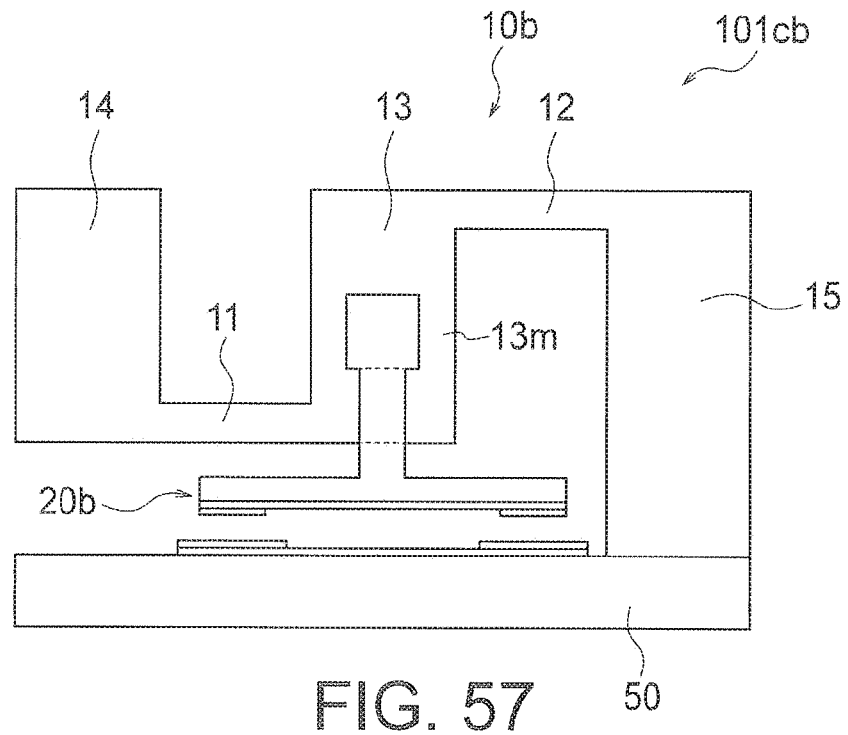
FIG. 57 is a schematic side view of a further modification of FIG. 56.

FIG. 57 is a schematic side view of a further modification of the force sensor 100c of § 1.

A force sensor 100cb according to this modification differs from the first embodiment in the structure of the displacement body 20. Specifically, as shown in FIG. 57, a displacement body 20b of the force sensor 100cb is connected not to the lower end of the tilting portion 13 but to a middle portion 13m between the upper end and the lower end of the tilting portion 13. In this case, the beam 21 exhibits behaviors similar to those in the force sensor 100c according to the first embodiment, and therefore, the method of measuring the forces Fx and Fz described in § 1 can be adopted without any change.

It should be understood that the deformable portion 10b of this modification is not only used in the first embodiment, but may also be used in the force sensors according to the respective embodiments and modifications described in § 2 through § 8.

<9-4. Modification (3) of the Deformable Body>

Figure 58:
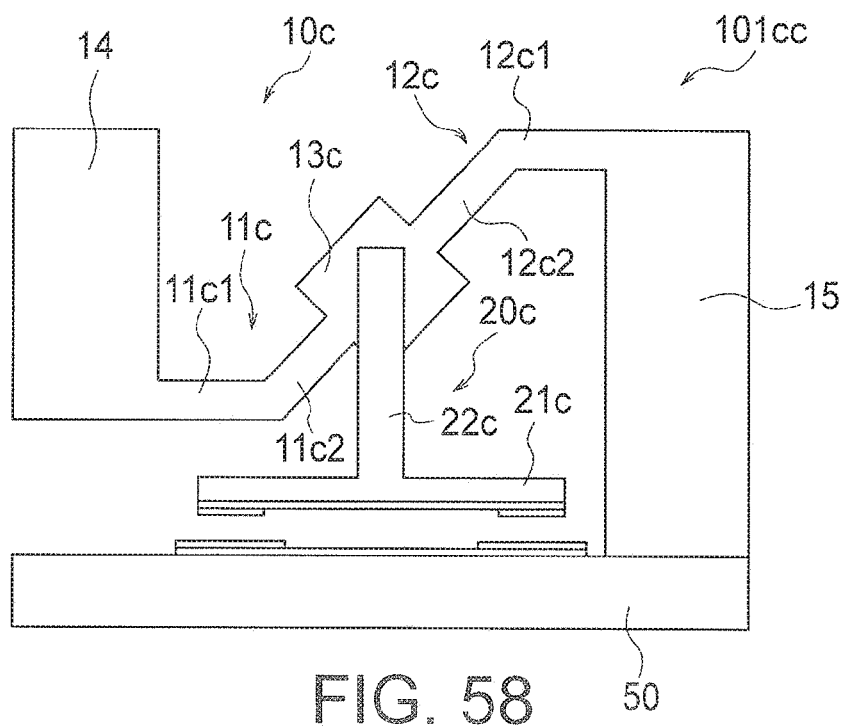
FIG. 58 is a schematic side view of a further modification of FIG. 56.

FIG. 58 is a schematic side view of a further modification of the force sensor 101cb shown in FIG. 57.

As shown in FIG. 58, in a force sensor 101cc according to this modification, a tilting portion 13c is designed to be shorter than the tilting portions shown in FIGS. 1, 56, 57, and others, and in the initial state, the longitudinal direction 1 thereof is at an acute angle to the Z-axis. Further, a first deformable portion 11c of the force sensor 101cc includes: a 1-1st deformable portion 11c1 extending parallel to the X-axis from the force receiving portion 14; and a 1-2nd deformable portion 11c2 that extends parallel to the longitudinal direction 1 of the tilting portion 13c from the tip of the 1-1st deformable portion 11c1, and is joined to one of the end portions of the tilting portion 13c. Meanwhile, a second deformable portion 12c of the force sensor 101cc includes: a 2-1st deformable portion 12c1 extending parallel to the X-axis from the top end of the fixed portion 15; and a 2-2nd deformable portion 12c2 that extends parallel to the longitudinal direction 1 of the tilting portion 13c from the tip of the 2-1st deformable portion, and is joined to the other one of the end portions of the tilting portion 13c. Further, the displacement body 20c includes: a connecting body 22c that downwardly, extends parallel to the Z-axis from the tilting portion 13c; and a beam 21c joined to the lower end of the connecting body 22c.

As the beam 21c behaves in the same manner as that of the force sensor 100c according to the first embodiment, it is possible to properly measure forces Fx and Fz with the force sensor 100cc described above, using the method of measuring the forces Fx and Fz as described in § 1. It should be understood that the deformable portion 10c of this modification is not only used in the first embodiment, but may also be used in the force sensors according to the respective embodiments and modifications described in § 2 through § 8.

Although no further examples will be described, in short, the displacement body should have a structure that tilts (rotates) when forces in the Z-axis direction and the X-axis direction act on the force receiving portion in a situation where the fixed body is not displaced.

In the three modifications shown in FIGS. 56 through 58, each of the two displacement electrodes and two fixed electrodes is disposed on a single insulator (insulating layer). With this arrangement, insulators (such as glass epoxy substrates or ceramic substrates) can be made from a single substrate, and accordingly, force sensor productivity can be advantageously increased.

<9-5. Modification (4) of the Deformable Body>

Next, a further modification of the force sensor 200c according to the second embodiment shown in FIG. 18 is described.

Figure 59:
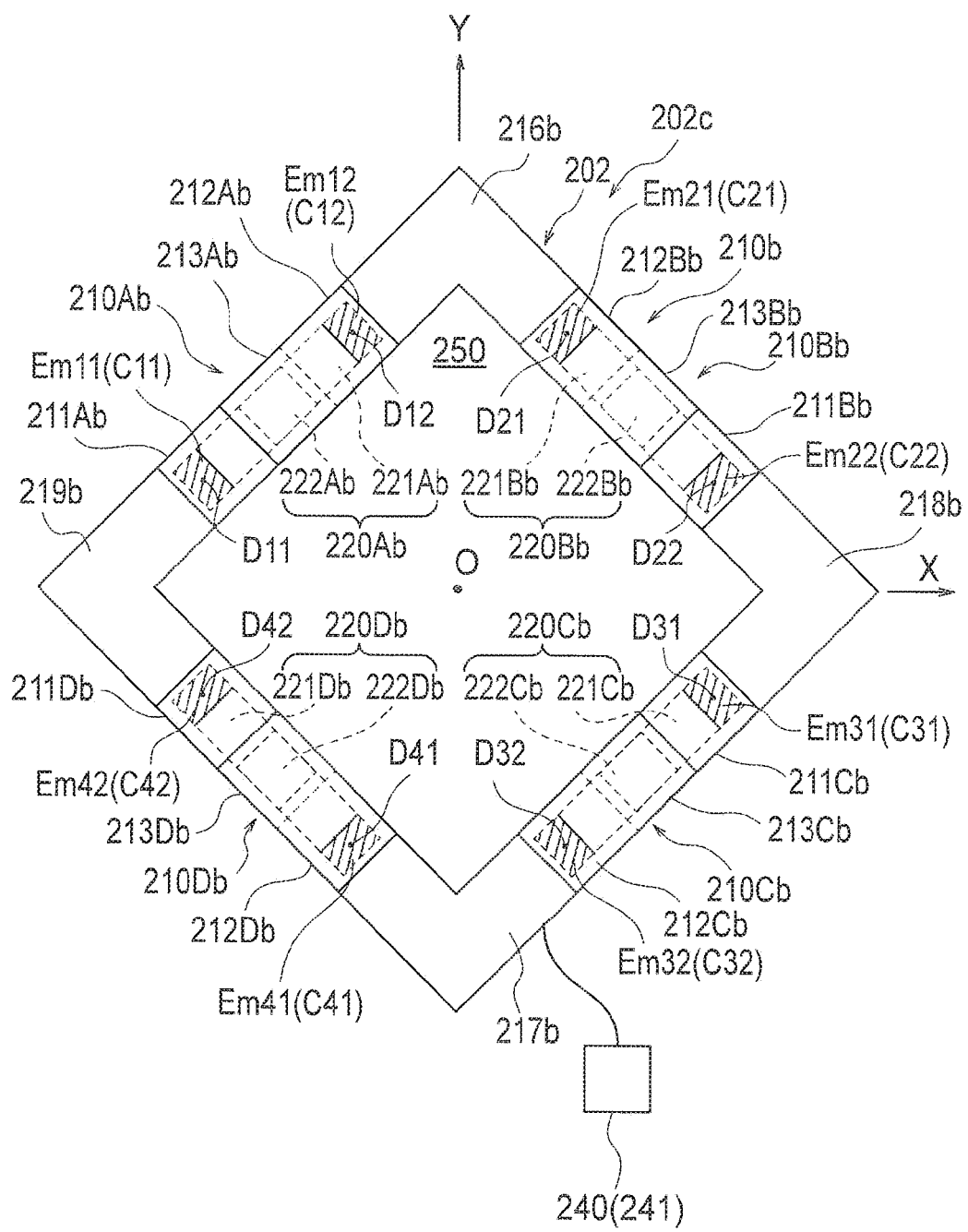
FIG. 59 is a schematic top view of a force sensor according to a modification of FIG. 18.

FIG. 59 is a schematic top view of a force sensor 202c according to a modification of FIG. 18. For ease of explanation, the force receiving body is not shown in this drawing, either.

As shown in FIG. 59, the force sensor 202c differs from the force sensor 200c shown in FIG. 18 in that a deformable body 210b has a rectangular shape. The deformable body 210b includes: two force receiving portions 218b and 219b symmetrically arranged with respect to the origin O on the X-axis; and two fixed portions 216b and 217b symmetrically arranged with respect to the origin O on the Y-axis. The force receiving portions and the fixed portions that are adjacent to one another along a closed-loop path are connected by four linear deformable elements 210Ab through 210Db. Accordingly, the basic structure 202 of the force sensor 202c has a rectangular shape, with the two force receiving portions 218b and 219b and the two fixed portions 216b and 217b being located at the four vertices. The deformable elements 210Ab through 210Db are disposed one by one on the four sides of the rectangle.

The other aspects are substantially the same as those of the force sensor 200c shown in FIG. 18. Therefore, in FIG. 59, the components corresponding to those of the force sensor 200c shown in FIG. 18 are denoted by substantially the same reference numerals (accompanied by "b") as those used in the force sensor 200c, and detailed explanation thereof is not made herein.

In the force sensor 202c described above, each of the deformable elements 210A through 210D of the force sensor 200c shown in FIG. 18 is formed not in an arc-like shape but in a linear shape. Therefore, the elastic deformations caused in the respective deformable elements 210Ab through 210Db when forces and moments act on the force sensor 202c shown in FIG. 59 are substantially the same as those in the force sensor 200c shown in FIG. 18, That is, the capacitance values of the respective capacitive elements C11 through C41 of the force sensor 202c according to this modification change with respect to the applied forces and moments as shown in FIG. 20.

Thus, with the force sensor 202c according to this modification described above, it is also possible to achieve the same effects as those of the force sensor 200c shown in FIG. 18.

It should be noted that the modification of the force receiving body described in 9-1. can also be used in this modification. In that case, a force receiving body designed to have a rectangular shape similar to the contour of the outer circumference of the deformable body 210b is disposed on the outer circumference of the deformable body 210b.

REFERENCE SIGNS LIST

10 Deformable body
10a, 10b, 10c Deformable portion 11, 11a, 11c First deformable portion
12, 12a, 12c Second deformable portion
13, 13c Tilting portion
13m Middle portion
14 Force receiving portion
15 Fixed portion
20, 20b, 20c Displacement body
21, 21c Beam
22, 22c Connecting body
40 Detection circuit
41 Measuring unit
50 Support
100 Basic structure
100c, 100ca, 100cb, 100cc, 101cb, 101cc Force sensor200Basic structure
200c Force sensor
201 Basic structure
210 Annular deformable body
210A to 210D Deformable element
213A to 213D Tilting portion
216, 217 Fixed portion
218, 219 Force receiving portion
220A to 220D Displacement body
221A to 221D Beam
222A to 222D Connecting body
240 Detection circuit
241 Measuring unit
250 Support
260, 260a Force receiving body
261, 261a Force receiving body main body
262, 262a Force receiving portion connecting body
263, 263a Force receiving portion connecting body
300c, 301c Force sensor
310 Deformable body
313A to 213D Tilting portion
316, 317 Fixed portion
318, 319 Force receiving portion
321A to 321D Beam
340 Detection circuit
341 Measuring unit
350 Fixed body
360 Force receiving body
400c, 401c Force sensor
410 Deformable body
411A to 411D Beam
413A to 413D Tilting portion
416, 417 Fixed portion
418, 419 Force receiving portion
421A to 421D Beam
441 Measuring unit
450 Fixed body
460 Force receiving body
500 Basic structure
500c Force sensor
510 Rectangular deformable body
510A to 510H Deformable element
513A to 513H Tilting portion
514A, 514B, 514D, 514F Force receiving portion
515B, 515C, 515E, 515H Fixed portion
520A to 520H Displacement body
521A to 521H Beam
522A to 522H Connecting body
540 Detection circuit
541 Measuring unit
550 Support
560 Force receiving body
561 Force receiving body main body
562 to 565 Force receiving portion connecting body
600c Force sensor
614A, 614B, 614D, 614F Force receiving portion
621A to 621H Beam
622A to 622H Connecting body
640 Detection circuit
641 Measuring unit
660 Force receiving body
700c, 701c Force sensor
710 Annular deformable body
710A to 710H Deformable element
713A to 713H Tilting portion
714A, 714B, 714D, 714F Force receiving portion
721A to 721H Beam
722A to 722H Connecting body
740 Detection circuit
741 Measuring unit
760 Force receiving body
800 Basic structure
800c, 801c, 802c Force sensor
810 Deformable body
811 First deformable portion
812 Second deformable portion
813 Tilting portion
814 Force receiving portion
821 Beam
822 Connecting body
840 Detection circuit
841 Measuring unit
850 Support

The invention claimed is:

1. A force sensor comprising:
a deformable body that includes a force receiving portion and a fixed portion, and is elastically deformed by a force acting on the force receiving portion;
a displacement body that is connected to the deformable body, and is displaced by elastic deformation caused in the deformable body; and
a detection circuit that detects an applied force, in accordance with a displacement caused in the displacement body,
wherein
the deformable body includes:
a tilting portion that has a longitudinal direction and is disposed between the force receiving portion and the fixed portion;
a first deformable portion formed in curved shape, the first deformable portion connecting the force receiving portion and the tilting portion; and
a second deformable portion formed in curved shape, the second deformable portion connecting the fixed portion and the tilting portion,
the first deformable portion is disposed on one side of the tilting portion,
the second deformable portion is disposed on the other side of the tilting portion,
a connecting portion between the first deformable portion and the tilting portion, and a connecting portion between the second deformable portion and the tilting portion differ in position in the longitudinal direction of the tilting portion,
the displacement body includes a displacement portion that is connected to the tilting portion and is at a distance from the fixed portion, the displacement portion being displaced by a tilting movement of the tilting portion, and the detection circuit includes a capacitive element disposed at the displacement portion, and detects an applied force in accordance with a change in a capacitance value of the capacitive element.

2. The force sensor according to claim 1, wherein the displacement body includes a beam that extends in a predetermined direction.

3. The force sensor according to claim 2, wherein the displacement portion of the displacement body includes a first displacement portion and a second displacement portion defined at different positions from each other on the beam, and the detection circuit includes a first capacitive element disposed at the first displacement portion and a second capacitive element disposed at the second displacement portion, and detects an applied force in accordance with changes in capacitance values of the respective capacitive elements.

4. The force sensor according to claim 3, wherein the displacement body includes a connecting body that connects the tilting portion of the deformable body and the beam, and the first displacement portion and the second displacement portion of the displacement body are disposed on the beam symmetrically with respect to a connecting portion between the connecting body and the beam.

5. The force sensor according to claim 3, wherein, in the displacement body, a displacement caused in the tilting portion and a displacement caused in one of the first displacement portion and the second displacement portion when a force in a particular direction acts on the force receiving portion are in opposite directions from each other and are of the same size, to prevent the one of the displacement portions from being displaced.

6. The force sensor according to claim 3, further comprising a support that is disposed to face the beam of the displacement body, and does not move relative to the fixed portion, wherein the first capacitive element includes a first displacement electrode disposed at the first displacement portion of the displacement body, and a first fixed electrode disposed on the support to face the first displacement electrode, and the second capacitive element includes a second displacement electrode disposed at the second displacement portion of the displacement body, and a second fixed electrode disposed on the support to face the second displacement electrode.

7. The force sensor according to claim 6, wherein the first displacement electrode and the second displacement electrode, or the first fixed electrode and the second fixed electrode are formed with a common electrode.

8. The force sensor according to claim 1, further comprising a support that is disposed to face the displacement body, and does not move relative to the fixed portion, wherein the capacitive element includes a displacement electrode disposed at the displacement portion of the displacement body, and a fixed electrode disposed on the support to face the displacement electrode.

9. The force sensor according to claim 8, further comprising:

a force receiving body that is connected to the force receiving portion of the deformable body, and receives an applied force; and a fixed body connected to the fixed portion of the deformable body, wherein the fixed body is connected to the support.

10. The force sensor according to claim 1, wherein the deformable body is disposed on an X-Y plane in an X-Y-Z three-dimensional coordinate system, the longitudinal direction of the tilting portion is a direction intersecting with the Z-axis, the first deformable portion connects the force receiving portion and one end portion of the tilting portion, and the second deformable portion connects the fixed portion and the other end portion of the tilting portion.

* * * * *